(12) United States Patent
Ouellette

(10) Patent No.: US 7,744,671 B1
(45) Date of Patent: Jun. 29, 2010

(54) BIOMASS HEATING SYSTEM

(76) Inventor: Joseph P. Ouellette, 211 Buckingham Road, Unit 85, Windsor, Ontario N85 2C5 (CA)

( * ) Notice: Subject to any disclaimer, the term of this patent is extended or adjusted under 35 U.S.C. 154(b) by 944 days.

(21) Appl. No.: 11/529,589

(22) Filed: Sep. 28, 2006

Related U.S. Application Data

(62) Division of application No. 10/191,261, filed on Jul. 8, 2002, now Pat. No. 7,135,332.

(60) Provisional application No. 60/304,949, filed on Jul. 12, 2001, provisional application No. 60/337,896, filed on Nov. 5, 2001, provisional application No. 60/379,915, filed on May 13, 2002.

(51) Int. Cl.
*C05F 17/00* (2006.01)
*C05F 17/02* (2006.01)

(52) U.S. Cl. .............. 71/9; 435/290.1; 435/294.1; 435/300.1; 165/104.14; 165/104.21

(58) Field of Classification Search .............. 435/290.1, 435/594.1, 300.1; 71/9; 165/104.14, 104.21
See application file for complete search history.

(56) References Cited

U.S. PATENT DOCUMENTS

| | | | |
|---|---|---|---|
| 3,577,678 A * | 5/1971 | Burton | 47/58.1 R |
| 3,895,916 A * | 7/1975 | Rosner | 422/242 |
| 3,953,566 A | 4/1976 | Gore | |
| 3,962,153 A | 6/1976 | Gore | |
| 4,174,371 A | 11/1979 | Bell et al. | |
| 4,187,390 A | 2/1980 | Gore | |
| 4,194,041 A | 3/1980 | Gore et al. | |
| 4,267,664 A | 5/1981 | Henke | |
| 4,302,236 A * | 11/1981 | Roman | 71/9 |
| 4,335,706 A | 6/1982 | Passarelli et al. | |
| 4,494,975 A | 1/1985 | De Boodt et al. | |
| 4,683,940 A | 8/1987 | Ernst et al. | |
| 4,790,445 A | 12/1988 | Shibata | |
| 4,795,711 A | 1/1989 | Nockemann | |
| 4,816,328 A | 3/1989 | Saville et al. | |
| 4,862,730 A | 9/1989 | Crosby | |
| 4,869,877 A * | 9/1989 | Sellew et al. | 435/290.2 |
| 4,932,078 A | 6/1990 | Jones et al. | |
| 4,935,038 A | 6/1990 | Wolf | |
| 4,936,290 A | 6/1990 | Smith | |
| 5,053,124 A | 10/1991 | Liane | |
| 5,129,578 A | 7/1992 | Kokubo | |
| 5,144,940 A | 9/1992 | Fiarkoski, Sr. | |
| 5,206,169 A | 4/1993 | Bland | |
| 5,500,306 A | 3/1996 | Hsu et al. | |
| 5,518,922 A | 5/1996 | Sudrabin | |
| 5,522,769 A | 6/1996 | DeGuiseppi | |
| 5,527,464 A | 6/1996 | Bartha et al. | |
| 5,620,669 A | 4/1997 | Plinke et al. | |
| 5,707,416 A | 1/1998 | Sudrabin | |
| 5,810,903 A | 9/1998 | Branconnier et al. | |
| 5,843,390 A | 12/1998 | Plinke et al. | |
| 5,869,323 A | 2/1999 | Horn | |
| 5,964,221 A | 10/1999 | McKenna | |
| 6,099,613 A * | 8/2000 | Allen et al. | 71/9 |
| 6,110,243 A | 8/2000 | Wnenchak et al. | |
| 6,110,733 A | 8/2000 | Seymour | |
| 6,130,175 A | 10/2000 | Rusch et al. | |
| 6,221,656 B1 | 4/2001 | Smith | |
| 6,341,138 B1 | 1/2002 | Peters et al. | |
| 6,389,757 B1 * | 5/2002 | DeGarie | 52/63 |
| 7,135,332 B2 * | 11/2006 | Ouellette | 435/290.1 |

FOREIGN PATENT DOCUMENTS

| | | | |
|---|---|---|---|
| DE | 2711803 | | 9/1978 |
| JP | 54124363 A | * | 9/1979 |
| JP | 59-229130 | * | 12/1984 |
| WO | WO 0114286 A1 | * | 3/2001 |

* cited by examiner

*Primary Examiner*—William H Beisner
(74) *Attorney, Agent, or Firm*—Reising Ethington P.C.

(57) ABSTRACT

Improved systems, methods, apparatus and compositions for generating, extracting and distributing the renewable heat energy produced by microbial decomposition of organic biomass within a contained and controlled environment. This heat energy is preferably transferred and distributed, preferably by the use of heat pipes, to the interior of a greenhouse or other structure to be heated, either directly or via heat exchange apparatus such as hot water heating systems. In one embodiment heat transfer and distribution mechanism customized to the application requirements of a greenhouse heating batch-type process is disclosed, along with a recipe for a readily available biomass material composition. Additional continuous and batch process embodiments of biomass heating systems are also disclosed that extract heat energy from decomposing biomass for heating uses. In some embodiments gaseous products generated in a biological decomposition process, primarily $CO_2$, are utilized to enhance plant growth in the greenhouse environment.

13 Claims, 26 Drawing Sheets

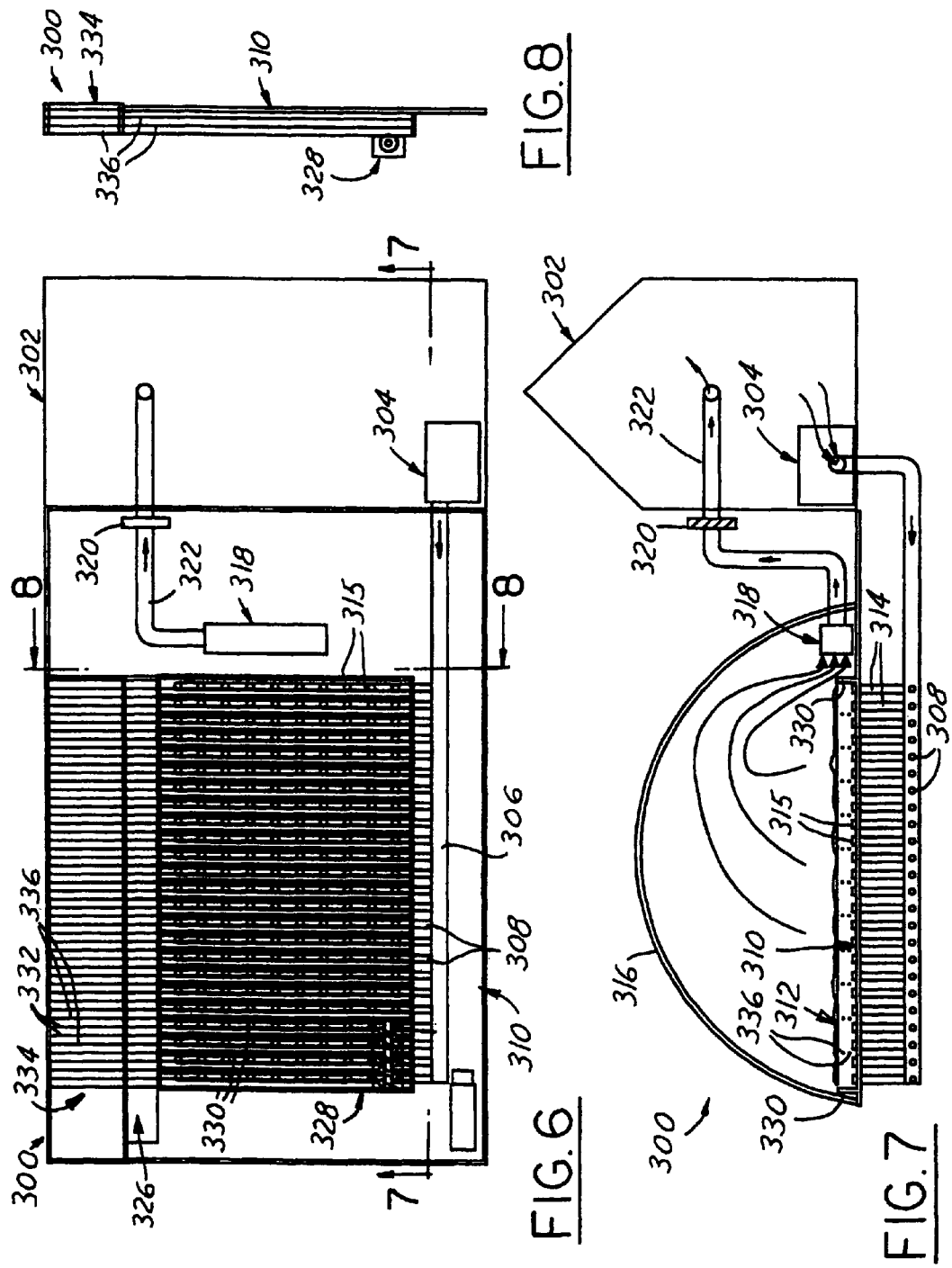

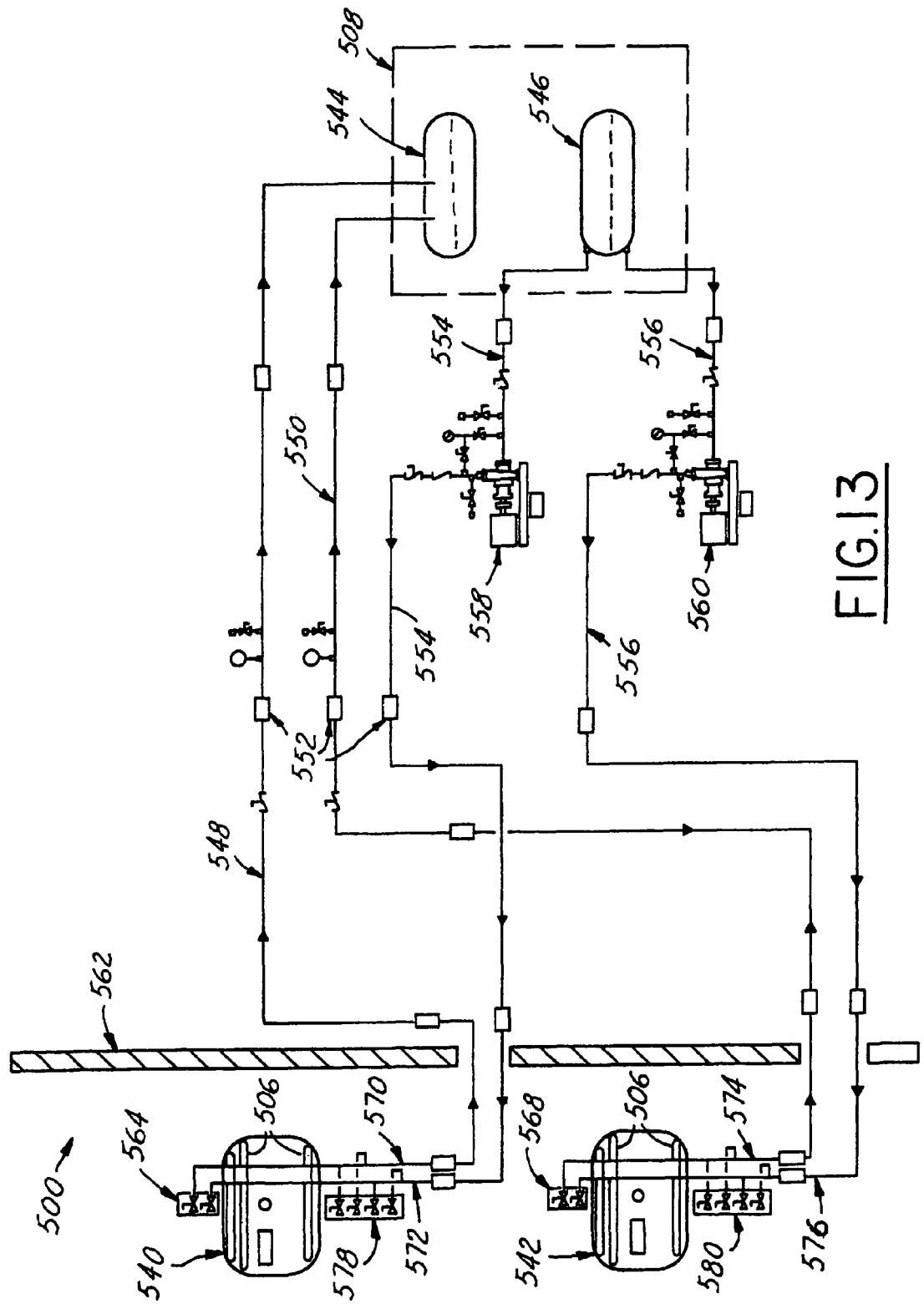

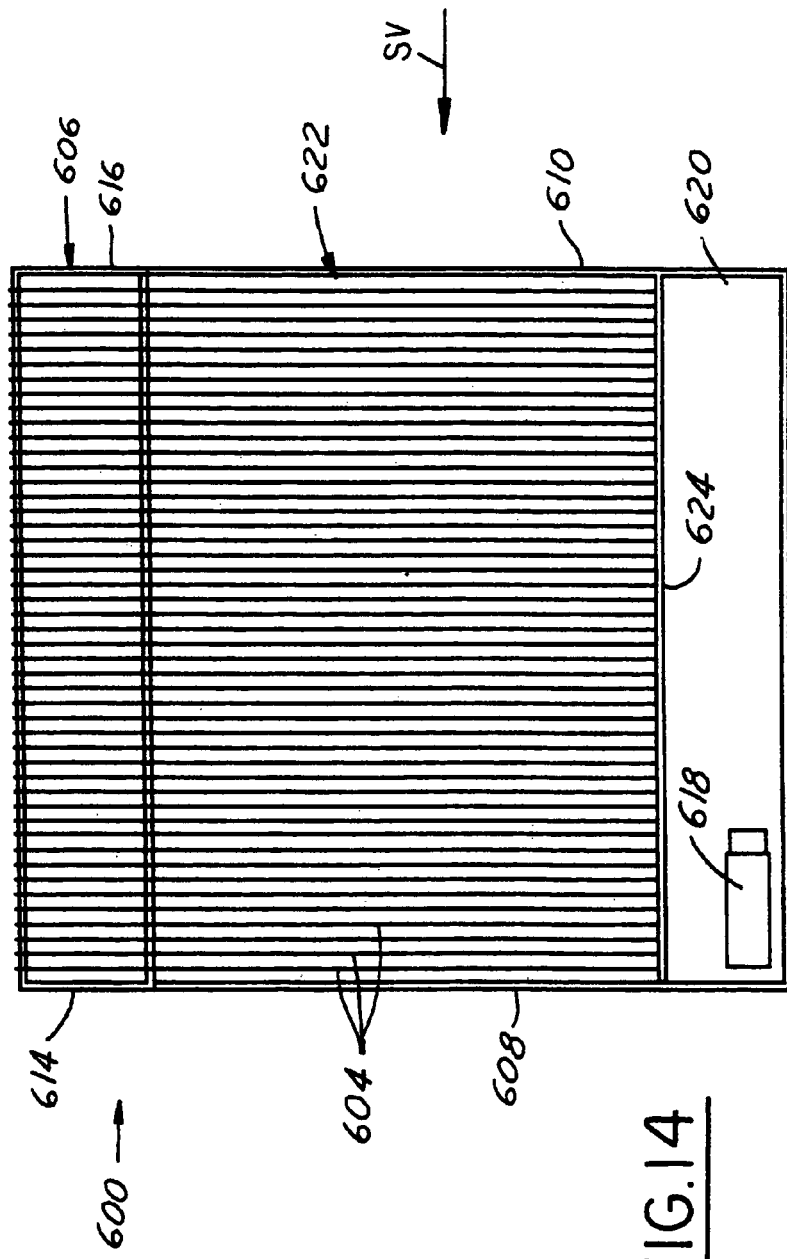
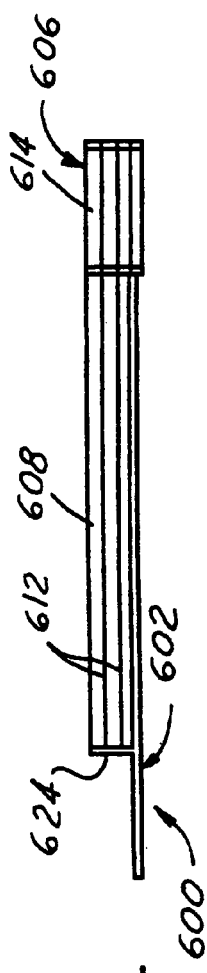
FIG.14
FIG.15

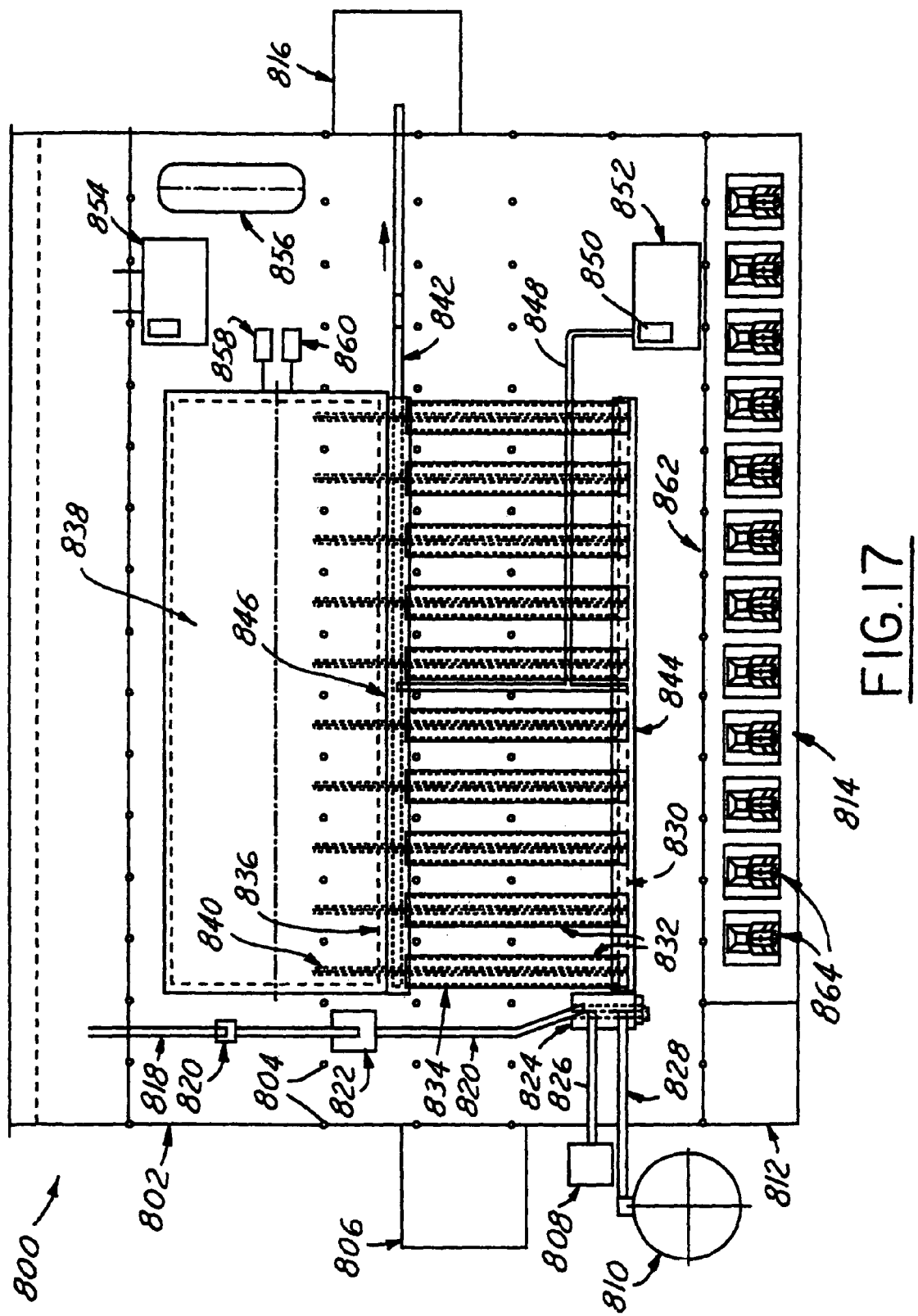

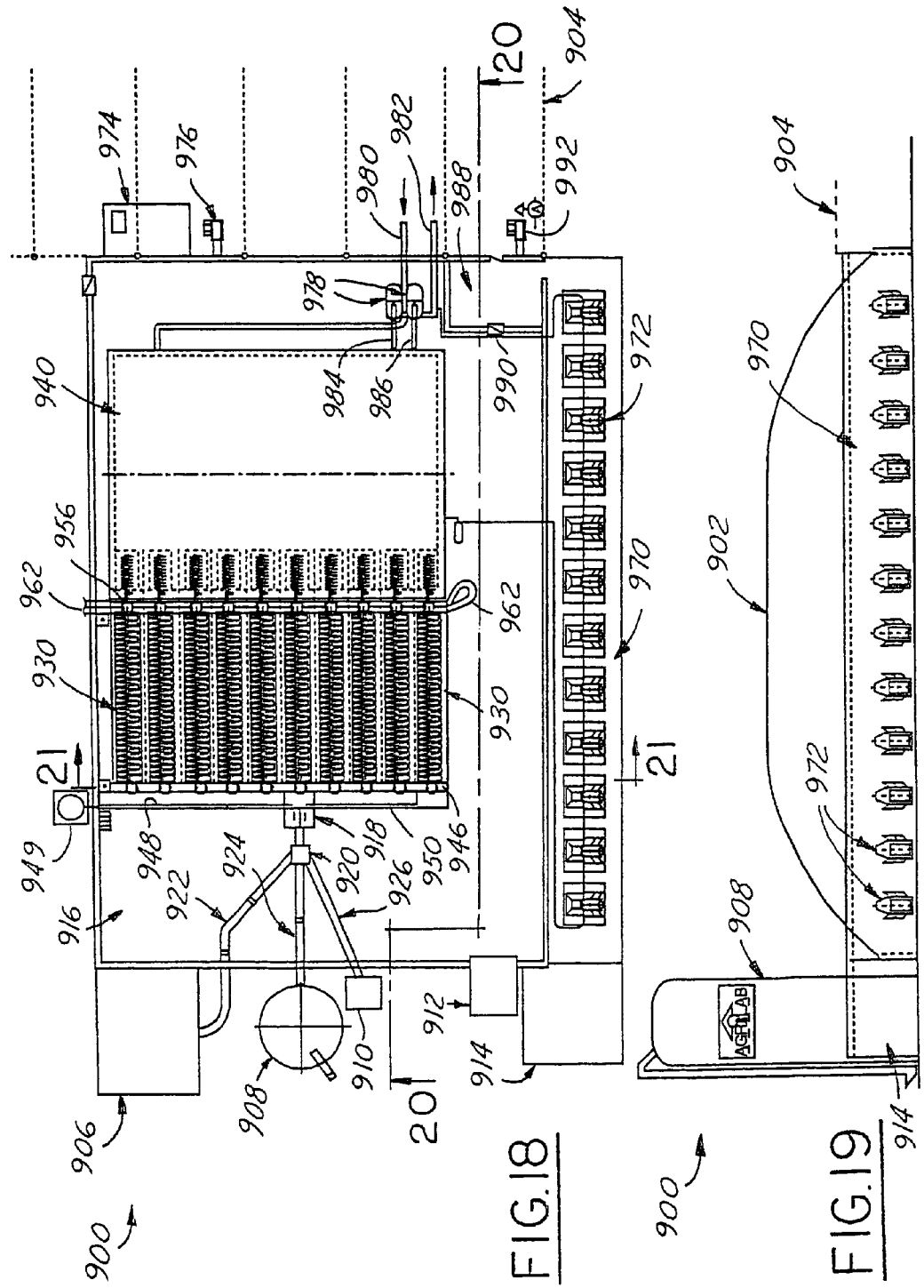

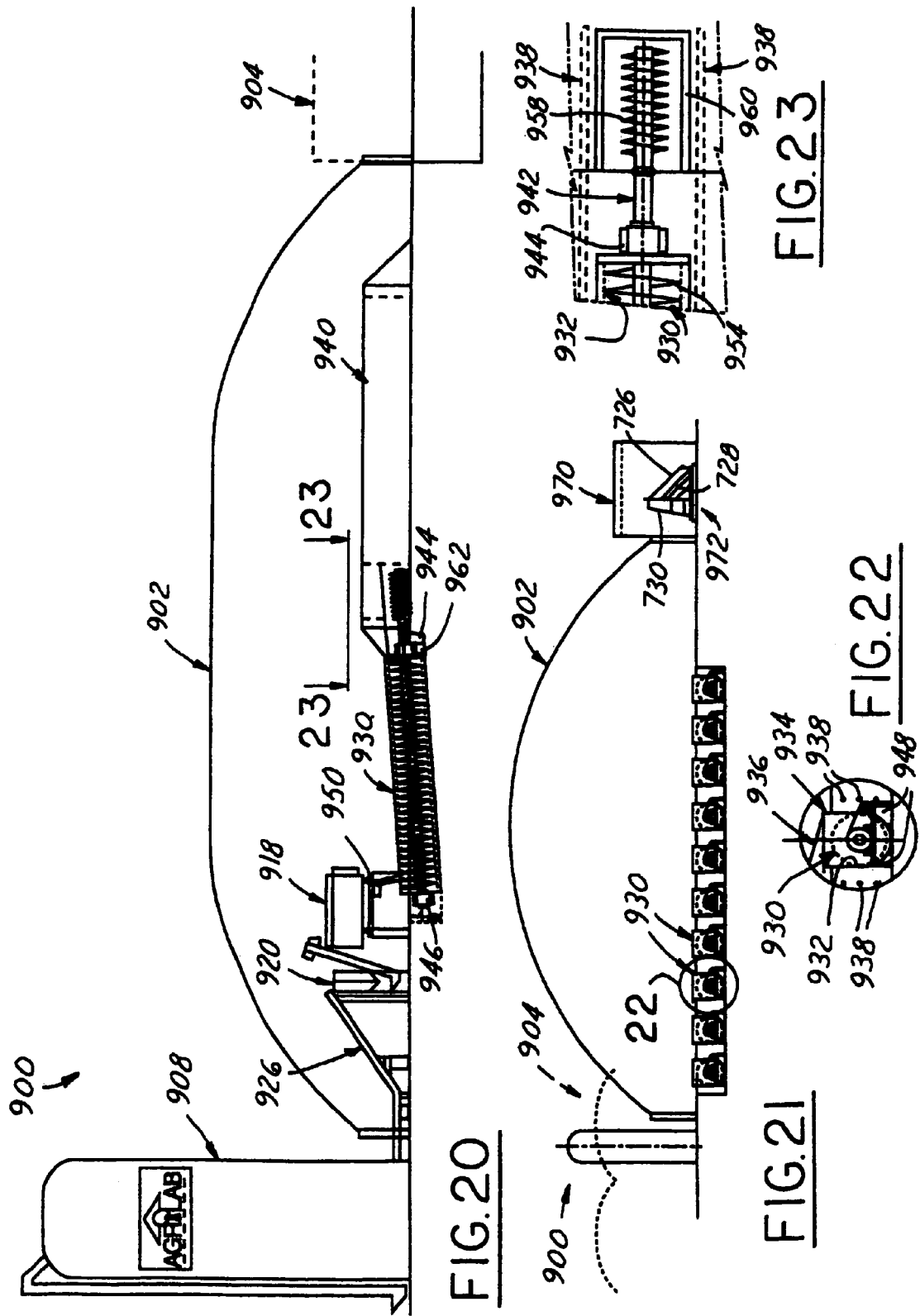

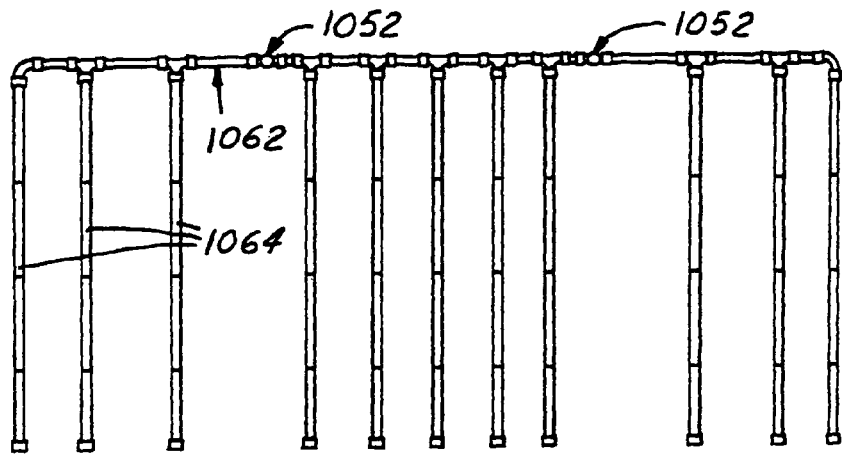
FIG. 34
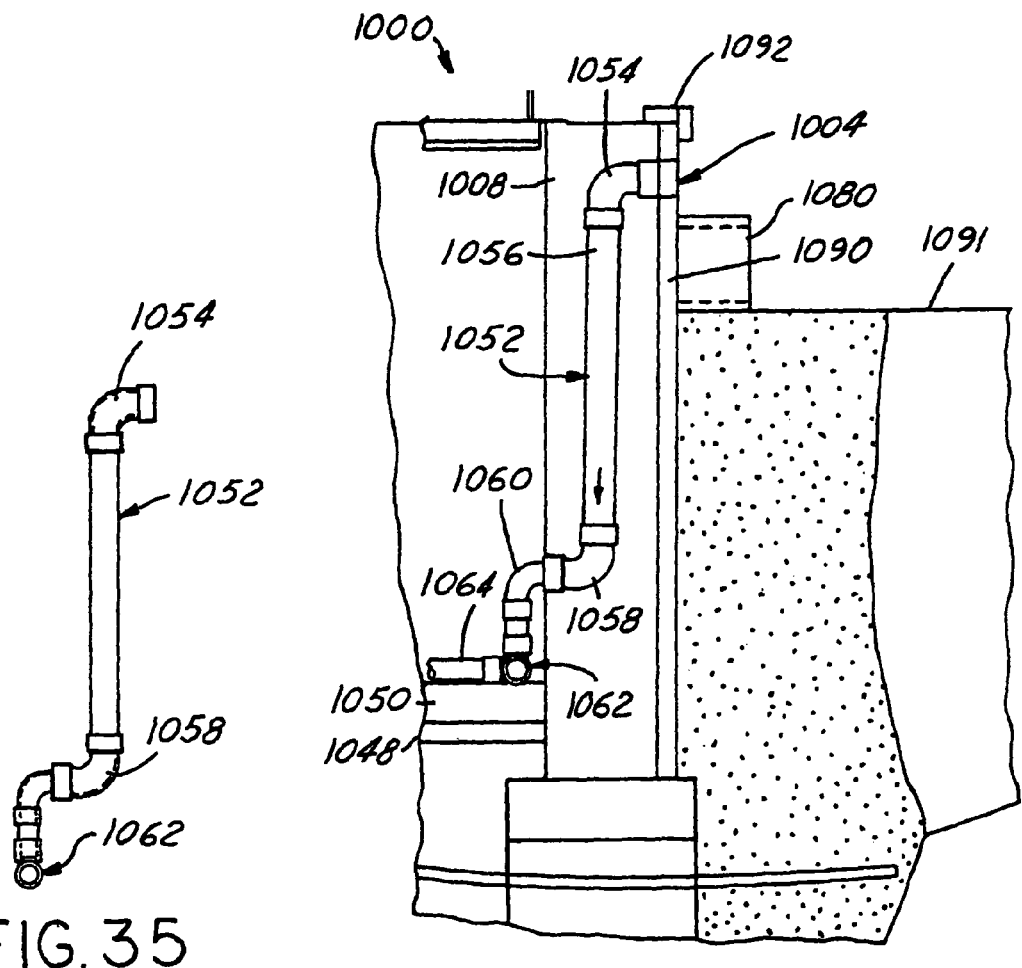
FIG. 35
FIG. 36

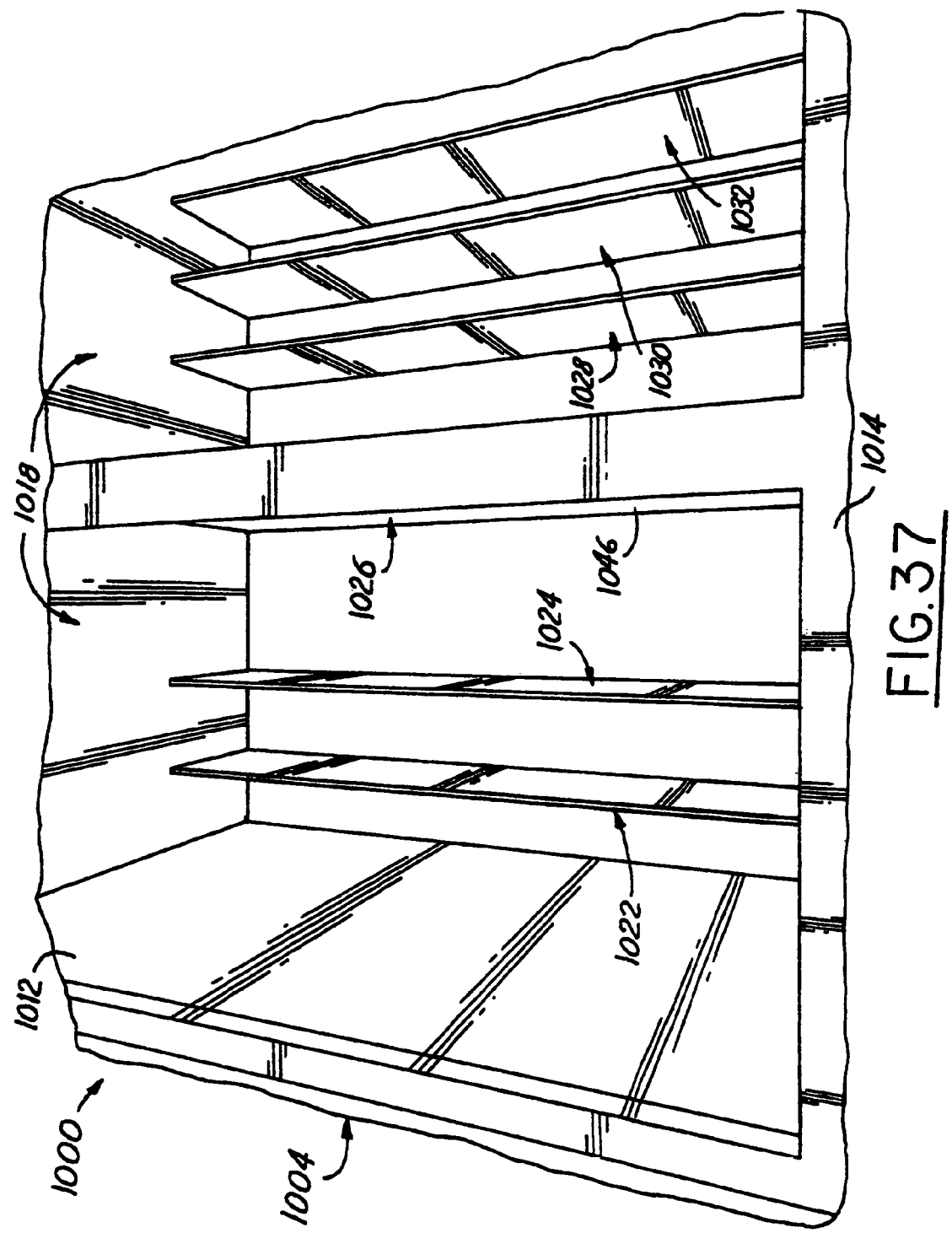

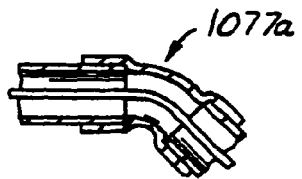
FIG.38A
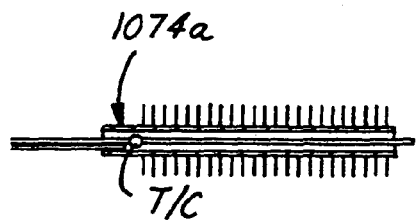
FIG.38
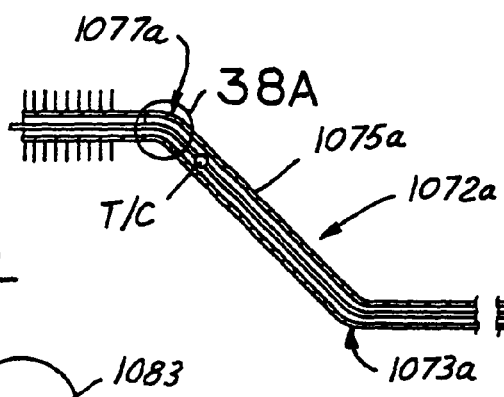
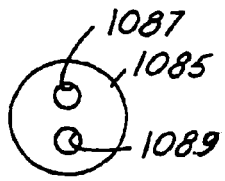
FIG.39
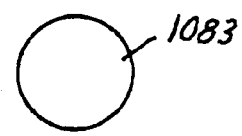
FIG.40
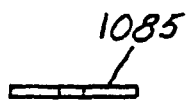
FIG.41
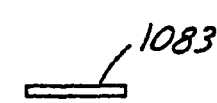
FIG.42
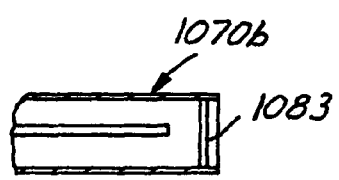
FIG.43A
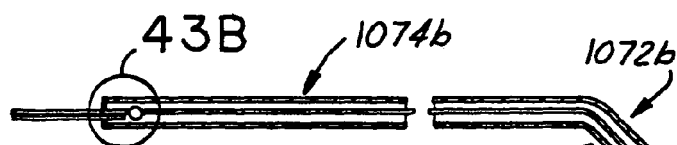
FIG.43
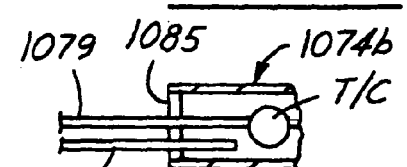
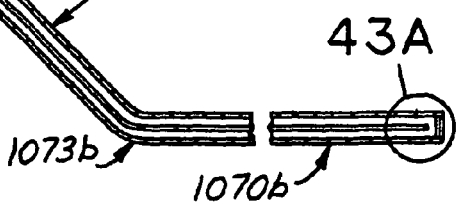
FIG.43B

BIOMASS HEATING SYSTEM

This application is a division of U.S. patent application Ser. No. 10/191,261 filed Jul. 8, 2002, now U.S. Pat. No. 7,135,332 issued Nov. 11, 2006, and claiming the benefit under the provisions of 35 U.S.C. §119(e)(1) of the priority of U.S. provisional utility patent application Ser. No. 60/304,949 filed Jul. 12, 2001; Ser. No. 60/337,896 filed Nov. 5, 2001 and Ser. No. 60/379,915 filed May 13, 2002, all of the aforesaid U.S. patent applications being incorporated by reference in toto herein.

FIELD OF THE INVENTION

This invention relates to methods and apparatus for aerobically decomposing organic materials, primarily agricultural and foodstuff waste products, for the production primarily of heat energy and secondarily fertilizer and other by-products.

BACKGROUND OF THE INVENTION

Many methods and apparatus are known in the art for the purpose of decomposing, in an economical and environmentally acceptable manner, waste products resulting from agricultural and forestry, vegetable production and horticulture, landscape and park maintenance, as well as excrement and the like, by anaerobic fermentation and/or aerobic decomposition and of simultaneously producing a good fertilizer, as well as heat for heating purposes or the like. However, so far as is known, such systems have not been designed, utilized and controlled to primarily develop heat energy for hygienically heating an air space of an enclosed structure, such as a greenhouse, in a passive manner through a self-powered heat transfer mechanism from a biomass material heat generating source.

The most common method of heating a greenhouse in a commercial setting is with the use of fossil fuels such as natural gas, fuel oil, etc. However, there is an on-going need for any alternative that will provide a more efficiently controlled interior environment suitable for plant production. It has long been known that burning biomass will generate energy that can reduce dependency on fossil fuel sources. However, environmental and economical restrictions have impeded these developments within the commercial industry. Burning biomass, in itself, can be viewed as an inefficient use of energy; the fuel is consumed quickly, causing a rapid energy release, much of which can be lost up the exhaust stacks.

The present invention, therefore, has responded to the challenge to research a renewable and environmentally sustainable alternative, and has done so by extracting the heat of decomposition from biomass over an extended period of time. This passive system of the invention thus provides a significant means of respite to the energy intensive greenhouse industry.

Under normal circumstances, the basic principles of composting are quite simple and adhering to them will result in an efficient and successful outcome. Composting has become an excellent way to manage certain wastes responsibly, prevent the wasting of natural resources, and produce a value-added, inexpensive soil amendment product. Composting also generates another valuable resource that may be recaptured and re-used, namely, heat energy.

However, harvesting this heat energy source for a commercial use such as greenhouse heating, presents new challenges. This form of heat energy is unlike any standard within the heat transfer industry. To heat a greenhouse structure from this heat energy source, it must be viewed in three separate components:
 a) heat energy generation,
 b) heat transfer, and
 c) heat distribution/use.

Heat distribution and use within a greenhouse facility is well documented with much information and data available. However, modifications should be pursued to enhance heat retention and use within these structures to maximize the heat re-capture benefits.

The most critical and difficult challenge in the development of the present invention comes in the heat energy generation phase. It has been proven that temperatures, in the best enhanced aerobic composting situations, can reach up to 180° F. by intensive aeration (oxygen replenishment) on a continual basis; this methodology is commonplace in the production of compost as a growing media used in mushroom operations. These high composting temperatures are a requirement for the safe destruction of any contained pathogens within the organic composting components used in mushroom growing operations. However, this particular method of composting may not be practical for the purpose pursued in the system of the invention because of the constant need to, in mushroom operations, mechanically aerate by turning and fluffing the piles or windrows. This form of composting is very rapid, causing the components to be "consumed" very quickly.

The underlying challenge in each case is to establish composting systems that will function within the designed confinement criteria. For greenhouse heating the need is for presenting a consistent temperature range of 140°-160° F., sustainable for a practical time frame of up to 20 weeks, while mitigating the negative effects of the generated by-products. Compost component selection, means of aeration, moisture content maintenance, and by-product management are all of great importance to the development of a satisfactory biomass heat generation system that can present a suitable and affordable alternative to traditional heat energy sources, while demonstrating a positive effect on the environment. Further, to successfully accomplish this goal, engineering designs of the heat transfer and distribution systems need to be successfully customized to the needs of the particular and varying structural applications and parameters.

OBJECTS OF THE INVENTION

Accordingly, among the objects of the present invention are to provide an improved system, method and apparatus operable to economically produce heat energy in a controlled manner by decomposition of biomass material in an environmentally safe and sound manner and to automatically utilize such heat energy for hygienically heating a closed interior structure, such as a greenhouse, preferably without the requirement of any external power source or fuel other than the biomass material being decomposed.

In simplistic terms, one primary goal of the invention is to develop an economical, environmentally friendly heating system, which will promote and sustain plant growth within a greenhouse (or any other structure).

Another objective is to assist greenhouse and other agricultural, commercial and industrial operations in reducing dependency on natural gas as a primary energy source and to harvest the economic efficiencies of nature's own renewable biomass resources.

A further object is to render the foregoing technology transferable to many other heating applications within the rural and agri-business communities, such as farm workshops, livestock facilities, military bases, facilities in the pulp and paper industry, etc.

SUMMARY OF THE INVENTION

In general, and by way of summary description and not by way of limitation, the invention accomplishes the foregoing and other objects and goals by providing, in several preferred but exemplary embodiments, improved systems for generating, extracting, and distributing the renewable heat energy produced by microbial decomposition of organic biomass within a contained and controlled environment. The heat energy is generated in a biological decomposition process, and then transferred and distributed, preferably by the use of heat pipes, to the interior of the greenhouse or other structure to be heated.

In this undertaking, and in developing the invention, a test apparatus was constructed as one of the foregoing embodiments of the invention to be used on a continuing basis as a container to promote, monitor, and regulate the decomposition of various selected biomass materials. Heat energy generation properties from the biological decomposition process were evaluated using a variety of organic matrixes while, at the same time, a heat transfer and distribution mechanism was customized to the application requirements of this batch-type process for complimenting the natural exertion of microbial activity. One important goal has been to ascertain a readily available biomass material that will slowly decompose while it generates a substantial quantity of usable heat energy to be consumed in the elevation of temperature in a separated confinement area. The operating environment for this decomposition process is monitored and sometimes regulated to successfully enhance heat generation performance and maximize biomass decomposition service lifetime.

This effort also has successfully resulted in providing several various embodiments of unique heat transfer, retention and distribution systems that can extract heat energy from a detached decomposing biomass pile to heat an enclosed environment, and in some instances one that will maintain and promote plant life within a greenhouse (or any other) structure. The heat energy is generated in the biological decomposition process, and then transferred and distributed by, in most applications, the use of heat pipes to the interior of a greenhouse or other structures, either directly or via heat exchange apparatus such as hot water heating systems. In addition, in some embodiments, gaseous products generated in a biological decomposition process, primarily carbon dioxide ($CO_2$), are captured and utilized to advantage to augment and enhance plant growth in the greenhouse environment.

BRIEF DESCRIPTION OF THE DRAWINGS

The foregoing and other objects, as well as features and advantages of the present invention, will become apparent from the following detailed description, claims and appended drawings (which are to engineering scale unless otherwise indicated) wherein:

FIGS. 6, 7 and 8 are simplified semi-schematic layouts of a biofilter biomass air and water heating system third embodiment of the present invention, FIG. 6 being a plan view, FIG. 7 being a vertical section taken on the line 7-7 of FIG. 6 and FIG. 8 being an end view projected off the right hand end of FIG. 6 as viewed in the drawing.

FIGS. 11, 12 and 13 are respectively a fragmentary plan view, a fragmentary perspective view and a piping schematic layout of a fifth embodiment system of the invention applied to a typical hockey ice rink construction.

FIGS. 14 and 15 are respectively semi-schematic plan and right hand end side views illustrating a sixth embodiment biomass heating system of the invention.

FIG. 17 is a simplified plan view layout of an eighth embodiment biomass heating system in accordance with the invention.

FIG. 18 is a simplified plan view layout of a ninth embodiment biomass heating system of the invention.

FIG. 19 is a simplified elevational view of the south side of the thermal engine plant shown in FIG. 18.

FIGS. 20 and 21 are simplified cross sectional views respectively taken on the lines 20-20 and 21-21 of FIG. 18.

FIG. 22 is a simplified fragmentary view that is an enlargement of the portion of FIG. 21 encompassed by the circle 22 therein.

FIG. 23 is a simplified fragmentary view taken on the line 23-23 of FIG. 20.

FIG. 30A is a fragmentary enlarged view of the portion of FIG. 30 encompassed by circle 30A in FIG. 30.

FIG. 31A is a fragmentary enlarged view of the portion of FIG. 31 encompassed by the circle 31A in FIG. 31.

FIG. 34 is a plan view of the manifold and branch PVC aeration conduits employed in the greenhouse basement pit, the same being shown by themselves.

FIG. 35 is a side elevation view of an air inlet feed pipe subassembly of the aeration system employed in the biomass pit, shown by itself.

FIG. 36 is a simplified fragmentary vertical cross sectional view taken through one of the S-patterned inlet feed pipes of the aeration system shown installed in the biomass basement pit structure.

FIG. 37 is a fragmentary perspective view looking into the biomass pit of the tenth embodiment construction illustrating the exposed vertical fins of L plates embedded in the concrete floor of the pit.

FIG. 38 is a simplified fragmentary cross sectional view of a finned form of heat pipe employed in the tenth embodiment construction.

FIG. 38A is a fragmentary cross sectional enlargement of the portion of FIG. 38 encompassed by the circle 38A in FIG. 38.

FIGS. 39 and 40 are plan views of the left hand and right hand end plug cap plates of the heat pipe shown in FIG. 38.

FIGS. 41 and 42 are side views of the cap plates shown in FIGS. 39 and 40 respectively.

FIG. 43 is a fragmentary cross sectional view of an unfinned form of heat pipe employed in the tenth embodiment.

FIG. 43A is a fragmentary enlargement of the portion of FIG. 43 encompassed by the circle 43A therein.

FIG. 43B is a fragmentary enlargement of the portion of FIG. 43 encompassed by the circle 43B therein.

DETAILED DESCRIPTION OF PREFERRED EMBODIMENTS

General System Description of First and Second Embodiments

Summary Description

Figure 1:
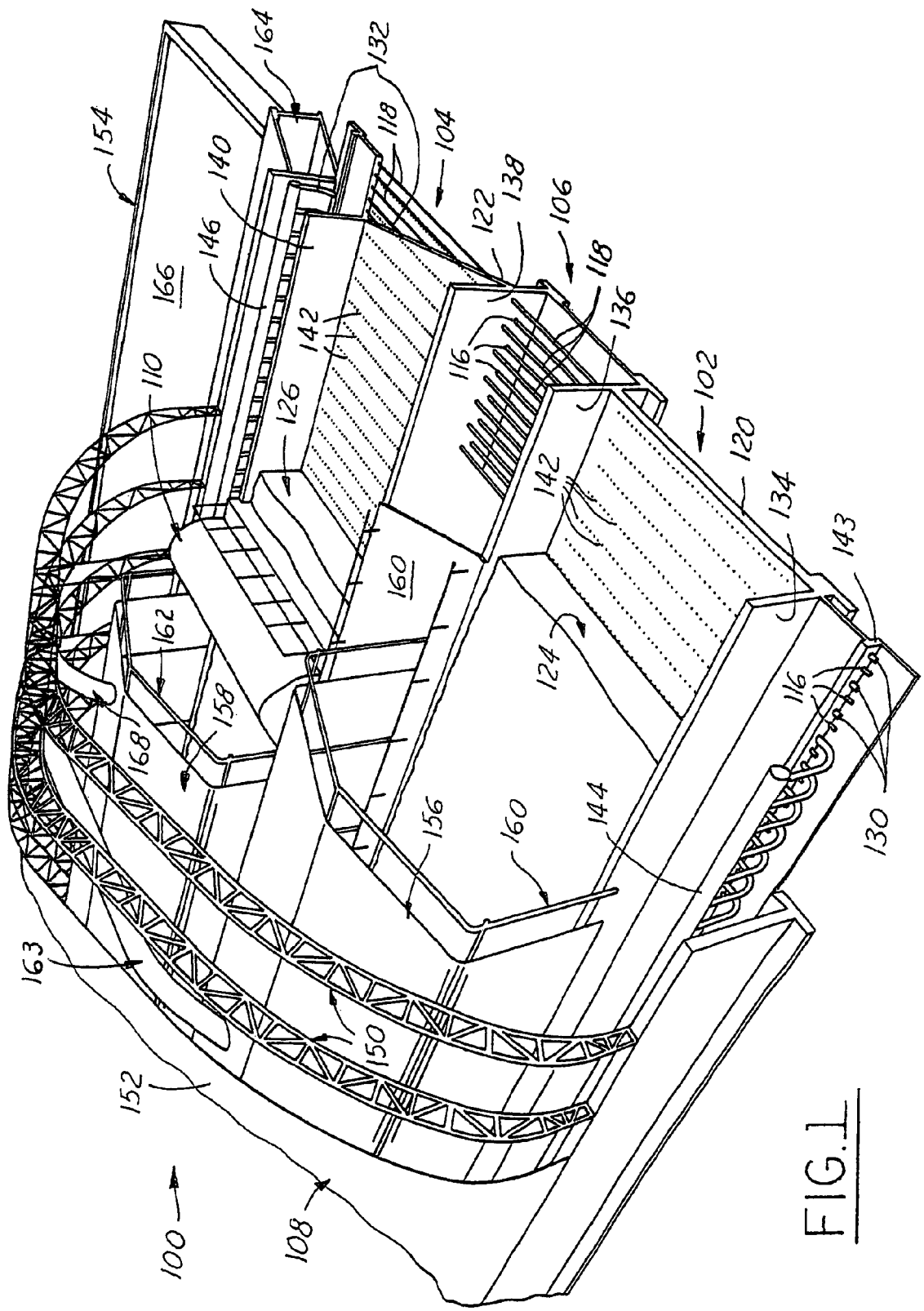
FIG. 1 is a simplified fragmentary perspective view of a first embodiment thermal energy plant operable (also referred to hereinafter as a "thermal engine" or "thermal engine plant") as a biomass heating system and utilizing a "positive" air flow system in accordance with the invention.
Figure 2:
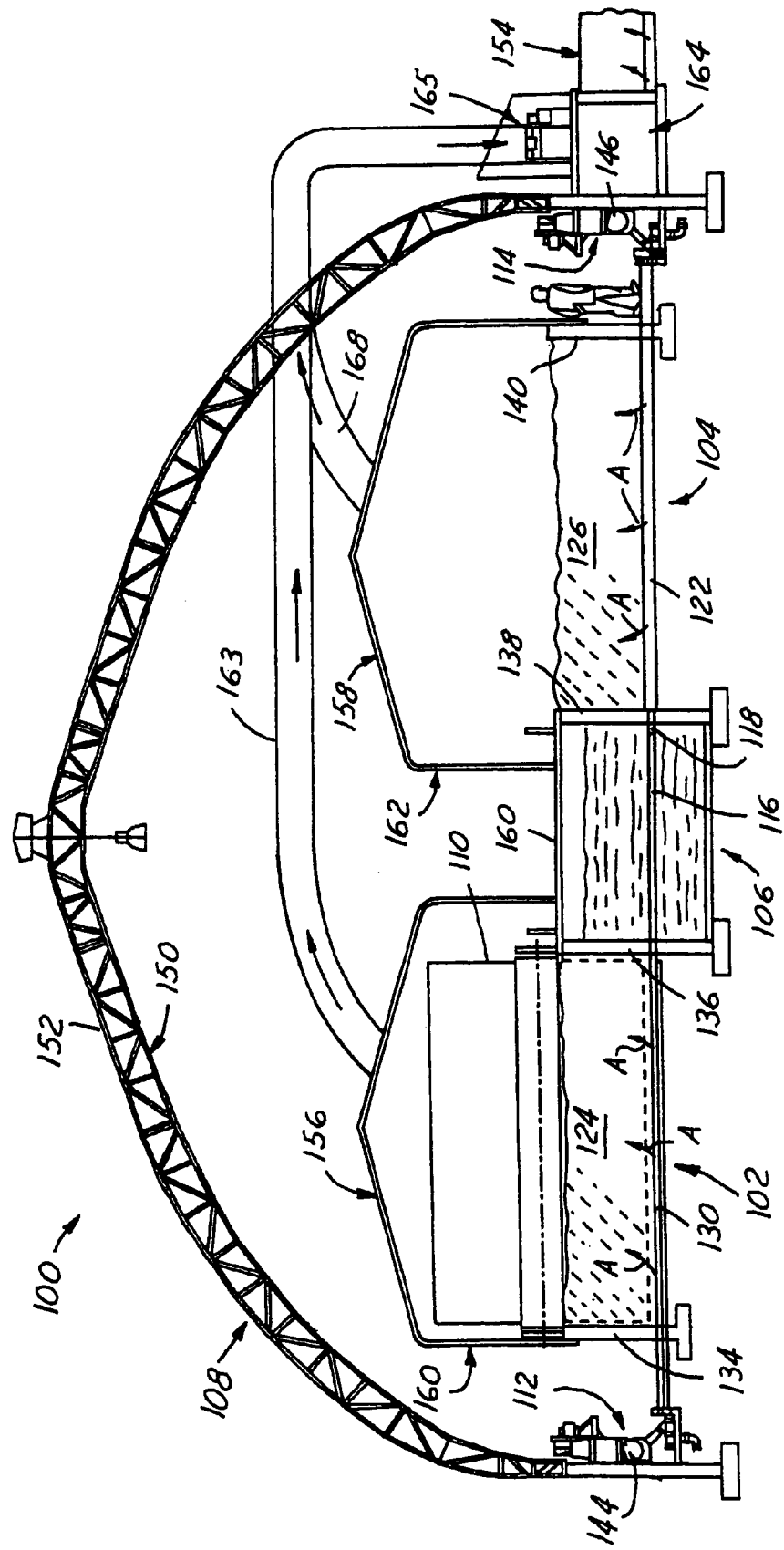
FIG. 2 is a simplified vertical cross sectional view of the first embodiment thermal engine plant of FIG. 1.
Figure 3:
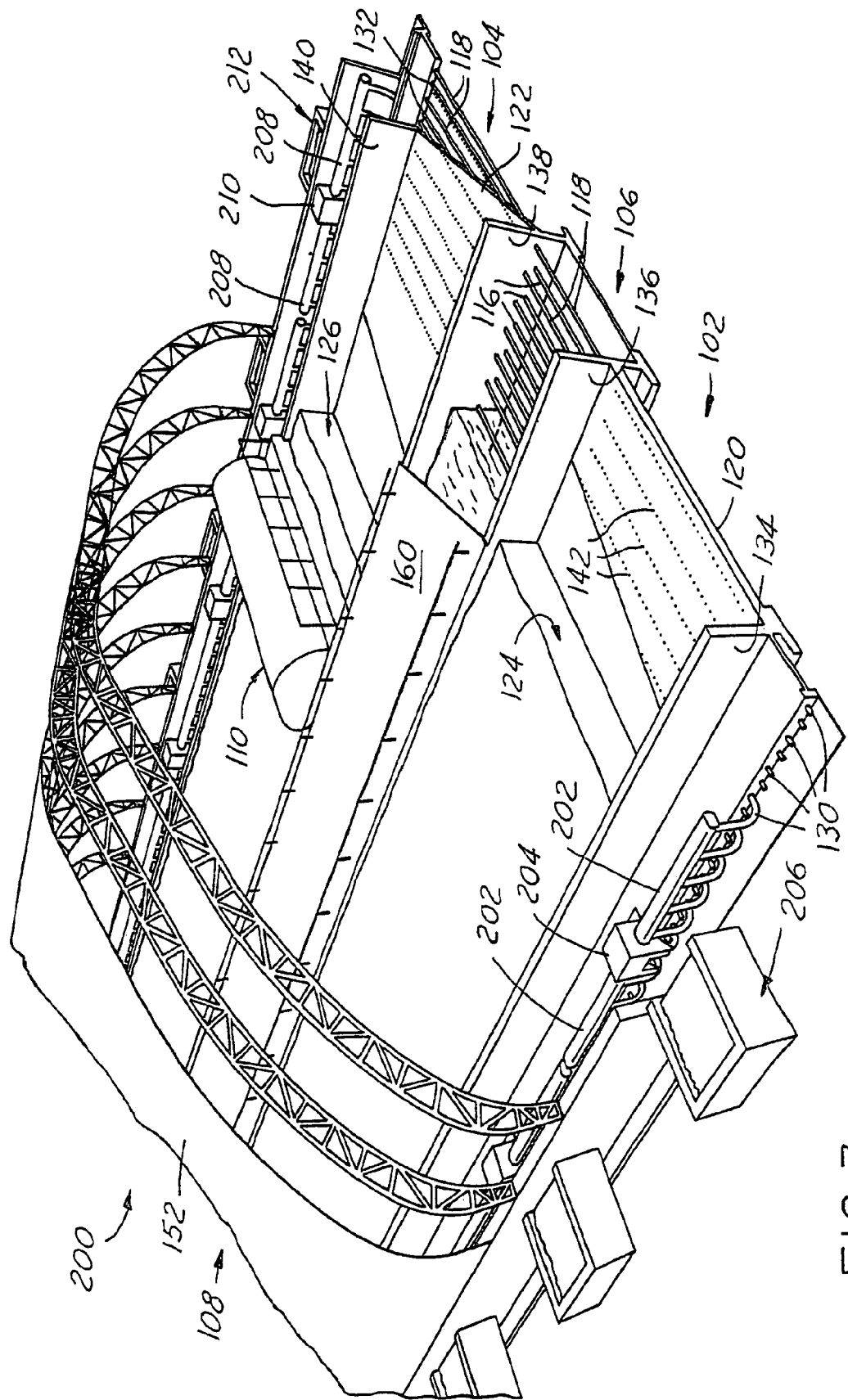
FIGS. 3 and 4 are simplified fragmentary perspective and vertical cross sectional views respectively similar to FIGS. 1 and 2 but illustrating a second embodiment thermal engine plant utilizing a "negative" air flow system.
Figure 4:
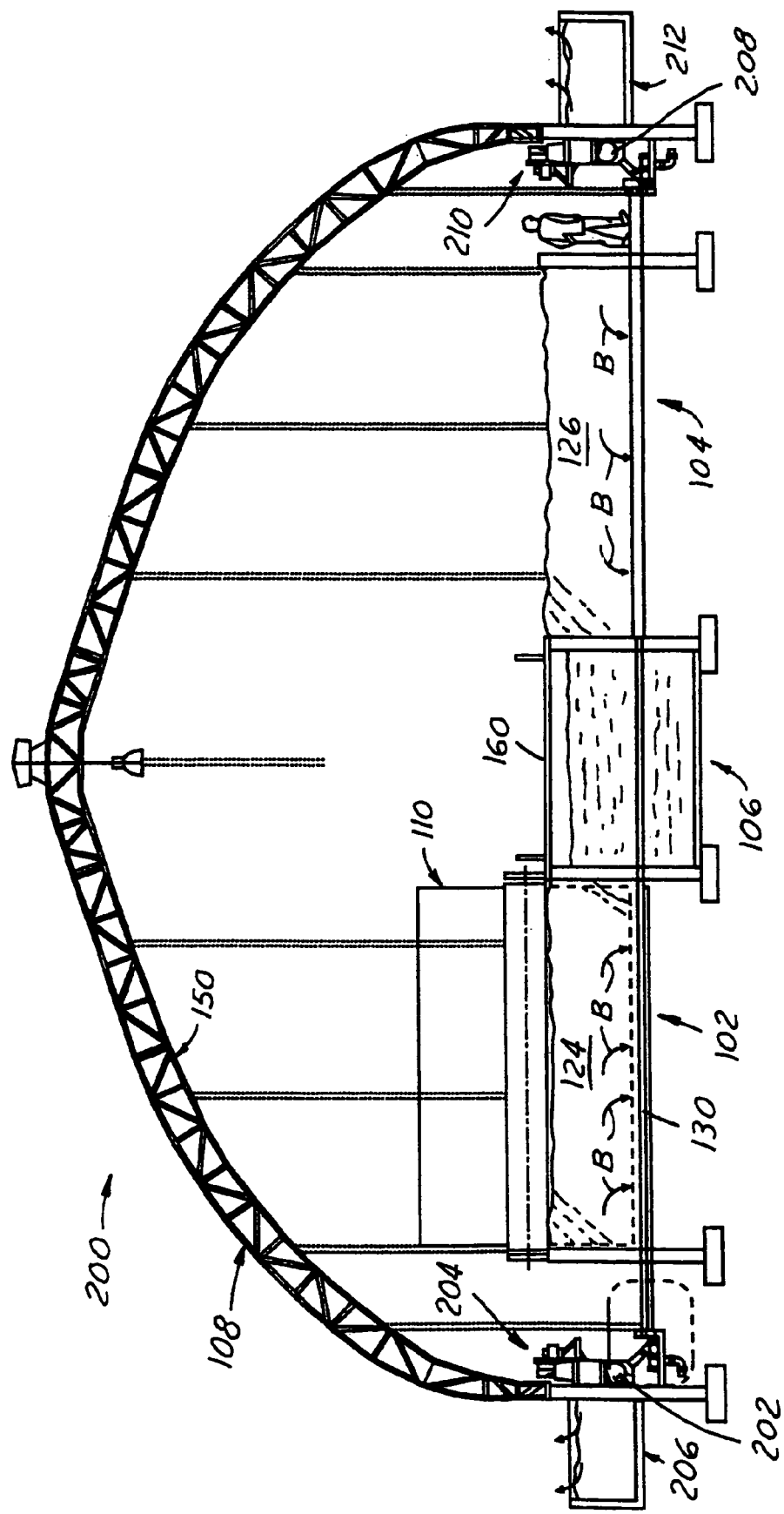
Figure 5:
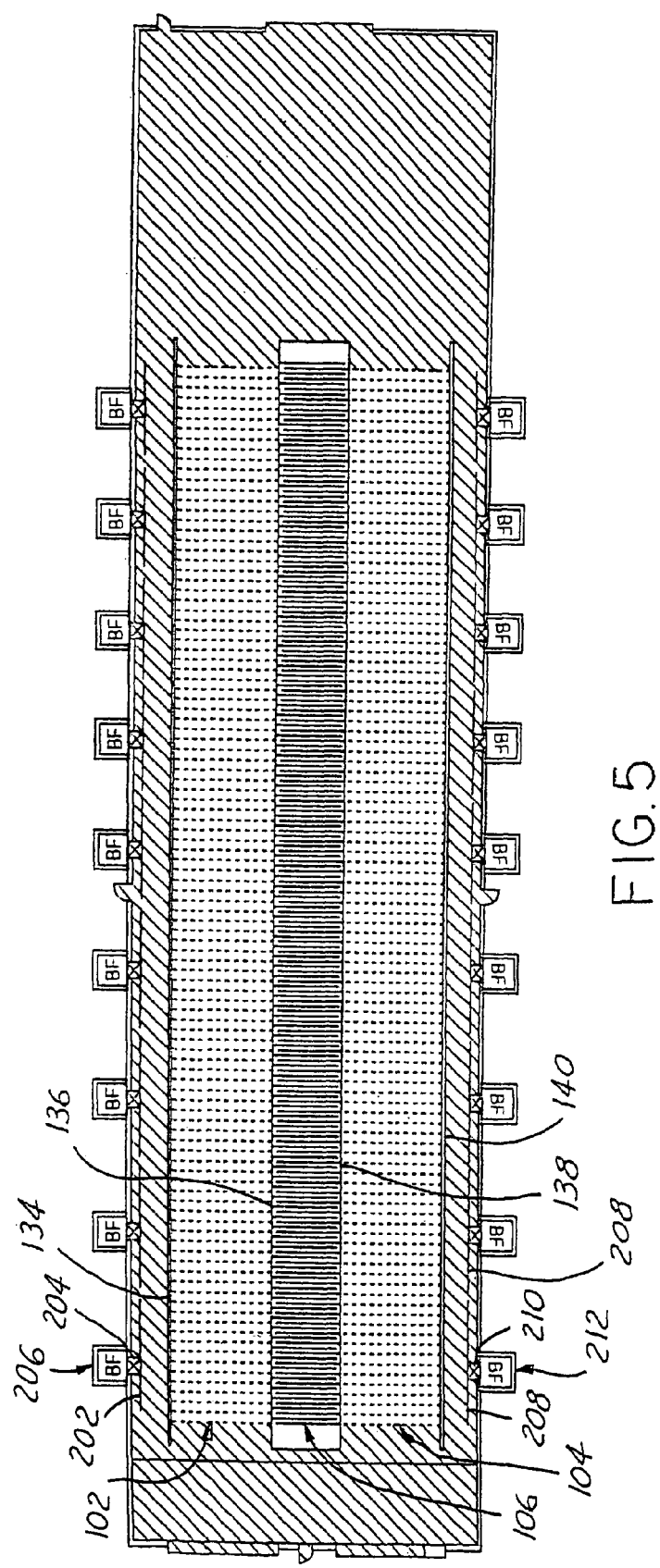
FIG. 5 is a simplified top plan view of the second embodiment plant of FIGS. 3 and 4.

FIGS. 1 and 2 illustrate a first embodiment of a large scale biomass heating system designed for hot water heating of a large building, such as a large greenhouse, and FIGS. 3, 4 and 5 illustrate a presently preferred second embodiment of a biomass heating system of the invention, similar to the first embodiment except as noted hereinafter. Note that these embodiments of the system of the invention provide apparatus and methodology for optimizing the generation of heat energy from a biomass material, as its primary objective, with the resultant converted biomass material end product being only considered a by-product, but nevertheless a useful compost by-product of the system.

Referring to the first embodiment shown in FIGS. 1 and 2, a thermal energy plant 100 designed in accordance with the invention for performing the method of the invention is shown in a fragmentary perspective view in FIG. 1 and in a vertical cross sectional view in FIG. 2.

This thermal energy plant 100 is designed, by way of preferred example, to generate up to 43,000 Gigajoules (Gjs) of heat energy annually from 700 tons of composting biomass in continuous flow operation. The system is designed to process 16.5 tons of organic material per day (6 days/week) or 5,200 tons of organic waste per year. The system includes the construction of two aerated concrete composting channels 102 and 104 that each contain an aeration system and a heat transfer system. A water storage tank 106 between the two composting channels is the storage tank for the heat energy transferred from the composting biomass. The system is enclosed in a 70 ft. wide by 250 ft. long MegaDome roof system 108. Equipment includes a commercially available compost turner 110 with a transfer carriage (not shown), full aeration system for the channels including associated blowers 112, 114 (FIG. 2) and blower controls (not shown).

The key components of this system, by way of an exemplary working design, thus include:

(a.) Two 220 ft. long concrete composting channels 102 and 104 that are 20 feet wide by 5 feet high.

(b.) One 8 ft. deep by 12 ft. wide covered water storage tank 106 between the two composting channels 102 and 104.

(c.) An in-floor aeration system capable of positive (FIGS. 1 and 2) or negative (FIGS. 3-5) aeration.

(d.) ISOBAR® brand thermal diode heat pipes 116 and 118 respectively embedded in floors 120 and 122 of channels 102 and 104 and operable to transfer heat energy only one way, namely, from the compost masses 124 and 126 to the water storage tank 106.

(e.) Centrifugal blowers 112, 114 controlled by timers and temperature feedback that provide the oxygen for composting.

(f.) A full leachate collection system utilizing the in-floor aeration system conduits 130 and 132 under the composting channels 102 and 104 respectively to collect any excess moisture from the composting material.

(g.) A 250 feet long by 70 feet wide MegaDome roof system 108 covering the concrete composting channels 102 and 104 and the transfer carriage.

(h.) One ROTO-KING™ brand compost turner 110 powered by a 25 hp electric motor (i.) One ROTO-KING™ brand transfer carriage (not shown) to move the compost turner 110 from one channel to the next The Mixer/Blender for Preparing the Composting Material The organic waste used for heat generation can include all types of organic waste. The organic waste is preferably mixed with a bulking agent in, for example, a commercially available 400 cubic foot vertical auger mixer (not shown). This mobile mixer typically requires a power take-off drive from 60 to 80 hp farm tractor as its power source. Such vertical auger mixers are being used successfully in the animal feed and composting industry.

The mixer is preferably located outside of the compost building in a receiving/mixing area. The organic waste and the bulking agent are preferably loaded daily into the mixer using an industrial loader (not shown). A built-in scale allows the operator to create the required mix. The blending process takes between 5 and 15 minutes. During the mixing process, the augers of the mixer unit thoroughly mix all of the ingredients.

After a set period of mixing, the auger mixer is moved across in front of one of the composting channels. A suitable conveyor (not shown) then is used to empty the blended product at the front of the one channel.

The Composting Channels

The composting system itself of the thermal energy plant 100 consists of the two aerated concrete composting channels 102 and 104. Each channel as shown is 5 feet high, 20 feet wide and 220 feet long. The blended organic waste is placed in the first 9 feet of each composting channel. Preferably, by way of a working example, over a period of eight weeks, composting material 124, 126 is incrementally moved from one end of each channel 102 or 104 to the other end with each pass of the compost turner 110 in that channel. The compost turner moves the material 9 feet with each pass. Preferably the turner moves through each channel three times per week. After eight weeks, the composted material is removed from the other end of each of the channels.

This compost system also has the option to be operated as a batch composting system, where the entire channel is filled with material at one time. This requires a suitable loader to drive into the channels for loading and unloading.

The Compost System Capacity

As indicated hereinabove, three times weekly a 9-foot section of each channel 102 and 104 is opened by the action of the turner 110. The yearly volume capacity of this exemplary thermal energy plant design is 10,400 cubic yards per year. This is equivalent to approximately 5,070 tonnes per year or 100 tonnes per week at a bulk density of 650 Kg per cubic meter.

If this facility is operated as a batch system, the capacity of each channel is 800 cubic yards. The turner then works in both directions to keep the material worked over in the channels.

Heat Generation Capacity

Assume that 1 ton of biomass generates 3,375,000 BTUs within a 21 day thermophilic composting period. This translates to 160,700 BTUs per day. This exemplary facility capacity is 700 tonnes in continuous composting, which means that approximately 160,700×700 tonnes=112,490,000 BTUs of total heat energy is generated daily. Converting this heat energy generation to GJ gives 118.7 GJ per day (947,813 BTU per GJ). Assuming that a significant portion of this heat energy can be captured and transferred to an associated adjacent building, such as a greenhouse, there is a substantial amount of heat energy available.

The Compost Turner

The ROTO-KING™ compost turner 110 mixes and moves composting material sequentially in the 5 feet deep and 20 feet wide concrete composting channels 102 and 104. It rides along the top of the upright concrete sidewalls 134 and 136 of channel 102 (and likewise walls 138 and 140 of channel 104), and is powered by a 25 hp electric motor. Long paddles (not shown) reach to the bottom of the channel, mixing and moving the material 9 feet with each pass as the paddles revolve around the axis of the rotating support and drive shaft and. The turner moves forward at a travel rate of between 2 and 3 ft. per minute, depending on the load.

A conventional PLC controls action of turner 110. The turner moves forward from the transfer carriage, located at the finishing or output end of the associated channel 102 or 104. It moves toward the front or input end of such channel where the raw organic waste is being placed. Limit switches on the front of each channel stop the turner when it reaches the front of the channel being worked. The turner paddle arms stop, lift out of the compost and the turner moves backward along the worked channel at a speed of 20 feet per minute. It is then transferred from the output end of one channel to the next using the electrically powered transfer carriage. The carriage traverses along to the output end of the next channel in a steel track in the floor. When the carriage reaches the next channel, the turner moves off the carriage, lowers its revolving arms and begins turning compost.

When operated as a batch system, the compost turner 110 can turn composting material in both directions. It can then move down one channel and back on the next channel. This preferably requires a transfer carriage on both ends of the channels.

The Aeration System

An important feature of this composting system is the aeration system in each channel floor 120 and 122. There are, for example, six separate aeration zones along the length of each channel, with each aeration zone thus being 35 feet long in the design of FIGS. 1 and 2. The aeration system utilizes as air flow conduits a series of holes 142 aligned in rows in the concrete channel floor that communicate with associated row-aligned outlet holes in the associated PVC aeration pipes 130 that are embedded into the concrete channel floor.

The aeration system can be either negative (air and moisture move downward through the compost; FIGS. 3-5), or positive (air is brought up in through the floor and moves upward through the composting material; FIGS. 1 and 2). A separate header 144 and 146 and blower 112 and 114 for channels 102 and 104 respectively provide air to each aeration zone according to the requirements of the composting process. Each aeration pipe 130, 132 has radial holes drilled along its embedment length that are engineered by way of graduated orifice dimensions to deliver the same amount of air along the length of each aeration pipe. In the positive system set up of FIGS. 1 and 2, the header pipes 144, 146 deliver air from the associated blowers 112, 114 to the associated aeration pipes 130 and 132 at the bottom of the respectively associated channels 102 and 104. These centrifugal blowers are controlled by timers and temperature feedback that can be set to control the temperature of the composting mass.

The Heat Capture System

The heat capture system consists of ISOBAR® brand heat pipes 116 and 118 embedded in the respective channel concrete floors 120 and 122 and arrayed parallel and laterally spaced at 24" intervals. Each heat pipe extends at its inboard end into the 8 ft. deep×12 ft. wide water storage tank 106 located between the two composting channels 102 and 104. The heat energy being generated by the composting material is transferred to the water storage tank using these heat pipes embedded in the channel floors. The water storage tank is sealed on the inside to minimize leakage. The water in the storage tank is preferably used to supplement the existing water heating system in the associated greenhouse or other building or enclosed space being heated.

The Leachate Collection System

The compost system of these heat energy plants has a total leachate collection system. The sidewalls 134, 136, 138 and 140 and bottom walls 120 and 122 of the respective compost channels 102 and 104 are constructed of high conductivity concrete. The edges between the channel sidewalls and the floor surfaces of bottom walls 120 and 122 are sealed with a rubberized compound to prevent leachate moving out through the sidewall/floor joints. The air flow floor conduit components 130 and 132 also serve as leachate drains for the compost channels, and these PVC conduits are suitably slightly inclined upwardly toward water tank 106 to promote gravity-induced leachate flow. Leachate is collected in the air manifold pipe 143 located along the outside of each compost channel and is directed to a leachate tank (not shown) at one end of the facility. This leachate can be used to rewet the composting material as required.

The MegaDome Roof System

The compost facility of thermal engine plant 100 operates more efficiently both for heat energy production and making composting by-products if it is housed under a roof. In the illustrated example the building for the thermal energy plant therefore includes a 70 feet wide and 250 feet long Mega-Dome roof structure 108. This MegaDome roof structure includes preengineered hot-dipped galvanized arched trusses 150, covered by a tarp 152. The truss system is hot-dipped galvanized after welding for greater corrosion resistance.

The building can be left open at the axially opposite ends for greater ventilation. It can also be vented at the truss peak ridge. When composting is to occur in areas where odor may be a concern, the building can be entirely closed and fitted with a suitable biofilter atmosphere exhaust system.

The Biofilter

Because the material will be composted in an area where odor may be a concern, the facility preferably will be equipped with a biofilter to process all of the potential odors. In the first embodiment an exterior biofilter structure 154 is provided comprising an aerated floor underneath a 3 ft. deep blend of compost and wood chips.

The first embodiment system of FIGS. 1 and 2 is what is termed herein a "positive" air flow type system, as will be seen by the air flow arrows "A" in FIG. 2. This air flow from the embedded air flow conduits 130 and 132 exits the PVC conduit pipe via holes drilled in the pipe that register with holes drilled in the concrete floor to form the rows of holes 142. This air flow thus enters the compost biomass material masses 124 and 126 from the bottom of the compost mass and the air is forced upwardly through this biomass material. The gaseous atmosphere issuing upwardly from the upper surface of the biomass material 124 and 126 is captured in the headspace that is formed by the associated interior-pole-supported hood tarpaulins 156 and 158 respectively. Tarps 156 and 158 are disposed one above each biomass composting channel 102 and 104 and are draped respectively over the tent pole frameworks 160 and 162 that in turn are preferably supported by the outside sidewalls 134 and 140 and by the top wall 160 of water tank 106. The captured atmosphere under tarpaulin 158 is withdrawn by an overhead take-off pipe 163 leading into a side manifold 164 provided with a suction fan/blower unit 165 and then forced to withdraw atmosphere into the underside of the biomass filter material 166 of filter structure 154. Likewise, the captured atmosphere under tarpaulin 156 is withdrawn by an overhead take-off pipe 168 also leading into the side manifold 164, via suction/blower 165, manifold 164 communicating with a series of perforated pipes (not shown) that extend beneath the biomass filter material 166. In the embodiment shown, the withdrawn atmosphere forced into the biofilter material 166 is exhausted, after being filtered upwardly through the same out to atmosphere. However, it is to be understood that this biofiltered gaseous material can be captured and transported to the associated greenhouse to supply an enriched $CO_2$ atmosphere. In such a variation, further downstream filtering may be required in order to remove noxious components if this gaseous component of the thermal engine plant output is to be employed in this manner.

Modification A of Thermal Engine Plant First Embodiment

Figure 2A:
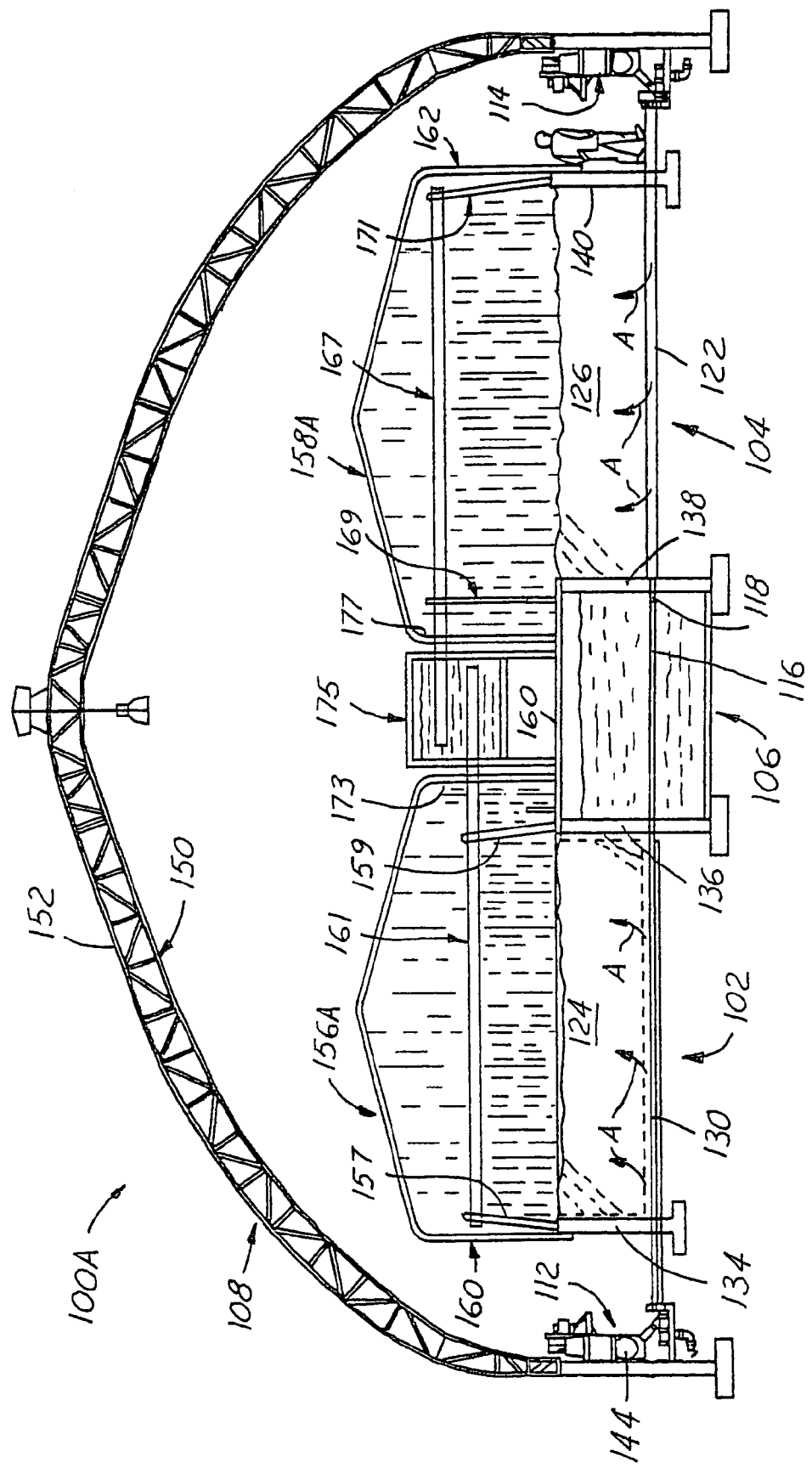
FIG. 2A is a simplified vertical cross sectional view similar to FIG. 2 but showing a first modification of the thermal engine plant first embodiment.

FIG. 2A illustrates a first modification of the thermal engine first embodiment designated generally 100A in FIG. 2A. Those reference numerals previously employed in describing the thermal energy plant first embodiment are again employed to describe like elements in the modification 100A and the description of such elements not repeated. In modification 100A, exhaust ducts 163 and 168 are omitted, as is the associated suction/blower unit 165, manifold duct 164 and biomass filter 154. Also, the ROTO-KING™ compost turner 110 may be eliminated, if desired. The tent pole tarpaulin frameworks 160 and 162 are retained and, if necessary, strengthened to better withstand a modest increase in interior pressure within the tent chamber enclosed by these tarp-cover frameworks. The tarpaulins 156A and 158A are modified from the previous tarpaulins 156 and 158 by being strengthened and made gas and water tight, and such sealing augmented around the edges and ends of the tarp chamber so that the chamber over each trench 102 and 104 remains a positive pressure headspace, as before, but able to withstand an increase in chamber atmospheric pressure to generally a pressure in the range of 3 to 4 inches of water column. Alternatively, one overall large tarpaulin (not shown) may be substituted for the two tarps 156A and 158A.

As a principle feature of the modified system 100A, two more arrays of heat pipes are added, namely, an array of heat pipes 161 mounted on supports 157 and 159 in turn respectively mounted on channel sidewalls 134 and 136. A similar array of heat pipes 167 is mounted on supports 169 and 171 that in turn are respectively mounted on channel sidewalls 138 and 140. Heat pipes 161 are respectively arranged with their evaporator portions disposed in the headspace under tarpaulin 156A, and protrude in sealed relation through the innermost sidewall 173 of tarpaulin 156A, and thence in sealed relation through the sidewall of a supplemental water tank 175 mounted on supports above water tank 106, such that the condenser sections of heat pipes 161 are disposed in water tank 175. Likewise the condenser portions of heat pipes 167 protrude in sealed relation through the innermost sidewall 177 of tarpaulin 158A and thence in sealed relation into supplemental water tank 175. A circulating system for supplemental water tank 175 is operably coupled to that provided for tank 106, if desired, or a separate circulating system for water in tank 175 may be provided for separate heat take-off and return of cool water.

In the operation of modified 100A system, each of the vessel trench-like channels 102 or 104, having been loaded as before, with a quantity of compostable material, are then pressure sealed, including the headspaces provided over each of the biomasses 124 and 126. The positive air pressure system provided by air pumps 112 and 114 is then employed to generate a given value (e.g., 3-4 inches of water) of positive air pressure in the enclosed chambers of channels 102 and 104 as formed by the bottom walls or floors 120, 122 of the trenches, the sidewalls 134, 136, 138 and 140 of the channels and the tarpaulins 156A and 158A that are supported and provide a cover seal over the associated channels 102 and 104. The positive air pressure applied to each of these trench vessels, while loaded with compostable materials, allows the masses of biomass materials 124 and 126 to compost in an accelerated manner while generating heat in the range of 85° C. This heat that is generated is dissipated in the form of water vapor and by heating of the components of the vessel itself.

The heat pipes 116 and 118 in the vessel channel floor transfer the heat of the compost to water circulating through the water tank 106, as before. However, further heat transfer action takes place in this modification system 100A. The water vapor and other gases generated by the composting process rise from the biomass material masses 124, 126, and are transferred up into the respective headspaces under tarpaulins 156A and 158A. A substantial amount of this water vapor and some of the gaseous components generated by the decomposition process condense on the cooler surfaces of the evaporator sections of the heat pipes 161 and 167. These gases and water vapor also condense on the undersurfaces of tarpaulins 156A and 158A. The water vapor condensing on the heat pipes 161 and 167 gives up the heat of condensation to the evaporator sections of the supplemental water tank 175 by way of the condenser sections of the heat pipes resident in tank 175. The circulated water in that tank is thus so heated and then pumped into tank 106 or into a separate system, as desired.

In addition, the condensed water which forms on heat pipes 161 and 167 above the compost materials 124 and 126 precipitates down onto this compost material, thereby providing more water and other liquids which wet the compost and allows for more effective composting.

It is to be noted that the sealed chambers provided by tarpaulins 156A and 158A that are air pressurized to 3 or 4 inches of water column ensures that all of the biomass material of compost masses 124 and 126 is fully oxygenated at all times as long as the positive pressure is applied and maintained. This enables or causes rapid and controllable decomposition of the biomass materials of compost masses 124 and 126 without the need for the constant turning by a compost turner 110 as in the previous embodiment.

Moreover, the vapors collected in the headspace over the material are not drawn off but rather are captured and retained so that the need for filtering the exhaust atmosphere from a biomass system is eliminated. The components that cause odor are thus retained within the sealed headspace. Oxygen from the air is ideally dispersed throughout the biomass materials of compost masses 124 and 126 due to the pressurization, thereby preventing the build up of odors by anaerobes. The even distribution of moisture and temperature within the composting material prevents overly damp or wet "pockets" forming. Formation of channels and anaerobic zones, which can lead to increased odor emissions, is thereby avoided. The rate of decomposition preferably is controlled by sensing with suitable temperature probes and inputting such data into associated conventional control system components and software for regulating the introduction of air to maintain the desired positive pressure in the trench trough or channels and their headspaces. This modification system 100A is thus essentially a batch process rather than a continuous process as in one mode of operation of the first embodiment thermal engine plant. Thus, when all of the biomass material of masses 124 and 126 has been completely decomposed and converted, the ends of the tarps 156A and 158A are opened up and the material removed with bulldozers or front-end loaders. The composted material can be placed on a maturation field to continue biodegradation and then used for the various uses for composted material. Because of the sealed nature of the system, the heat extraction efficiency by way of the upper and lower heat pipes 161, 167 and 116, 118 respectively is greatly increased. Heat pipes 161 and 167 are slightly inclined upwardly in the direction of the water tank 175 so as to operate as thermal diodes, as in the case of heat pipes 116 and 118 described previously.

Modification B of Thermal Engine Plant First Embodiment

Figure 2B:
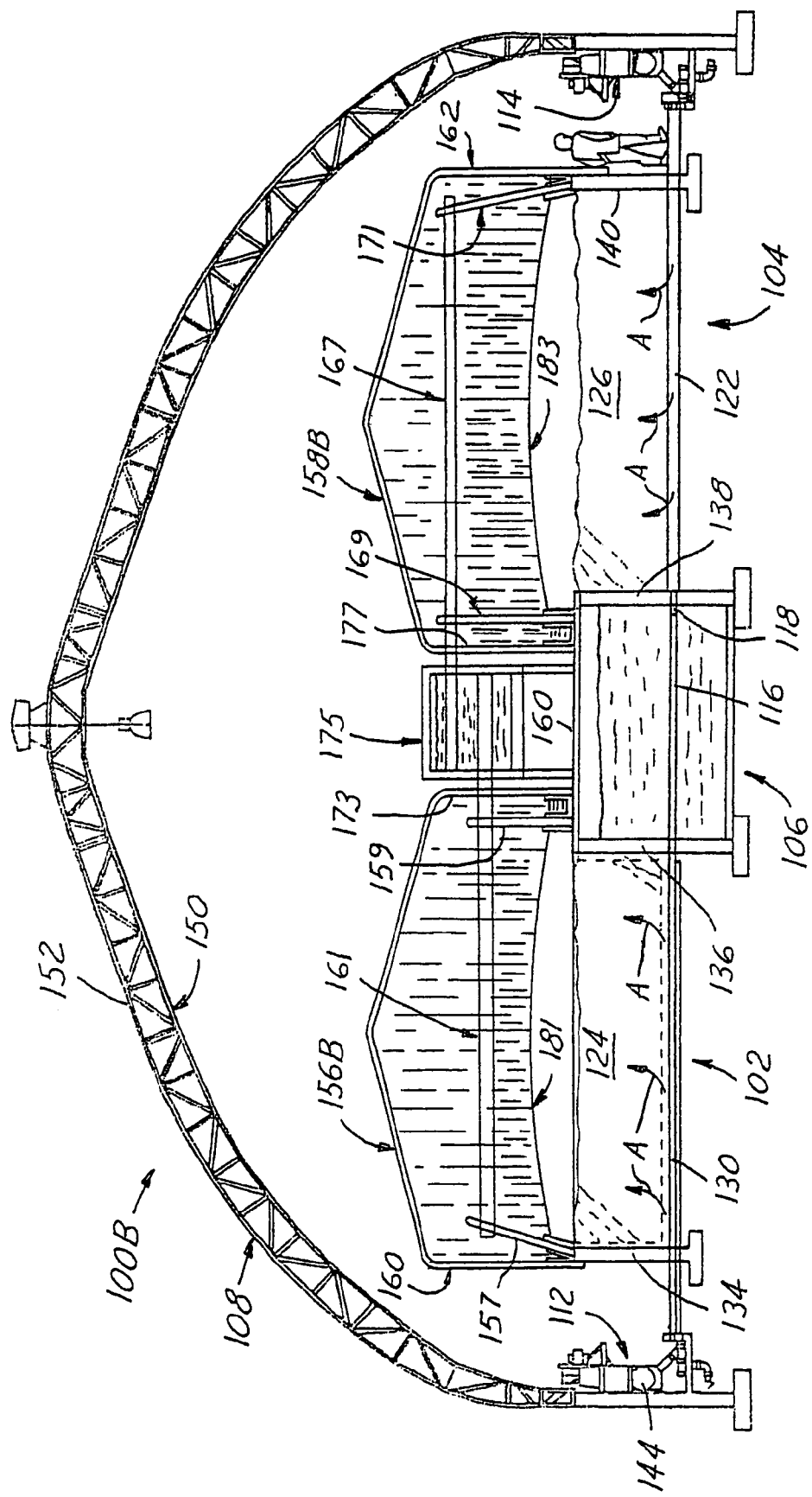
FIG. 2B is a simplified vertical cross sectional view similar to FIG. 2 but showing a second modification of the thermal engine plant first embodiment.

FIG. 2B illustrates another modification of the first embodiment thermal engine plant and is designated as thermal engine plant 100B in FIG. 2B. Again, those elements having like structure and function as in the first embodiment thermal engine plant 100 are given like reference numerals and their description not repeated. System 100B utilizes the same superposed arrays of heat pipes 161 and 167 over trenches or channels 102 and 104 and respectively the same tent frameworks 160 and 162, but the tarpaulin covers 156B and 158B need not withstand the same values of positive pressure as are generated under tarpaulins 156A and 158A.

The primary feature of modified system 100B is the provision of the gas selective permeable membrane 181 installed in sealed relation over biomass material 124 in trench 102, and a similar membrane 183 installed in sealed relation over the biomass material 126 in trench 104. Membranes 181 and 183 are positively sealed along their edges to the retaining sidewalls 134, 136, 138 and 140 defining the trenches 102 and 104, and to suitable end closures for these trenches (not shown). Hence the aeration system supplied by blowers 112 and 114 again pressurizes the biomass material 124 and 126 due to the presence of these membranes 181 and 183. Preferably membranes 181 and 183 are made of "GORE™ Cover" material that is designed to pass through only water vapor from the various gaseous components generated in the headspace above the biomass material 124 and 126, while retaining the other noxious gases trapped under these membranes 181 and 183. Note that this positive pressurization maintains the membranes in an upwardly bowed curvature. Because the pressure within the headspace above membranes 181 and 183 and below their respective tarp covers 156B and 158B, while either atmospheric or slightly super-atmospheric, is nevertheless less than that under membranes 181 and 183.

Membranes 181 and 183 may be constructed in accordance with the teachings of the U.S. Pat. No. 4,194,041 assigned to W. L. Gore & Associates, Inc., Newark, Del. and related patents owned by this entity, and/or in accordance with a product brochure entitled "GORE™ Cover: Making Organic Matter Matter", published by W. L. Gore & Associates GmBH. Unterne-Imens Bereich Textil Technologien, Munchen, Germany and printed in Germany (date unknown). $CO_2$, as well as water vapor, may be extracted via passage through these membranes 181 and 183, but the odors and microbes are retained underneath the membranes in the covered trenches. These membranes are also liquid impermeable.

Again the water vapor escaping upwardly through membranes 181 and 183 into the associated headspaces under tarpaulins 156B and 158B condenses on the cooler evaporator sections of the heat pipes suspended over the membranes. The heat held in the water vapor generated by the composting process is transferred to the cooler surfaces of the evaporator sections of heat pipes 161 and 167. That heat is then transferred to the water circulating in the supplemental water tank 175, which in turn may be pumped into tank 106 or used separately. In addition, some water condenses on the undersurface of membranes 181 and 183 to rain down on the biomass material 124 and 126 disposed therebeneath. In addition, the water vapor which condenses on the arrays of heat pipes 161 and 167 drips down onto the upper surface of the upwardly bowed membranes 181 and 183 and then runs off to the sides of the membranes. Likewise, water vapor condensing on the undersurface of the tarpaulins 156B and 158B falls onto membranes 181 and 183 and also runs off to the sides. This distilled condensate water is captured in a suitable trough, one running along each side of each membrane 181 and 183, and may be ducted through suitable channels to the water pump for pumping of the condensate into either water tank or into a separate collection system. The heat energy that is stored in the insulated holding tanks may be used in any application requiring hot water. Heating greenhouse installations with this water is clearly a reasonable application of this nature. Further, the distilled water extracted from this modified system 100B is of sufficient purity to permit its use for crop watering or domestic animal watering. Additionally, the $CO_2$ passed through membranes 181 and 183 may be ducted off to the greenhouse interior atmosphere to serve as a growth accelerant.

Again, maintaining of the positive pressure of 3 or 4 inches of water in the biomass material under the membranes 181 and 183 permits rapid decomposition without the need for constant turning, while at the same time capturing the noxious exhaust vapor compounds. Thus the need for turning equipment is eliminated, as is the need for a biomass filter.

Thermal Engine Plant Second Embodiment

FIGS. 3, 4 and 5 illustrate a second embodiment thermal engine plant 200 similar in construction to plant 100 of FIGS. 1 and 2, and those components that are identical to components of the first embodiment are given identical reference numerals and their description not repeated. Thermal engine plant 200 employs a "negative" air flow system, the negative air flow being indicated by the arrows "B" shown in FIG. 4. With a negative air flow system in plant 200, it will seen that there are no internal tent coverings, membranes or tarpaulin structures over the two compost troughs or channels 102 and 104. Instead, the air or atmosphere drawn off from the masses of composting materials 124 and 126 flows down through these masses and is drawn off at the bottom of these masses through the concrete-embedded air conduits 130 and 132 interposed between and paralleling the concrete-embedded heat pipes 116 and 118. Air conduits 130 communicate with a header pipe 202 that is provided centrally with a suction/blower unit 204 that exhausts the withdrawn atmosphere into the bottom of an associated biofilter box 206 located exteriorly of building 108. In order to provide separately controlled zones, there are a series of headers 202 and 208 provided along each side of the composting channels 102 and 104, as best seen in FIG. 3. The series of air suction conduits 132 are shown in FIG. 3 communicating with a header 208 feeding a suction/blower unit 210 located centrally of header 208 and exhausting into a biofilter box 212 identical to box 206.

As best seen in FIG. 5, a plurality of such headers 202 and 208 are employed to subdivide the air take-off system into, for example, nine zones, each with its own suction/blower 204, 210 located centrally of an associated header feeding an associated biofilter box 206, 212. This subdividing of the air take-off system thereby enables air withdrawal control incrementally along the length of each of the composting channels 102 and 104. Again, as shown, the atmosphere so drawn off from the bottom of each biomass 124 and 126 is thus forced through a series of biofilters 206, 212, etc. located exteriorly of the thermal energy building 108 so that the drawn off gaseous components, after biofiltering, are exhausted to atmosphere. However, again these gaseous components, after biofiltering, could be utilized for heating and growth-enriching the atmosphere in greenhouses, if desired.

In both the first and second embodiment thermal energy plants 100 and 200, heat pipes 116 and 118 preferably are constructed and arranged in a parallel array so as to extend at a slight uphill slope angle within concrete floors 120 and 122, and into water tank 106, and are wickless, so that the heat pipes function as thermal diodes and not as reversible heat pipes. That is, their functional evaporator sections are always in concrete floors 120 and 122, and these functional condenser sections are always in water tank 106 so that heat can be extracted in only one direction, that is, into water tank 106. Hence, heat pipes 116 and 118 cannot extract heat from water tank 106 and put it back into the concrete floors of the composting channels 102 and 104.

Another feature to note with respect to the negative thermal energy plant 200 is that the upper surface of the concrete floors 120 and 122 is preferably covered with a layer of about 3 inches thick of wood chips and/or crushed stone selected of a particle size larger than the air holes 142 in the concrete. Also, compost turner 110 is adjusted so that its revolving blades are elevated in their travel path sufficiently so as not to engage this layer of wood chips as the compost turner engages the superposed biomass material 124, 126 as it works the same as described previously. The layer of wood chips and/or crushed stone is preferably provided to help keep the particulate biomass material of the compost masses 124 and 126 from clogging the air inlets 142 in this negative, suction take-off system.

Third Embodiment

FIGS. 6, 7 and 8 are semi-schematic layouts of a biofilter air heating system and water heating system third embodiment of the present invention, in which both heat energy and carbon dioxide, as well as warm moist air produced by the composting action, are utilized in a greenhouse. The thermal energy plant portion of this system is designated by the general reference numeral 300 and the associated adjacent greenhouse by the reference numeral 302.

It will be seen from FIG. 7 that air is taken from the floor area of greenhouse 302 and drawn from it through a blower or air compressor 304 and then exhausted from that blower and forced via outlet duct 306 through a series of manifold distributor ducts 308 buried under a large concrete pad 310 on which the biomass material 312 is placed. Concrete pad 310 is perforated so that outlets 315 of air ducts 314 penetrate pad 310 and are oriented to blow air upwardly into biomass 312, oxygenating it as the air passes therethrough. As this air goes through the biomass 312, it is heated by the biomass, and then rises to the top of an inflated dome 316 where the heated air is then taken off by the system pressure differential and forced through a dry biomass filter 318. This filtered air then is sucked back into greenhouse 302 where it is now present as warm air that is heavily carbon dioxide laden, thereby providing a major growth accelerant atmosphere for the plants in the greenhouse. Then the cycle repeats itself on either a continuous or intermittent basis. This cycle is operable in accordance with desired system control settings for blower 304 and an associated temperature and pressure controlled damper 320 in the outlet duct 322 connecting biofilter 318 to the greenhouse interior.

In the "on-cycle" of this air recirculating system, air is constantly being moved from the floor of greenhouse 302, where it is relatively cool, then up through the biomass 312 resting on the concrete pad 310, wherein the air is being heated up, and the air is then collected in the dome 316 and drawn back into greenhouse 302 via the biofilter 318. Biofilter 318 itself is made up of wood shavings and peat moss and other spent biomass that has already been processed.

The inflated tent dome 316 ("air structure") has conventional air lock systems (not shown) that enable trucks to be driven into the building for unloading feedstock into a conveyor (not shown). Likewise, the spent material is taken off on the other side of the biomass by a. chain conveyor 326 that is operated as required to extract the biomass material once it has been spent and turned into compost.

Preferably the apparatus and process for moving the biomass forward during its thermophyllic stage are a series of compost turners 328, similar to that shown in FIGS. 1-4 at 110 (only a two bay array being shown in FIG. 6). These turners 328 ride on top of the concrete sidewall dividers 330 defining the twelve "trenches" or "troughs" for the biomass material shown in FIG. 6 and operate through a five-feet deep pile of biomass material in each trough, turning it over and fluffing it, and at the same time moving a whole batch of the material in the associated row approximately three feet at a turn. For example, once a week the whole batch of material in each trough may be moved forward about seven to nine feet. That allows fresh material to be reloaded at the back or input end, and at the output end the transverse conveyor 326 takes the spent material off to one side.

In embodiment 300 shown in FIGS. 6-8, the blower 304 creates air moving forces that are used in a positive air biomass system to also maintain inflated the flexible canopy of dome 316 that covers the entire thermal engine array and components.

Concrete pad 310 has embedded within it an array of heat pipes 332 operating in the diode mode (thermosyphons) that extend from the concrete pad at a slight upward-angle (e.g.) ½° into an adjacent contiguous insulated water tank 334. Also embedded in concrete pad 310 is the array of air ducts 314 that extend through pad 310 and have outlet ports 315 flush with the concrete pad upper surface.

As shown in FIG. 6, pad 310 is segmented at regular intervals by thirteen five-foot high walls 330, which provide the multiple trough "vessel" in which the biomass materials compost. Each concrete trough sidewall 330 also has two heat pipes 336 embedded in the wall (FIGS. 7 and 8) and that also extend at a ½° upward inclination into water tank 334 to further augment diode-one-way heat energy transfer from each trough-contained biomass into the water of tank 334.

Discharged air from ports 315 in concrete pad 310 provides oxygen to the biomass, which enhances the composting rate and performance, and therefore causes the composting biomass to more efficiently generate heat. The air exiting the biomass in the "vessel" has been heated by the biochemical reaction occurring in the biomass material. The air in passing through the biomass material also accepts water vapor, carbon dioxide and various aromatic gases and vapors coming from the composting biomass. This air is under pressure from the air compressor or blower 304 and therefore provides the pressure required to maintain inflation of the air structure dome 316. Because this pressurized air is in excess of the pressure required to maintain inflation of the canopy tarp of the air structure dome, the excess air is bled through the exit biofilter 318. This scrubs the air free of water vapor and aromatic gases and vapors, and directs the clean heated air, which is highly loaded with carbon dioxide, into the greenhouse through the insulated air duct 322. The amount of air discharged from the air structure is controlled by the automatically controlled temperature and pressure damper 320 mounted in air duct 322, which in turn conducts the heated air/$CO_2$ into the greenhouse atmosphere.

The heated air/$CO_2$ mixture provides heat energy to the greenhouse. In addition, the $CO_2$ acts as growth accelerant and is absorbed by the plants growing in the greenhouse. As the air/$CO_2$ mixture cools, it is drawn into the inlet of blower/compressor 304 where it is pressurized and again pumped into the biomass under the air structure dome 316. Note that this system of providing heated air and $CO_2$ to the greenhouse is an adjunct to the biomass composting heating system that utilizes heat pipes 332 and 336 (thermosyphons) to transfer heat to the insulated water tank 334. That water, when heated, is pumped into the greenhouse and heats the greenhouse as it flows through a conventional array of heat exchange pipes (not shown) located within the greenhouse. Both the biofilter air heating system described above and the biomass water heating system described above can function together or as independent systems for heating greenhouses or any other structure requiring heat.

Fourth Embodiment Biomass Heating System

Figure 9:
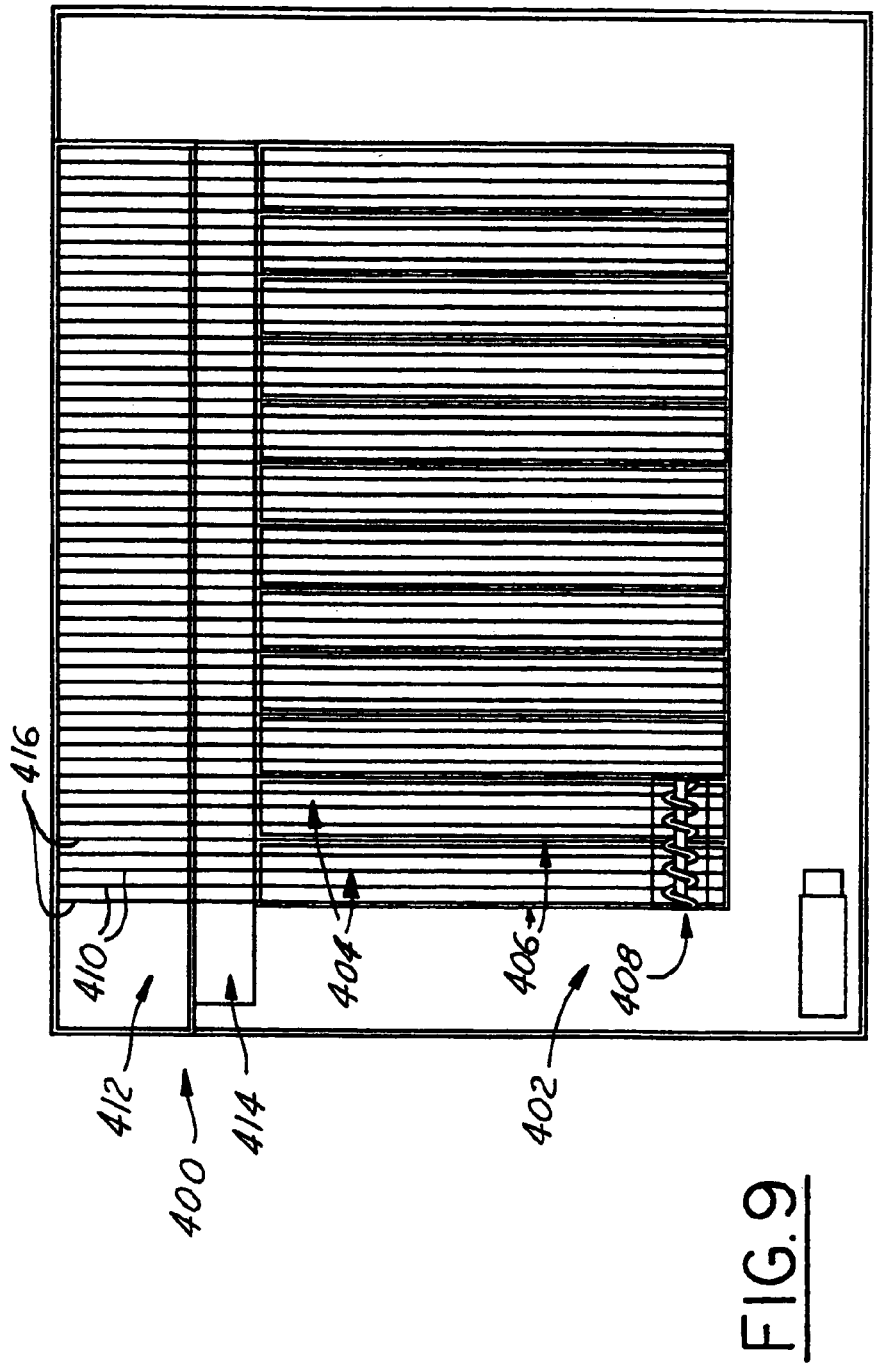
FIGS. 9 and 10 are respectively a plan view and right hand end side view in simplified diagrammatic format of a fourth embodiment thermal engine plant also in accordance with the present invention.
Figure 10:
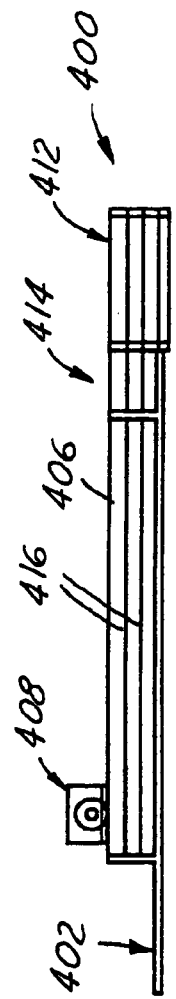

FIGS. 9 and 10 are respectively a plan view and side view in simplified diagrammatic format of a fourth embodiment thermal engine plant 400 of a composting heat recovering process using biomass feedstock deployed in an "open-air" (i.e., uncovered) set-up, also in accordance with the invention. Plant system 400 features a compost turner 408 and a conveyor 414 used for dumping the thermally spent biomass and thus resembles thermal engine plant 300 except that it is open-air and simplified with a reduced number of components.

More particularly, thermal engine plant 400 again uses a concrete slab or pad 402 segmented into twelve troughs or "vessels" 404 by means of six-foot high sidewalls 406. These walls 406 separate the vessels into the separate "compost bays" 404 and act as tracks for an engine driven compost turner 408 which, by use of tines, fluffs the feedstock, allowing aeration so as to promote decomposition and therefore heat generation. Turner 408 moves the feedstock in the vessel bays approximately three to five feet with each pass. Fresh feedstock is dumped into the input ends of the vessel bays as space is made for it by the action of the turner after every pass. An array of heat pipes 410 operating as diodes (thermosyphons) embedded in the concrete slab or pad 402 transfer the heat energy generated by the decomposing feedstock into an insulated water tank 412 located spaced ten feet from the output end of the vessel bays. This ten-foot space between the output end of the vessel walls and the wall of the water tank is used for dumping the thermally spent biomass. A conveyor 414 located in this space carries the spent feedstock transversely to the vessel bay axes and out one side of the array of compost bays.

The array of heat pipes/thermosyphons in thermal engine plant 400 includes not only those heat pipes 410 in the concrete slab or pad 402 but also heat pipes (diode thermosyphons) 416 embedded in the six-foot high walls 406 that separate the composting vessels into bays. All these heat pipes/diode thermosyphons transfer heat directly into the insulated water tank 412 where the heated water is stored, and from which it is pumped on demand into a conventional array of heating water pipes (not shown) located within the greenhouse or other structure as heat is required.

Note that the fourth embodiment system shown semi-diagrammatically in FIGS. 9 and 10 is similar to the system described previously as the third embodiment thermal energy plant 300, with the exception that in the fourth embodiment system there are no compressed air ports or ducts in the concrete slab 402. Thus, within the context of describing the two water-heating systems, the descriptions are similar except for the use of the compressed air ports needed to accommodate the biofilter heating system in plant 300.

Note also that when the water heating system is residing in the inflated dome air structure 316, the compressed air needed to support the structure is provided through the use of a compressor 318. However, in an alternative wherein plant 400 is provided with an inflatable dome cover, such a blower/compressor may direct the required inflating compressed air into the dome structure without necessarily having the inflating air enter through the floor or slab or pad, but rather from any other suitable input location.

Fifth Embodiment Biomass Heating System

Figure 12:
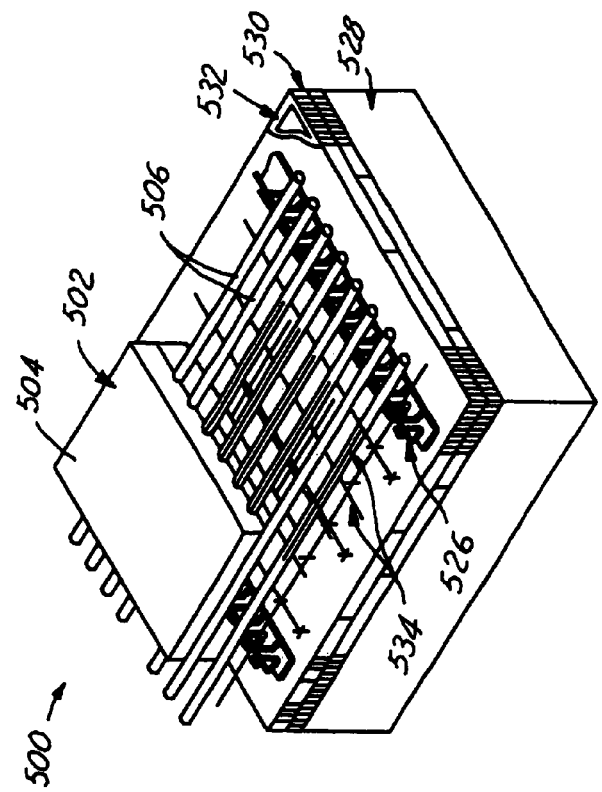
Figure 11:
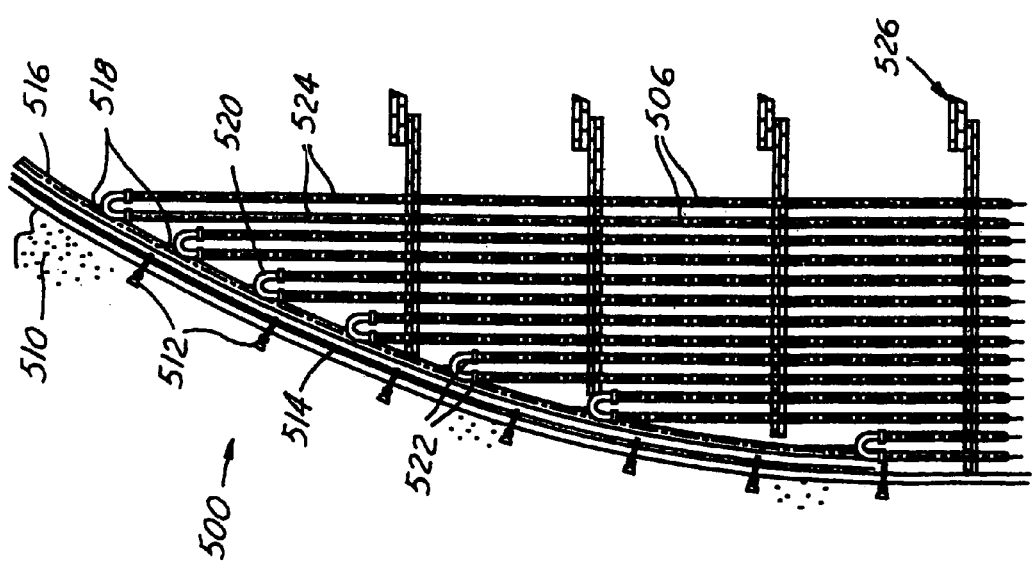

FIGS. 11, 12 and 13 show a fifth embodiment system 500 of the invention applied to the typical piping system employed in the concrete floor structure 502 of a hockey ice rink or other type of artificial ice rink as normally constructed for freezing water on the upper surface 504 of the floor into an ice surface. In this conversion to a thermal energy plant 500, the concrete floor 502 is left bare and the biomass material placed on the top surface 504 of the concrete floor 502 of the ice rink in order to perform this embodiment method for extracting heat from either "in-vessel" or windrow type decomposition of such feedstock. If desired, and pursuant to system 100A described previously, the entire rink surface above the biomass may be covered by a gas-impermeable tent and pressurized with air, either normal ambient atmosphere or oxygen enriched. However, this method utilizes much of the same technology and equipment used in freezing artificial ice surfaces in ice arenas. In this instance the heat extracting or heat transfer fluid, which can be, but is not limited to, brine water or commercially available refrigerants such as R-134, is pumped through an existing array of ice rink brine or refrigerant conducting tubes 506 embedded in a conventional manner in the concrete floor 502, on which a pile of decomposing feedstock is located.

The conventional array of such rink tubes 506 is partially defined in FIGS. 11 and 12. The heat transfer fluid is pumped through tubes 506 by an associated piping network that includes a series of pumps and heat exchanger tanks shown schematically in FIG. 13. The resultant heated fluid is then either directly pumped into an insulated retention tank 508 (FIG. 13), or the heat is transferred again to a water or air heat exchanger (not shown) where the thermal energy is converted into either hot water, which is then stored in an insulated tank for later usage as energy demands dictate, or in the case of an air heat exchanger, the energy is converted into hot air for immediate use in heating a structure.

By way of further explanation of the details shown in FIGS. 11, 12 and 13, in FIG. 11 the rink perimeter concrete is indicated at 510, 512 indicates anchors inserted into the concrete wall at the return bend end of the rink that are cut after the concrete is poured. A reinforcing bar 514 is welded to the anchor bars 512. A polyethylene perimeter cooling brine pipe is shown at 516. Galvanized tie wire 518 connects the 180° return bend 520 to reinforcing bar 514. Return bends 520 are ABS plastic coupled by two gear clamps 522 to the straight runs 524 of the array of 1¼ inch O.D. polyethylene cooling rink pipes. Rink pipe supports 526 are shown schematically in FIG. 11 and structurally in FIG. 12.

In FIG. 12, a foundation layer 528 of clean sand is compacted and installed in two layers. Two layers 530 of 1½ inch Dow "HI-40" rigid insulation blocks are laid with their joints staggered and offset. Two layers 532 of 6 mil (0.15 mm) thick polyethylene slip sheet is overlapped by 4 inches and its joints offset, if required. A lattice work of reinforcing rods 534 ("re-bar") are installed as a top layer above rink pipes 506 and as a bottom layer below rink pipes 506 prior to pouring of the concrete floor 502. Typically the concrete floor is poured to a 6 inch (150 cm) thickness to provide a maximum concrete coverage over the rink pipes 506 of 1¾ inches (44 cm).

Referring in more detail to FIG. 13, a system flow schematic diagram is indicated for servicing two ice rink slabs 540 and 542. In this system, the liquid storage tank array 508 includes a "warm side" tank 544 and a "cold side" tank 546. An outlet (not shown) from the "warm side" tank 544 directs the heated water to a greenhouse or other building heating pipe array (not shown), and the return line from this array (not shown) is directed into the "cold side" tank 546. Warm water return lines 548 and 550 communicate as indicated schematically respectively in slabs 540 and 542 with the plastic rink pipes 506. Typically pipelines 548 and 550 may be insulated by 2 inch thick preformed polystyrene surrounding insulation with vapor barrier and PVC jacket as symbol indicated at 552. "Cold" water supply lines 554 and 556 leading from the tank cold side 546 connect respectively to ice rink slabs 540 and 542. Electric motor and centrifugal pump units 558 and 560 respectively are installed in "cold" water supply lines 554 and 556. A room wall 562 is shown of a structure (not shown) enclosing the heat exchanger 508 and pumping installations 558 and 560, associated temperature sensors and pressure relief valves as well as vents and drains. Suitable vents 564 and 568 are mounted in a valve box connected to one end of an outflow header 570 and an inflow header 572 of rink 540, and likewise outflow header 574 and inflow header 576 of rink slab 542. Further vents/drains 578 and 580 are communicated with headers 570, 572 and headers 574 and 576 as shown in FIG. 13.

It will thus be seen from the foregoing illustrations of FIGS. 11, 12 and 13 and associated description that the fifth embodiment thermal energy plant 500 is readily convertible from a system for freezing ice on the surface of the concrete floor structure 502 to a heat generating system utilizing biomass laid on surface 504 of the floor structure 502 and manipulated as in the prior thermal energy plant embodiments. The usual refrigerant compressors and expansion valves of two-phase ice rink refrigeration system are not shown, but are added into the piping system of FIG. 13 in a conventional manner to convert the thermal energy plant back to refrigerant ice rink operation after the biomass material and associated material moving equipment has been removed from the ice rinks.

In system 500 it will be noted that heat pipes (diode thermosyphons) are not employed but instead ordinary ice rink fluid conducting piping is employed. In this instance, the heat extracting or heat transfer fluid of this biomass thermal energy rink system may be water that is pumped through the system entirely in liquid form without phase change to vapor when the system is operated as a thermal energy plant. However, use of a suitable refrigerant fluid and operation in a two-phase mode is preferred for biomass heat extraction. The economy of utilizing conventional ice rink construction specifications, materials and equipment that are convertible to thermal energy plant use contribute to substantial capital cost savings. The possibilities of dual use of the concrete slabs 540 and 542, i.e., ice skating rinks on the one hand and biomass thermal energy pads on the other, may also offer capital and operating economies in particular applications and locations suitable for such dual usages.

Sixth Embodiment Biomass Heating System

FIG. 14 is a plan view and FIG. 15 is a side view illustrating semi-schematically another simplified "open-air" thermal energy plant embodiment 600 utilizing a cement or concrete slab or pad 602. The side view of FIG. 15 is a projection off of the right-hand side as viewed in FIG. 14, i.e., as viewed in the direction of the arrow SV in FIG. 14. A large number of heat pipes 604 (diode thermosyphons) are embedded therein in a parallel array in a ground level set-up enabling the use of a small farm tractor with a grading blade (not shown) to handle and turn the compost feedstock for this system.

Thermal energy plant 600 includes a contiguously sited insulated water retention tank 606. Biomass feedstock is loaded and located on pad 602 and is aerated through the use of the small farm tractor equipped with a grading blade. This action provides oxygen to promote rapid decomposition and therefore generation of heat energy. The heat energy is transferred into water tank 606 as described in earlier embodiments (e.g., systems 300 and 400). It is also to be understood that the heat transfer system 600 may also be of the type described in system 500, i.e., where the heat transfer fluid is a liquid that is pumped through an array of tubes embedded in pad or slab 602 without phase change occurring, i.e., where a reduction in capital construction costs is desired at the expense of system operating efficiency.

As contrasted with systems 300 and 400, system 600 does not provide a track turner for the biomass feedstock but rather it simply utilizes a farm tractor. As the feedstock material becomes thermally spent, it may be pushed into an area where it can be conveyed away from the pad or bay, or it may be picked up with a front-end loader and dumped into a wagon or truck for transport out. New feedstock may be brought into the thermal energy bay using the same methods and equipment. Again, the outer perimeter sidewalls 608 and 610 may also be provided with heat pipes 612 that extend into the contiguous wall sections that form the end walls 614 and 616 of water tank 606. The conventional compost mixer 618 may be conveniently located on the apron area 620 of pad 602 that is separated from the compost bay 622 by a divider wall 624 provided with suitable access gates (not shown) for ingress and egress of the farm tractor.

In one exemplary design of system 600, the apron 620 may be 20 feet wide, compost bay 622 may extend in the direction of heat pipe 604 by a distance of 80 feet, and the water tank another 20 feet in that direction, the width of pad 602 may be approximately 119 feet, and the height of walls 608, 610, 624 may be 6 feet. When so constructed to such exemplary dimensions, water tank 606 has approximately a 120,000 gallon capacity. The heat pipes 604 and 612 would be 3 inches in diameter and inclined again upwardly in the direction of the water tank with a slope of ½° to ensure diode thermosyphon operation (one-way heat transfer) of heat pipes 604 and 612. In this connection, it is again to be noted that all heat pipes in all the system embodiments described hereinabove are, by construction and nature, preferably diodes. That is to say, they can only function in one direction as heat transfer devices. No heat can be transferred from the condenser sections to the evaporation section of these devices. Therefore, in the event that the heat generating portions of the system are cooled to a temperature below the temperature of the water held in storage in the insulated tanks where used in these systems, no energy will be transferred back to the environment and out of the system.

Seventh Embodiment Biomass Heating System

Figure 16:
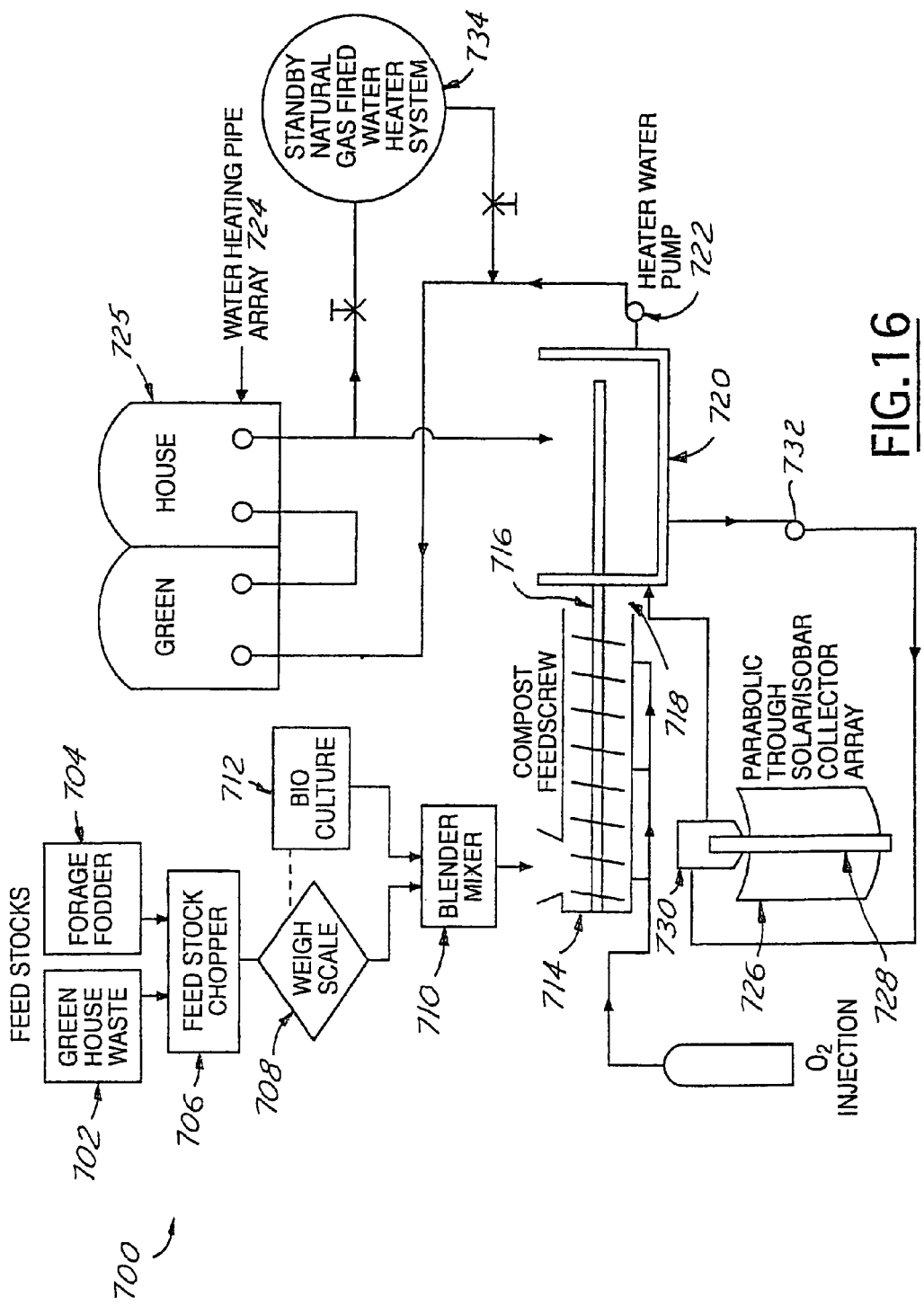
FIG. 16 is a diagrammatic schematic layout of a seventh embodiment biomass heating system of the invention.

FIG. 16 is a diagrammatic schematic layout of a greenhouse heating system 700 composed of two complimentary heat generation and transfer techniques or processes. Both of these processes are preferably housed in a greenhouse type structure located contiguous to an existing greenhouse complex 725. Referring more particularly to FIG. 16:

1) The first process of the seventh embodiment: The biomass heating system of this thermal engine plant embodiment 700 extracts the heat energy from chopped, greenhouse produced, plant waste or inexpensive forage crops such as wheat, straw, corn fodder or sorghum. These greenhouse waste and forage fodder feedstocks 702 and 704 are fed through a chopper 706, weighed in a scale 708 and mixed in a mixer 710 with manure cultures 712.

This blend of natural materials is placed in a large, slowly rotating feedscrew 714 that incorporates a heat pipe diode-type superthermal conductor 716 constructed and arranged to form its hollow center drive shaft. As the materials decompose they are moved forward along the feedscrew until the spent material, in the form of humus, is expelled from the open downstream end 718 of the feedscrew and conveyed to a location where it can be stored and spread on farm acreage or sold as commercial high grade compost. The energy is extracted from these composting materials by the heat pipe superthermal conductor 716 and transferred into a large insulated water retention tank 720. The heated water is then pumped by pump 722, as required, through the existing conventional hot water greenhouse heating system 724 for heating the contiguous greenhouse 725.

2) The second process of the seventh embodiment: A parabolic mirror trough solar heating system provided in system 700 amplifies sunlight much like a magnifying glass does, but instead of forming a very hot circular focal point, a parabolic trough mirror 726 forms a high intensity linear focal point extending along the axis of the trough. A diode-type heat pipe superthermal conductor 728 is suitably supported along this heat focussing line or axis and is thereby solar heated to high temperatures. Heat pipe 728 then transfers this absorbed solar heat energy directly to a water circulation heat exchanger 730. Water pumped by a pump 732 from the insulated water retention tank 720 is thus heated through the heat exchanger 730 and then returned to the retention tank 720.

On sunny days, even during the coldest days of mid winter, the insulated water retention tank 720 is heated by the high intensity reflected sunlight that is precision focussed and concentrated on heat pipe 728 by the parabolic mirror trough 726. During those all too familiar dull, cold winter days, the biomass composting system 702-716 continues to produce energy that heats the water in the insulated retention tank 720 twenty-four hours a day, seven days a week.

It is important to note that the biomass system 702-716 can sustain electrical power interruption to the motor drive for feedscrew 714 for a number of days without causing a reduction in energy generation for water tank 720. In such an electrical outage event a simple on-site gas standby generator 734 is preferably also provided to satisfy the needs of hot water pumps 722 and 732 to permit the complete dual system to function normally.

Engineering design working embodiments of the seventh embodiment system 700 are illustrated by way of example in the eighth embodiment biomass heating system 800 of FIG. 17 hereinafter, as well as in the ninth embodiment biomass heating system embodiment illustrated in FIGS. 18 through 21.

Eighth Embodiment Biomass Heating System

Referring to FIG. 17, this semi-diagrammatic drawing illustrates in plan view a thermal engine house 800 employing the principles of the seventh embodiment 700 with auger-type reactors, with ancillary augmentation by solar heaters. The biomass material is conveyed forward by auger rotation, the center of each rotating shaft being a heat pipe with its evaporator section in the auger blade section and its condenser immersed in an adjacent water tank. In this application, the heat pipe is charged with a non-freezing fluid with good latent heat properties, such as ammonia, propane, methanol, ethanol or a suitable commercial refrigerant vapor.

Referring more particularly to FIG. 17, the thermal energy plant 800 of this system may be housed in a structure 802 constructed in a similar manner and using the same type of materials as in a greenhouse. With support posts indicated at 804, adjunct structures include a manure house 806, a manure feed hopper 808, a feedstock silo 810, a control room 812, a solar room 814 and a spent compost bin 816. Within the enclosure is a greenhouse waste conveyor 818 feeding a chopper 820 and thence a greenhouse waste hopper 822 from which greenhouse waste is fed via conveyor 820 to a biomass mixer 824. Manure is fed from hopper 808 by an auger 826 to biomass mixer 824. Feedstock from silo 810 is fed by a conveyor 828 to biomass mixer 824. A suitable conveyor 830 feeds the biomass mixed material from mixer 824 to the open input ends of an array of ten biomass composting tubes 832 oriented parallel with one another.

Each composting tube 832 is constructed to be a large slowly rotating tube with an array of internal helical flights (not seen) affixed to the inner surface of the tube, much like a cement mixer, only with the tube 832 open at both the inlet and outlet axially opposite ends. The biomass is continuously loaded in the open input end of each tube 832 by the superposed adjacent conveyor 830 and moved along the tube length adjacent the inner periphery of the rotating tube by the internal flights which are oriented to propel the biomass material in the tube away from conveyor 830.

The heat generated during this decomposing period of residency in the rotating tube is extracted by a heat pipe 834 oriented concentric with the longitudinal center axis of each tube 832 and with its evaporator section residing in tube 832. Each heat pipe continues through a suitable seal in a wall 836 of a large water tank 838 so that the condenser functioning section 840 of each heat pipe protrudes into water tank 838 and is immersed in the body of water contained therein. The biomass material decomposes in each tube 832 and the heat which is liberated is absorbed by the evaporator section of heat pipe 834 situated within the air space inside each tube. The energy is then transferred by heat pipes 834 into and stored in the insulated water tank 838.

The spent biomass material exits the outlet end of each tube 832 and falls onto a compost conveyor 842 which delivers this material to the compost bin 816. The open input ends of the tubes 832 are vented to a superposed exhaust hood 844, and likewise the open output ends of tubes 832 are vented to a superposed exhaust hood 846. Any fumes collected in the exhaust hoods 844 and 846 are ducted into a collector duct 848, the fumes being drawn by a combination suction/blower 850 located in a biomass filter unit 852. An auxiliary biomass filter 854 is also located within the structure adjacent a hot water boiler 856. Suitable water pumps 858 and 860 are located adjacent one end of water tank 838 for circulating the heated water and returning cold water to the tank.

An interior parting wall 862 in enclosure 802 forms one wall of the solar room 814, wherein there is an array of twelve solar collectors 864 comprising solar parabolic reflectors such as 726 described in conjunction with system 700 previously. The solar parabolic reflectors provide energy derived from solar radiation impingement and reflected onto a heat pipe thermosyphon, which is oriented coaxially along the focal line of the parabolic reflector. Although not shown in this drawing, the energy taken from the heat pipe evaporator resident on the focal line of the parabolic reflector is transferred up to a heat exchanger in heat transfer relation with the condenser section of the solar heat pipe. Water from the recirculation water tank 838 is pumped through this heat exchanger where it is heated and pumped back into the tank 838 for additional heating. Thus the only functional interface between heat generation in solar room 814 and the heat generation system of the biomass thermal engine house is the water tank 838 via a suitable waterline system (not shown).

The structure 802 housing this biomass thermal engine is a standard size, standard format greenhouse that is currently in use commercially. The support post spacing is typical. The elevations are typical, such that the thermal engine house may be housed within an extension of the greenhouse proper, and built of the same materials, constructed and arranged in the same general mechanical structure mode for ease and economy of construction. Additionally, the solar room 814 is oriented to face south. Although the complete structure of the thermal engine house is made up of translucent white material, which is the standard for the industry, the south facing wall of the solar room is in fact glazed using glass rather than a translucent white plastic material to thereby maximize solar energy transfer through the glass wall for impingement onto the solar heating system reflectors.

Ninth Embodiment Biomass Heating System

A ninth embodiment biomass heating system 900 is shown in FIGS. 18 through 21, which is again an auger type system with solar heating augmentation. In this embodiment the thermal engine plant is housed in an air supported dome 902 (FIGS. 19-21) located adjacent a greenhouse 904 indicated in phantom in FIGS. 18-21. The thermal engine plant of system 900 includes a greenhouse waste house 906 (FIG. 18), a feedstock silo 908, a manure feed hopper 910 (FIG. 18), an air lock door 912 (FIG. 18) and a manure house 914, all located along the west side of the building. The thermal engine room 916 includes a biomass mixer 918 downstream from a chopper 920 to which greenhouse waste is fed by a conveyor 922, feedstock by a conveyor 924 and manure by a conveyor 926.

The biomass composting vessel comprises ten slowly turning augers or feedscrews 930 each operating in its own cast concrete trench that defines a trough 932 (FIGS. 22 and 23). A metal half-casing 934 is preferably fitted into the trough over the auger and is provided with a hinged cover 936 for access to the auger (FIGS. 21 and 22). Preferably heat pipes 938 are embedded in the trench concrete on either side of the auger trough 932 and extend parallel to the auger axis the length of the auger and beyond into the associated water tank 940 (FIGS. 18, 20 and 23). It should be understood that this same type of trench construction with embedded supplemental heat pipes 938 may be utilized in systems 700 as well as 800. As best seen in FIGS. 18 and 23, each auger consists of a central heat pipe 942 supported by thrust bearings 944 and 946 located at the axially opposite ends of the auger. Air or oxygen supply pipes 948 are embedded (FIG. 22) in the trench concrete and are perforated to communicate with outlets entering trough 932 to supply air, and/or oxygen from oxygen tank 949, to the biomass material being worked in trough 932 by the auger. The biomass material is loaded into the troughs by the biomass mixer 918 which is supported on an elevated platform structure (FIG. 20) and located for dumping the mixture onto a conveyor 950 feeding into the input end of the troughs of the augers.

Each auger 930 is in the range of 30 to 60 feet long and the heat pipe 942 serves as the central hollow shaft of the auger, measuring from 6 to 12 inches in diameter and fitted with external flights or blades 954 (FIG. 23). Blades 954 may be either continuous or in the form of an interrupted helix, and may be either perforate or imperforate, and are sized to provide an outside dimension to the auger of 36 to 48 inches. Each auger 930 is installed in the half round trough 932 such that the flights 954 are fitted close to the walls of the trough. The troughs are covered by the insulated covers 934, thereby creating a cave-like hole in which the augers slowly rotate. Preferably the augers rotate at the speed of one revolution per day.

Biomass loaded into the lower front end of each auger from the mixer 918 is moved by the screw flight 954 up the trough toward the water tank 940 as the auger rotates. With the addition of a biological culture or by using natural biological cultures present in the biomass, the biomass material decomposes as it travels from the input end of the auger to the output end, producing heat energy as it decomposes. This energy is conducted by the flights 954 through the heat pipe center shaft 942 and also by direct contact of the shaft with the biomass material. The length of each heat pipe shaft 942 disposed in the associated trough 932 forms the evaporator functioning section of the heat pipe.

As best seen in FIG. 23, the heat pipe shaft 942 extends beyond the trough, beyond the end of the auger flight 954 and is inserted through the insulated wall 956 of the water tank 940 via a leak proof seal. The condenser section of the heat pipe 942 is also best seen in FIG. 23 and carries heat conducting fins 958 that rotate in the bath of water in the tank 940. The finned condenser section may be enclosed is a perforate protective frame 960, if desired.

The biomass becomes spent as it is forced up the length of the auger trough and falls onto a discharge conveyor 962 that runs transversely beneath the output ends of the augers (FIGS. 18 and 20). The heat energy produced by the biomass decomposition will be absorbed through the flights 954 and into the tubular heat pipe shaft 942 of each auger 930. The heat energy is then transferred to the water storage tank 940 by the action of the internal phase change of the vapor and liquid in the heat pipe operating in diode mode. The heated water in water tank 940 will be utilized for heating as described previously.

As an adjunct to the biomass heating system, a solar collector structure is provided in a solar room 970 (FIGS. 18 and 19) constructed in a separate structure along the south wall of the dome 902. Solar room 970 is provided with an array of twelve solar collector units 972 with collector mirrors similar to trough mirror 726 of system 700. Preferably this parabolic trough is mounted on a conventional solar tracking structure (not shown) that will permit the trough mirror to be focussed on the sun throughout the sun's travel for the day. Each solar collector includes a heat pipe diode-type installed such that its evaporator section resides coaxially along the full length of the focal point line of the trough mirror. The energy produced by the sun focussed by the parabolic trough mirror heats the heat pipe evaporator section, the condenser in turn being provided in a heat exchange structure (not shown) containing water to be heated by the condenser end of the solar heat pipe. The system hook-up for the solar collectors 972 may be that described in conjunction with system 700 and its solar energy transferred into the water storage tank 940 in that manner. The water from tank 940 will then be utilized for heating the associated greenhouse 904 or for other uses as needed.

The additional components of the system 900 structure include a biofilter 974 (FIG. 18), a make-up air fan 976, a pair of circulating pumps 978. Pumps 978 are operably communicated with a return line 980 and a supply line 982 communicating with water tank 940. Supply line 982 communicates via the pumps with a pair of take-off pipes 984 and 986. A control room 988 is provided with an air-lock door 990 and a control room fan 992 is provided in the corner of the structure with a door for access to the greenhouse through the control room.

The heating system variations 700, 800 and 900 described above will be used as biomass and solar heat generator subsystems together to provide a very efficient heating system that generates large volumes of heat and water. During those days when sunlight is present in sufficient strength, the solar parabolic trough/heat pipe sub-system will provide the energy to the general water heating system, and the biomass composting sub-system will absorb the energy it produces in the mass of concrete used to make the slab or trough on which the biomass is decomposing. During the night or during periods of significant cloud cover, snow or rain, the solar system will shut down and the biomass system will dump its stored energy into the heating system. Note that the heat pipe 728 used in the parabolic trough solar collector system is, by construction, a diode. It therefore will transfer energy into the water heating system but will not extract energy from that system when its evaporator section is cooled. In the case of the continuous throughput of the auger heat pipes 942 and associated system, the energy will be stored either in the water storage tank 940 or be used directly by the heating system, depending on the functional condition of the associated solar system.

It should be further noted that if the building being heated is a greenhouse such as greenhouse 904, the water piping matrix within building 904 will be heated to a net positive by sunlight during those days that are free of cloud, rain and/or snow, even in the coldest period of winter. Because these water pipes are filled with water that is circulating constantly, this net positive energy input will be stored in the insulated water tanks of the system for use later in periods when the building requires the energy. Note also that the water heated by these systems described hereinabove can be used for any process requiring heated water, and is not limited to the heating of buildings.

Tenth Embodiment Biomass Heating System

Figure 24:
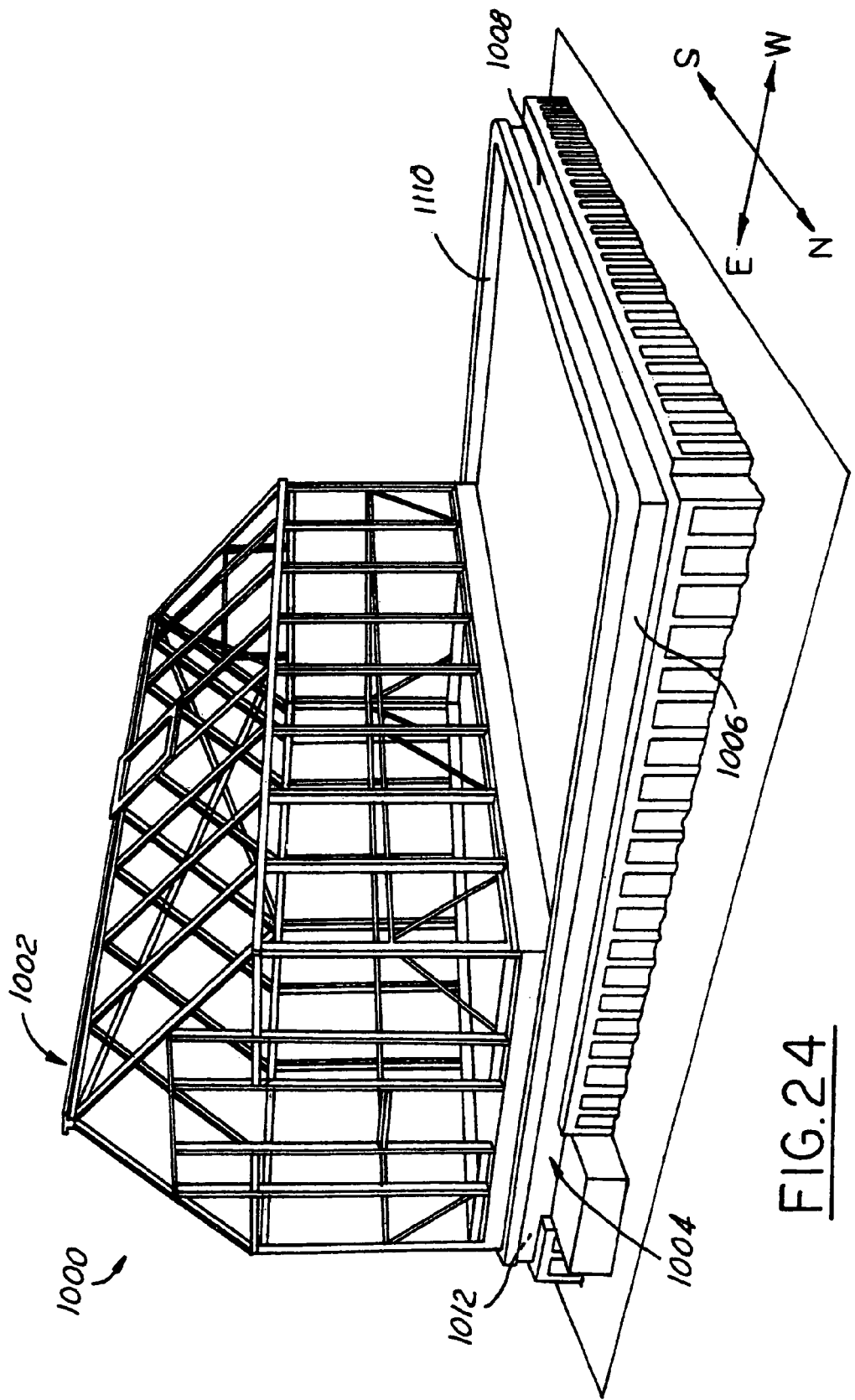
FIG. 24 is a perspective view of a tenth embodiment biomass heating system also in accordance with the present invention.

FIGS. 24-43B illustrate a tenth embodiment biomass heating system 1000 also in accordance with the present invention. This embodiment was primarily constructed as a research and development facility but also designed to test out various system concepts in a batch processing mode of operation. Referring to FIG. 24, embodiment 1000 includes a small greenhouse 1002 approximately 7 feet wide by 16½ feet in length and having a maximum elevation approximately 10 feet at center. Greenhouse 1002 is situated above ½ of an in-ground basement or cellar structure 1004 made of preformed or cast-in-place concrete and is essentially a pit approximately 16½ A feet wide by 16½ feet long by about 5 feet deep. This basement pit 1004 thus has four vertical perimeter walls designated by convenience per the aforementioned compass orientation of the structure as north wall 1006, west wall 1008, south wall 1010 and east wall 1012. Basement pit 1004 is bisected by a north to south vertical mid-wall 1014 of concrete that is 1 foot wide and is of the same elevation as the side and end walls 1006-1012. Mid-wall 1014 thus sub-divides basement pit 1004 into two smaller east and west pit rooms 1016 and 1018 that each have an internal dimension of approximately 8 feet wide by 15 feet long. Greenhouse 1002 is thus situated over the east basement pit 1016, i.e., the left-hand pit as viewed in FIGS. 24 and 25, thus placing the front doorway of greenhouse 1002 on its north face.

Figure 25:
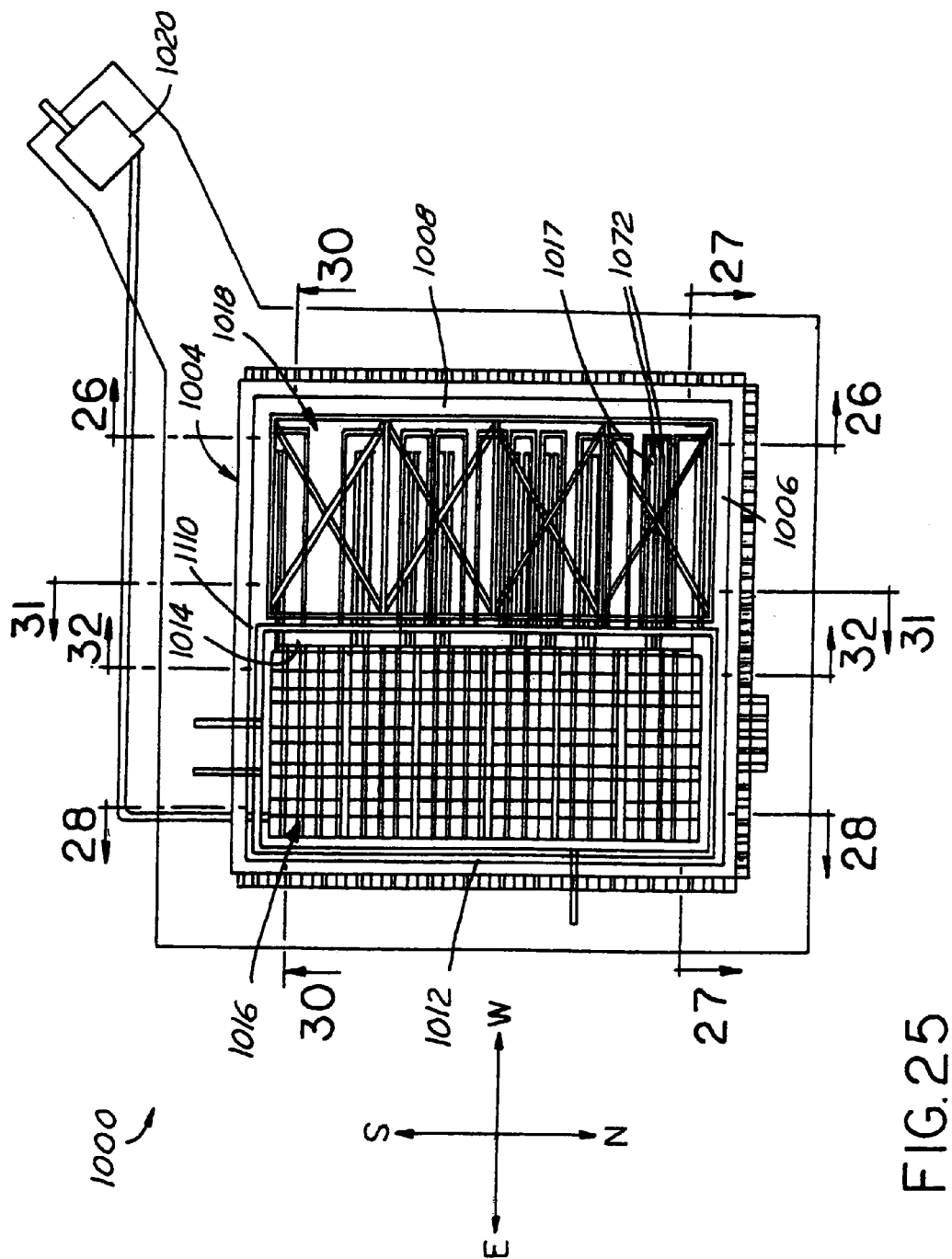
FIG. 25 is a plan view of the structure shown in FIG. 24.
Figure 26:
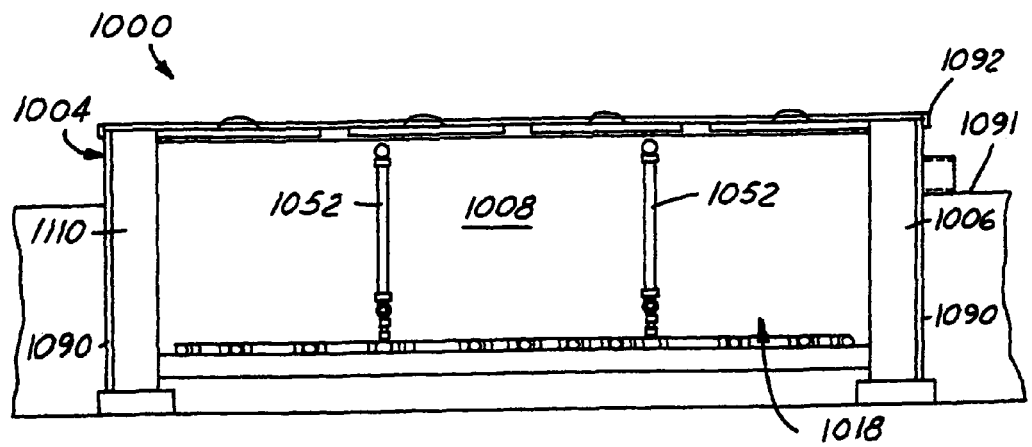
FIGS. 26, 27 and 28 are simplified fragmentary cross sectional views taken respectively on the lines 26-26, 27-27 and 28-28 of FIG. 25.

As seen in FIG. 25, a manhole pit with openable cover 1020 is located about 10 feet away from the basement room 1018 and is connected thereto by a floor drain to serve as a leachate catch basin and to remove water from the site due to a high water table on the particular site of basement 1004.

Interior Components of Biomass Basement Pit 1018

Interior components of biomass west basement pit 1018 are best seen in FIGS. 26, 27, 30, 31, 31A, 34-43. Thus it will be noted in FIGS. 27, 30, 31, 31A and 37 that there are ten heat-conductive steel plates 1022, 1024, 1026, 1028, 1030, 1032, 1034, 1036, 1038 and 1040 disposed in and above the floor of the biomass basement 1018. Each plate 1022-1040 is made of ³⁄₁₆ inch thick steel plate formed into an angle bracket of L-shape cross section. The horizontal leg or flange 1042 (FIG. 31A) is embedded into the floor 1044 of the pit and the vertical leg 1046 rises approximately 18 inches from the floor.

Figure 31:
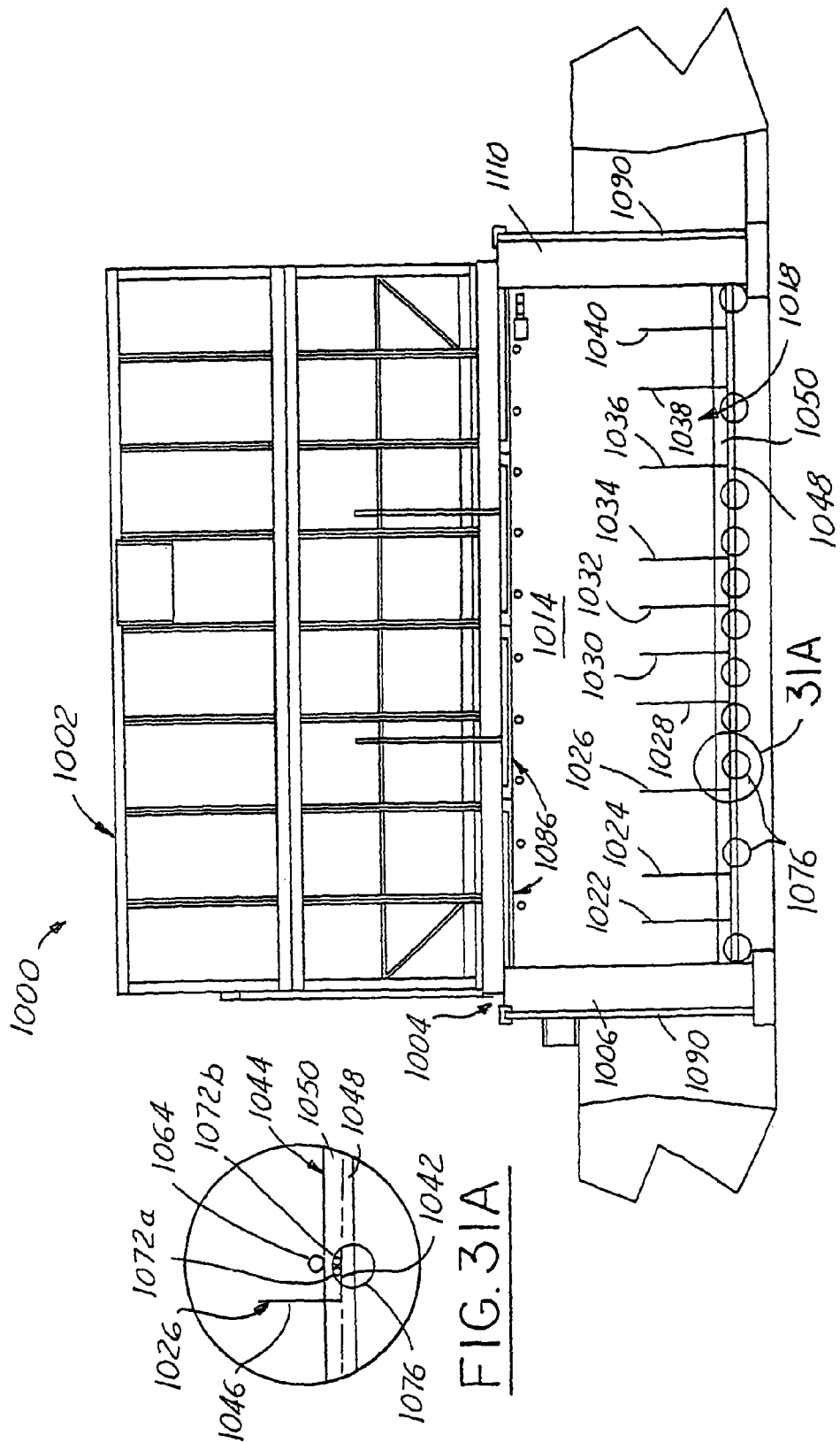
FIG. 31 is a simplified fragmentary cross sectional view taken on a line 31-31 of FIG. 25.

Note that, as indicated in FIG. 31, for experimental research and development purposes, there are two heat pipes within the first (left-hand) chamber formed between plate 1022 and wall 1006. There is no heat pipe within the second chamber between plates 1022 and 1024. There are two heat pipes appearing within the wider chamber between plates 1026 and 1028. Moreover, the spacing of the center region plates 1028, 1030, 1032 and 1034 is closer than those plates farther away from center. This graduated heat pipe set-up is symmetrical about the center of the pit in the direction of wall 1014. In the experimental set-up of thermal engine plant 1000, thermocouples are taped to the heat pipes so the temperature of the heat pipes can be monitored at various locations.

The floor 1044 is made up of two layers 1048 and 1050 (FIG. 31A), the bottom layer 1048 being poured first and, when set, the horizontal flange 1042 of each bracket rested thereon so as to underlie the associated heat pipes 1072a and 1072b as seen in the detail of FIG. 31A. Upon pouring the second level of concrete 1050, which preferably is a nuclear grade, high-conductivity concrete, the heat pipes 1072a and 1072b are fully embedded in that nuclear grade concrete layer 1050, and the vertical flanges 1046 of the brackets 1026 extend upwardly above the outer surface of layer 1050 by approximately 16 inches. The L-angle brackets 1022-1040 are intended to absorb the heat energy generated by the biomass into the vertical leg 1046 of each bracket. This heat energy is then conducted in the bracket by the steel material of the same down through the concrete in which it is embedded so as to present heat energy to the evaporator sections of the embedded heat pipes which lay on top of the horizontal legs of the brackets.

It is also to be noted that, as indicated previously, there is some non-uniformity in the installation of the brackets 1022-1042 as to the spacing between adjacent fins, as well as in the installation of the heat pipes. There is more concentration of heat pipes in the center of the pit 1018 than there are on the ends of the pit. This is because it is presently believed that more heat energy will be generated in the center of the pit, and therefore more heat pipes have been installed per linear foot of the pit than in other locations. However, that arrangement of the heat pipes and their evaporators is not necessarily to be considered a limitation of the broader aspects of the invention. Rather, it is an attempt to anticipate and determine by experiment and measurement to verify that the larger concentration of energy occurs in the biomass center.

The interior components of biomass basement 1018 also include an aeration system shown in FIGS. 26, 34, 35 and 36. The aeration system consists of a series of polyvinylchloride (PVC) plastic pipe comprising two S-patterned inlet feed pipes 1052 that are shown exposed in FIG. 26. However, as shown in FIG. 36, feed pipes 1052 are actually cast into so as to be embedded into the concrete of wall 1008. The upper elbow 1054 of S-section 1052 opens to the exterior atmosphere approximately 6 inches below the top of the basement structure. This allows air to enter the structure of wall 1008, flow down the vertical section 1056 of the inlet pipe and then, via bottom elbow 1058 that enters the basement space, to flow into reverse elbow 1060, and thence via suitable couplings, into a manifold conduit 1062 that is laid along the upper surface of pit floor 1050 and extends adjacent west wall 1008. As best seen in FIG. 34, manifold conduit 1062 is made of series of PVC straight pipe sections intercoupled by T-couplings and terminating at end elbows. Manifold 1062 feeds eleven branch conduits 1064 that extend perpendicularly from manifold 1062 and lay on floor 1050 and terminate at closed ends close to the mid wall 1014 of the basement. The PVC manifold 1062 and the branch pipes 1064 are perforated at 6 inch intervals with air outlet holes ranging from $\frac{1}{4}$ inch to $\frac{3}{8}$ inch diameter and thereby permit air to uniformly enter the pit at the base level or floor level of the pit via this PVC aeration piping system.

Figure 27:
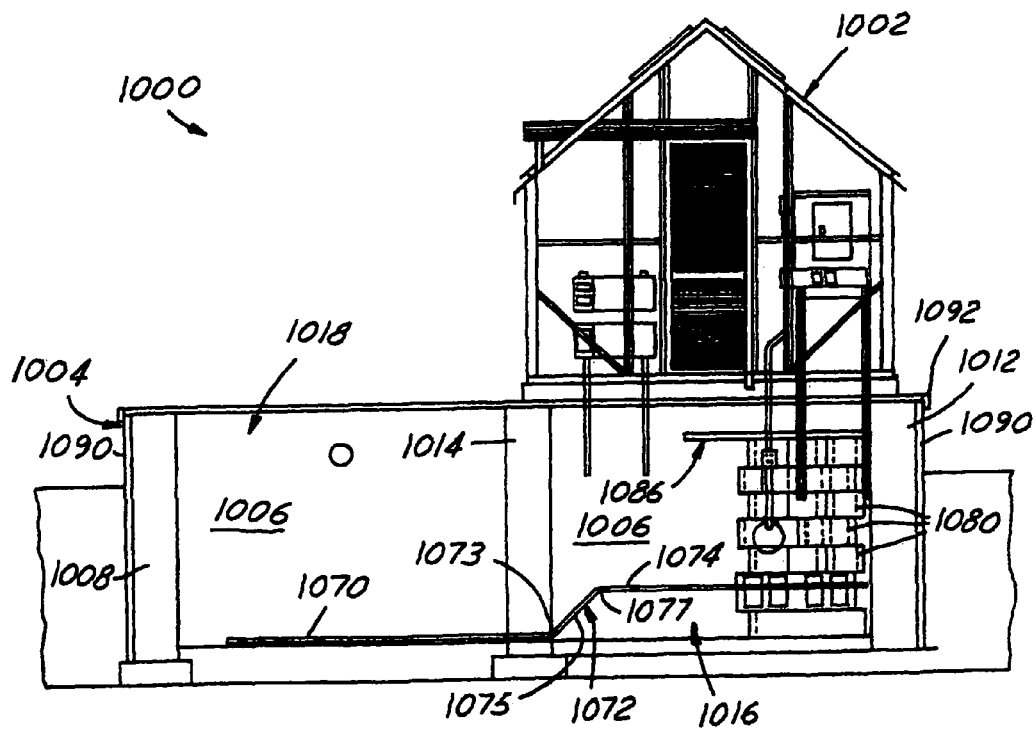
Figure 30:
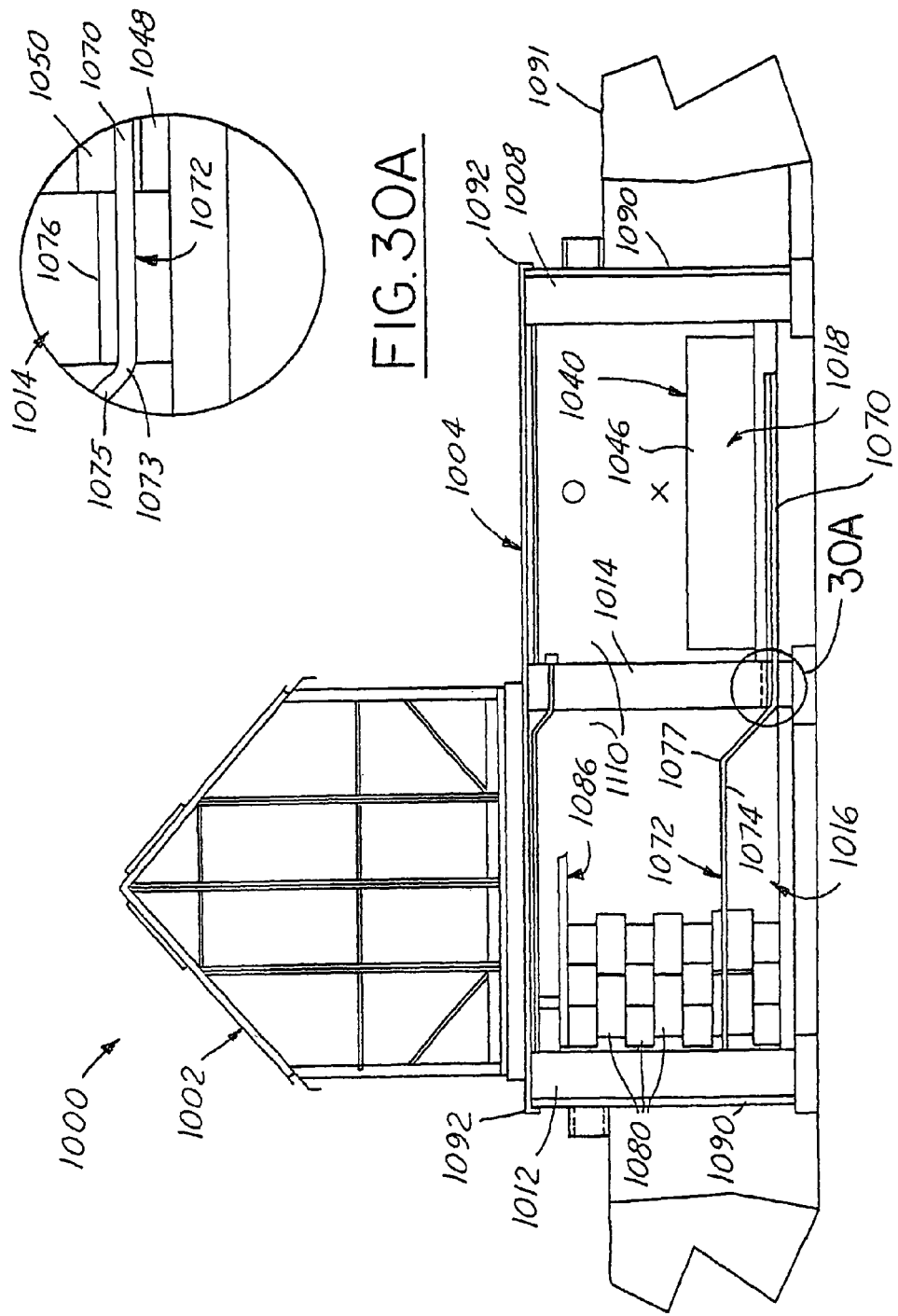
FIG. 30 is a simplified fragmentary cross sectional view taken on the line 30-30 of FIG. 25.
Figure 32:
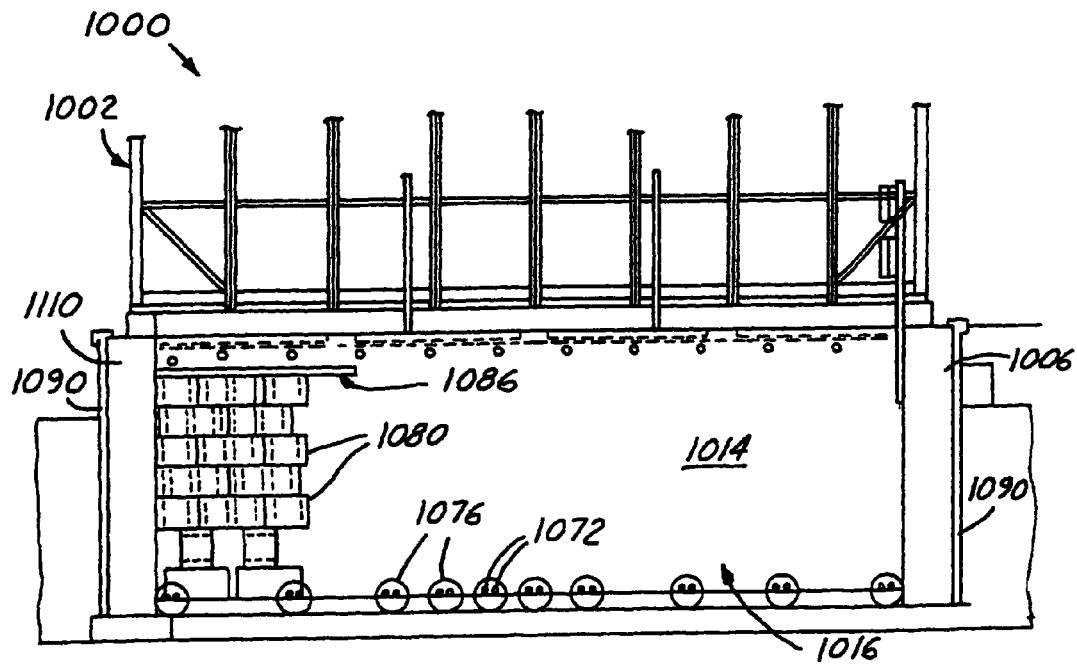
FIG. 32 is a simplified fragmentary cross sectional view taken on the line 32-32 of FIG. 25.
Figure 33:
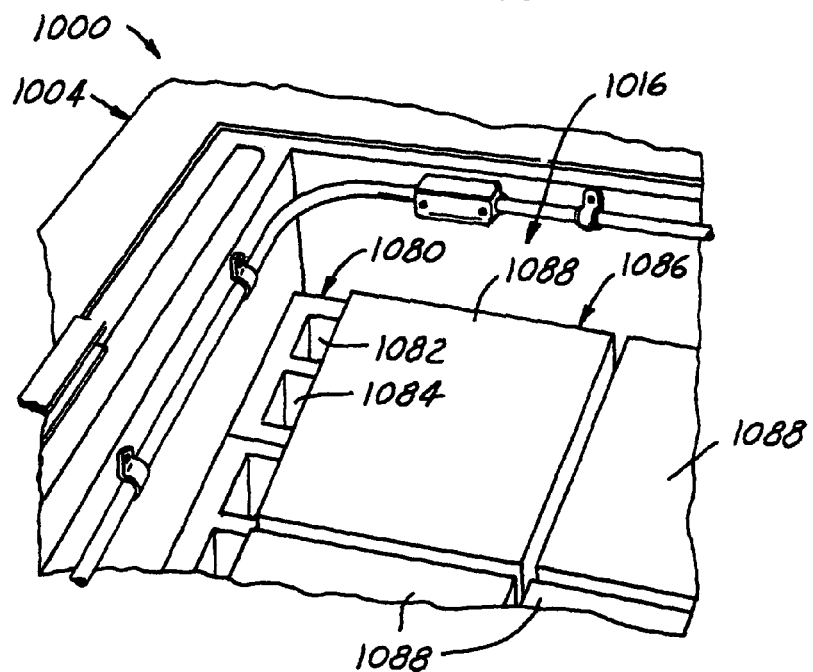
FIG. 33 is a fragmentary perspective view of a corner of the greenhouse floor construction illustrating the layer of patio stones laid on the top of the loose concrete block supporting structure.

As best seen in FIGS. 27, 30 and 32, as well as in FIGS. 25 and 31A, biomass pit 1018 also includes the evaporator sections 1070 of each of the heat pipes 1072 that extend from biomass pit 1018 through mid wall 1014 into the greenhouse pit 1016 (see also FIGS. 38-43). The condenser section 1074 of each heat pipe is disposed in the greenhouse pit 1016. In the particular research and development set-up of thermal engine plant 1000, there are twenty heat pipes 1072 installed in parallel relation. Ten of these heat pipes 1072a have fins on the condenser section 1074a (FIG. 38), and the other ten 1072b are plain in the condenser section 1070b (FIG. 43) for purposes of test and comparison. The evaporator sections 1070 are embedded in the nuclear grade concrete floor 1050 of the biomass pit 1018. Note that nuclear grade concrete is preferred but not critical, and that whatever high-conductivity concrete is available can be used, and in fact, basic concrete may be used that does have any unique thermal properties without affecting the broader scope of this application of the invention.

As best seen in FIGS. 30 and 30A, and also seen in FIGS. 31, 31A and 32, each heat pipe extends from pit 1018 to pit 1016 through a 8 inch diameter pipe section 1076 that is installed in the separating mid wall 1014 when poured. The concrete material used to form floor 1050 also fills each pass-through conduit 1076. The embedment of the heat pipe in the concrete floor 1050 isolates the heat pipe from the aggressive chemical action of the decomposition material in the biomass pit 1018. Passing the heat pipe through the concrete-filled conduit 1076 provides a water-tight, air-tight seal between the two pits 1018 and 1016, while still having the heat pipes transit from the biomass pit 1018 into the greenhouse pit 1016 which serves as the heating plenum of the system.

Interior Components of Greenhouse Basement Pit 1016

Figure 28:
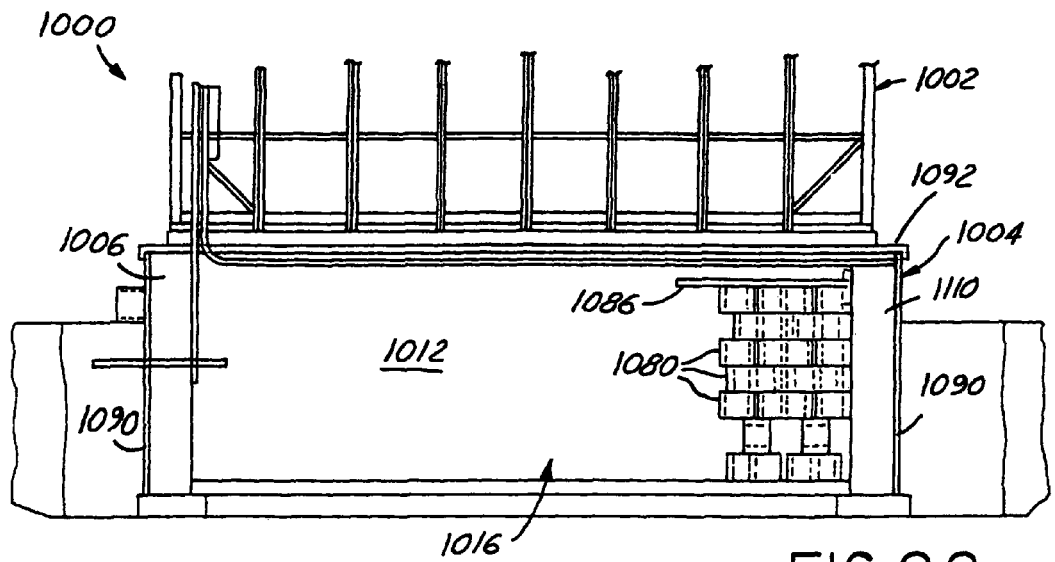
Figure 29:
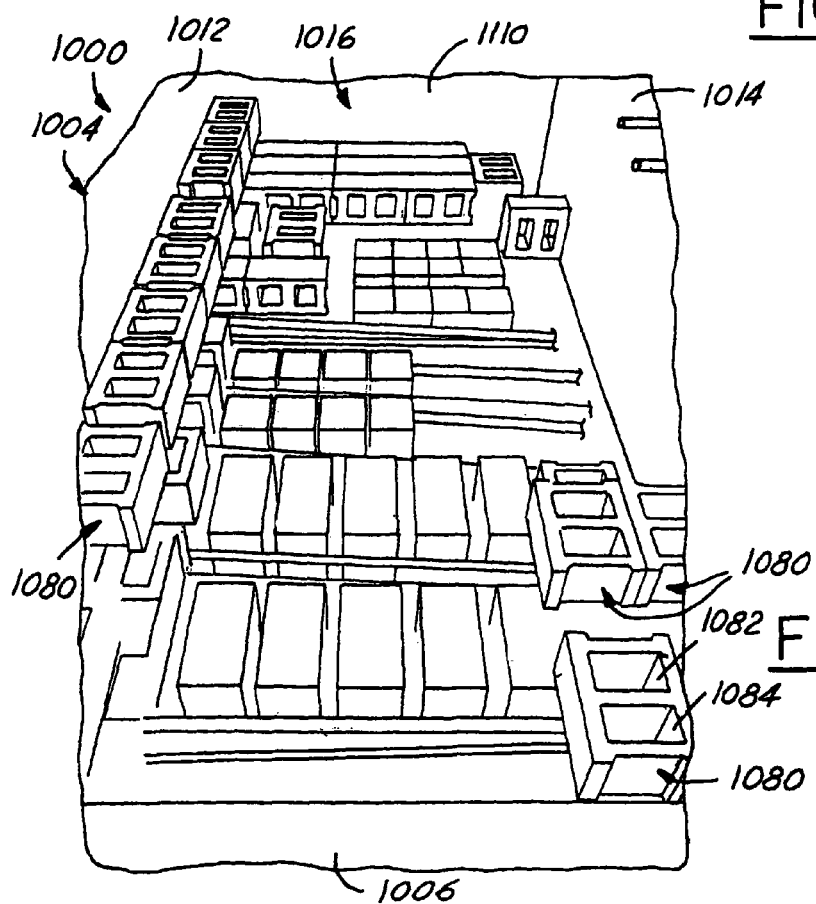
FIG. 29 is a fragmentary perspective view looking into the partially filled greenhouse basement pit of the tenth embodiment biomass heating system constructure.

Interior components of greenhouse basement pit 1016 are best seen in FIGS. 27, 28, 29, 30, 32 and 33. As indicated in FIGS. 27, 28 and 30, greenhouse pit 1016 is substantially filled with a stacked-up array of concrete, cinder or like-masonry blocks 1080 that may be, for example, approximately 8 inches high, 12 inches long and 10 inches wide. These conventional blocks have the usual dual hollow cavities 1082 and 1084 (FIG. 29), and they are set up in a matrix such that the heat pipe condensers 1074, both finned and unfinned, are bridged by these blocks. This open block network permits air to circulate around the heat pipe condenser sections. Hence, as the heat pipes conduct thermal energy from the west biomass pit 1018 into the east greenhouse pit 1016, the heat energy can be transmitted through the basement pit 1016 and warm the concrete blocks 1080 by air convection and radiant heating. Blocks 1080 act as an energy capacitance structure to hold the heat energy during that period of time when the greenhouse is being heated in a solar heating modem, at which time no extra energy is required at the greenhouse level above basement 1016.

As will be evident from FIGS. 27 and 30, greenhouse 1002 is situated above this east greenhouse pit 1016, and the floor 1086 of the greenhouse is made up of an array of slightly spaced apart patio stones 1088 (FIG. 33) that sits on a supporting matrix of the upper layer of concrete blocks 1080. The concrete block matrix filling greenhouse pit 1016 is thus finished or capped with these 24 inch square patio stones 1088, this patio stone floor being thus essentially at ground level. The air gap spacing between adjacent patio stones 1088 permits air to freely circulate around them, floor 1086 thus being a perforated floor due to the patio stone spacing.

Those concrete blocks 1080 aligned with the condenser sections 1074 of heat pipe 1072 are oriented with their through-hole axes horizontal to form a tunnel void that is available for the condenser section 1074 of heat pipes 1072 to extend through. As best seen in FIGS. 27, 30 and 30A, note that each heat pipe 1072, upon entering greenhouse pit 1016, angles upwardly through a 45° angle bend joint 1073 to form an upwardly sloping riser section 1075 that terminates in a reverse 45° bend joint 1077 leading into the condenser section 1074 of the heat pipe. The condenser section 1074 of each heat pipe 1072 is thus also horizontal, but has been raised approximately 18 inches in height relative to the evaporator section 1070 in the biomass pit 1018.

It will also be seen in FIGS. 26, 27, 28, 30, 31, 32 and 36 that the exterior perimeter of the basement 1004 is completely insulated with 2 inch thick layer 1090 of Styrofoam insulation material extending from the top of the walls right down to the wall footings such that the heat energy generated in the biomass material in west pit 1018 and the heat energy being held in the plenum formed by east pit 1016 is isolated by layer 1090 from the ground itself surrounding the basement. Hence, no losses or minimal losses occur to the surrounding earth nor to the atmosphere where the basement walls rise about 20 inches above ground elevation 1091. A wood frame structure 1092 overlays the top of the vertical Styrofoam layer 1090 (see especially FIG. 36) so that the insulation is not damaged by exposure to adverse ambient conditions. There is also an exterior row of cement blocks 1080 that rest on ground level 1091 adjacent the Styrofoam layer 1090 that further protect the insulation layer 1090 from damage.

Preferably, as indicated in FIG. 25, for safety reasons the west pit 1018 is provided with a steel framework supporting a series of doors that provide a protective covering over biomass pit 1018, and yet these doors can be opened and closed so that the biomass material can be loaded into and extracted from the biomass pit 1018.

Construction of Heat Pipes 1072

FIGS. 38 through 43B show various details of the two forms of heat pipes 1072 installed in thermal energy plant 1000. FIGS. 38 and 38A show the finned heat pipe form designated 1072a, whereas FIGS. 43, 43A and 43B show the standard, unfinned heat pipe designated 1072b. By way of example, the overall length of the heat pipes 1072a and 1072b is the same, and is 171 inches when measured off of vertical projections from the opposite axial ends. Each condenser section 1074a and 1074b is 72 inches in length, the sloping leg or riser 1075a, 1075b is 18 inches in length and each evaporator section 1070a, 1070b is 84 inches in length. Heat pipe is constructed of copper tubing, type M, with an inner diameter dimension of 1¼ inches and a wall thickness of 0.05 inches. The 45° bends 1073a, 1073b are constructed as shown in FIG. 38A using 45° elbow sections coupled with a silicon phosphor brazed joint. The elbows are likewise standard 45° copper elbows of 1¼ inch internal diameter.

To facilitate fluid charging of the heat pipes, they are provided with a charging tube 1079 and a suction or withdrawing tube 1081. The end of the evaporator sections 1070a, 1070b is sealed by an imperforate end cap 1083, and is shown in FIG. 43A. The end of the condenser section 1074a, 1074b is sealed with an end cap 1085 having openings 1087 and 1089 for a close fit receipt of tubes 1079 and 1081 respectively (FIG. 43B). Both the tubes 1079 and 1081 preferably extend exteriorly about 8 feet beyond the end cap 1085. Charging tube 1079 is slid through the entire length of the heat pipe until it is about ½ inch from the end cap 1083 of the evaporator section. Suction tube 1081 is inserted approximately 1 inch beyond end cap 1085 into the condenser section. The end caps are brazed, as are the 45° elbows, to provide a well sealed joint. For research purposes thermocouples are installed as shown by the designation "T/C". The heat pipe is charged with a suitable working fluid, as indicated previously, by coupling the source of the fluid to the charging tube 1079 while coupling the suction tube 1081 to a suction source such as a suction pump. Thus the atmosphere originally within the tube is withdrawn as the tube is filled with the working fluid beginning with the outlet end of charging tube 1079 at the closed end of the evaporator sections 1070a, 1070b. When the working fluid has been 100% charged, as evidenced by being withdrawn in suction tube 1081, both tubes are closed with special valving (not shown) and/or plug sealed. The charging of the heat pipes in this manner takes place after they have been installed and mounted in place and embedded in the biomass pit.

It is to be noted that, due to the 45° angle riser 1075 of the heat pipe, the condenser portion 1074 is elevated above the evaporator portion 1070 of the heat pipe. This ensures that there is sufficient air flow around the condenser section of the heat pipe in the greenhouse pit 1016 to permit effective heat transfer. If the heat pipes were flat or straight, they would lie on the floor of the plenum pit 1016 and would not as easily transfer heat energy into the plenum air. The elevated condenser section also ensures that condensate liquid flow is gravity returned to the evaporator section or portion 1070 of the heat pipe. Heat pipes 1072 are preferably wickless, and due to the higher elevation of the condenser section relative to the evaporator section, heat pipes 1072 function as diode-type heat pipes so that they cannot conduct heat energy, at least by phase change, into the biomass pit 1018 from the greenhouse plenum pit 1016. Thus in the heat pipe embodiment constructed as thermal energy plant 1000, the heat pipes function in a thermal-syphon diode format as opposed to the more conventional wicked heat pipe format, i.e., reversible heat pipes. Thus, even if thermal energy is applied to the condenser section 1074 of the heat pipe, because of gravitational effects there is no fluid present that will vaporize and cause heat energy to flow in the reverse direction to the lower elevation evaporator section of the heat pipe embedded in the concrete floor of biomass pit 1018. Heat pipes 1072 thus, in this embodiment, operate as thermal diodes.

Operation of Thermal Energy Plant 1000

Starting with an empty biomass pit 1018, with the steel fins 1022-1040 exposed and protruding above the concrete floor 1050, and with the condenser sections 1070 of the heat pipes 1072 embedded into this floor made preferably of highly-conductive nuclear grade concrete. A quantity (for example 4 tons) of granular or loose material referred to herein as "biomass", such as sweet corn or other mixtures otherwise described previously as well as hereinafter, is dumped into the pit. This biomass loose material also would include, for example, 500 lbs. of horse manure to act as a bio-culture to aid in the decomposition of the sweet corn material.

The aeration system made up of the PVC piping 1052, 1062, 1064 allows outside air to be drawn by convection in through the inlet 1054 to be conducted to the floor of the biomass pit 1018 and then via the series of perforated manifold branch pipes 1064, the air is continuously presented to the biomass material and biomass culture.

The biomass culture begins to decompose the biomass material, and during that process thermal energy is created. This thermal energy can cause the temperature to rise into the range of 130° to 160° F. This action is sustainable by controlling the amount of moisture and the amount of oxygen present for the culture to multiply and begin its decomposition process. This thermal or heat energy is transferred via the series of heat pipes 1072 through the separation wall 1014 into the condenser sections 1074 where the heat is given off into the atmosphere within the greenhouse plenum pit 1016. The heat given into the plenum air, primarily through air convection, heats the matrix of masonry blocks 1080 that surrounds the heat pipes and thereby causes the block array to function as a chamber of heat energy storage or capacitance.

During the day, when the greenhouse is subjected to incident solar energy, there is no need for the heat energy produced by the biomass pit. At that point in time, the temperature in the plenum below the greenhouse is cooler than the temperature of the greenhouse itself, and yet the temperature of the plenum is also cooler than the temperature at the floor of the biomass pit. Therefore, the heat energy associated with the decomposition of material is still conducted from the floor of the biomass into the cooler portion of the plenum below the greenhouse. However, because there is a warmer temperature above the floor level of the greenhouse due to solar activity, there is no air convection mechanism for moving that heat energy produced by the biomass up into the greenhouse proper, but there also is no need to transfer that energy. Instead, the biomass generated heat energy is only used to heat the air and the blocks 1080 within the plenum below the greenhouse and thereby "charge up" the heat storage capacitance.

When the temperature of the greenhouse cools, due to a lack of solar energy, for example—at night or in very cloudy dull days—then the heat energy stored within the matrix of blocks 1080, that has been produced by the biomass and transferred by the heat pipes, is then moved up into the greenhouse by natural air convection currents because the plenum is now warmer than the greenhouse proper and therefore the thermal energy will rise as hot air currents. A convection circulation will occur because there is a significant amount of air space within the matrix of the masonry blocks 1080. Thus, cool air will fall from the greenhouse air space downwardly into the matrix, be heated therein, and then will rise naturally up into the greenhouse. This natural convection circulation causes the greenhouse air temperature to be sustained during those times when there is no solar energy available to be used.

Further, the solar energy that is incident onto the greenhouse also heats the capstones or the 24 inch square by 2 inch thick patio blocks 1086 of the greenhouse flooring. Patio blocks 1086 further act as capacitors and hold energy during the day, releasing it slowly at night. So there are a number of different energy transmitters and producers associated with this structure.

In summary, the biomass produces heat energy, and the heat pipes "super conduct" this heat energy into the heat energy storage capacitance of the matrix of masonry blocks 1080. The solar energy also heats the greenhouse during the day, and the solar energy also heats the heat storage capacitors provided by the patio stone flooring. During the evening and during very dull days the stored heat energy in the thermal capacitance associated with the plenum pit cement block yields energy to the greenhouse, as do the floor capstones. In extended periods of time, when the stored heat energy of the plenum pit capacitance has been fully utilized from within the matrix of masonry blocks, the heat pipes will then conduct biomass-generated heat energy directly into the air of the greenhouse through natural convection, the only heat energy then being derived coming from the heat pipes themselves as they conduct and emit the heat energy being real-time generated by the biomass itself.

However, it is to be understood that in other iterations of the biomass heating system, heat pipes may be employed that are reversible both by way of interior wick construction and gravitational orientation. For example, decomposing material may be dumped onto an exterior concrete slab and heat transfer will be effected from the base of the decomposing material pile into the concrete slab of the biomass container. This heat energy will then be transferred via the heat pipes into the greenhouse when there is no energy being produced in or by the greenhouse to drive the energy in the opposite direction, in other words, when sunlight is not available. When sunlight is available, the solar energy incident on the greenhouse and entering into the greenhouse will be radiated onto the materials on the greenhouse floor, either earth or another concrete slab with the associated sections of the heat pipes embedded therein. This will cause heat energy to be transferred by the heat pipe back into the exterior concrete slab to have it act as a capacitor to augment the heat energy produced by the decomposing biomass material during times when there is no sunlight. In essence, under this phase of operation, the decomposing pit is also used as a heat storage, and the heat pipes will thus be operating as true heat pipes in a reversible cycle mode of operation.

Operation and Operational Parameters of Tenth Embodiment

One is dealing with a live organism in the biomass pit 1018, and the minute the organism dies, the heat exchange or temperature generation, the entire approach to what is desired to be accomplished, has been eliminated. Therefore, all the parameters that generate life are required in this instance. Biomass technology was invented by God and He did it for a specific reason with specific parameters. The organisms that the invention deals with exist in almost every aspect of one's life.

By way of further background, it is to be noted that, in the process of composting, microorganisms break down organic matter and produce carbon dioxide, water, heat and humus, the relatively stable organic end product. Organic decomposition is essentially a natural, biological process that compares somewhat to the raising of plants or animals. The rate of composting, like the growth rate of plants or animals can be effected by many factors. Four key factors to establishing and maintaining active organic decomposition are:

a) nutrient balance
b) moisture content
c) temperature
d) aeration

Nutrient balance is determined largely by the ratio or carbon to nitrogen in the compost mix (C/N ratio). It is like balancing carbohydrates and protein in a diet. Bacteria, fungi and actinomycetes require carbon and nitrogen for growth. These microbes use 30 parts carbon to 1 part nitrogen. Composting is usually successful when the biomass contains 20 to 40 parts of carbon to 1 part nitrogen. However, as the ratio exceeds 30, the rate of composting decreases. As the ratio decreases below 25, excess nitrogen is converted to ammonia which is wasted into the atmosphere and results in undesirable odors.

Moisture content of compost should ideally be 60% after organic components have been well mixed. As moisture content exceeds 60%, the structural strength of the compost deteriorates, oxygen movement is inhibited and the process tends to become anaerobic. Low C/N ratio materials putrefy when anaerobic. High ratio materials ferment. Both processes produce undesirable odors. As moisture content decreases below 50%, the rate of decomposition decreases rapidly. A mixture of organic wastes that contain 60% moisture feels damp to the touch but is not soggy.

Temperature increase which occurs during composting is a result of the breakdown of organic materials by bacteria, actinomycetes, fungi and protozoa. The temperature range can be from freezing to 180 F. Starting from ambient temperature, compost can reach 150 F in less than 2 days. Applying heat to compost from external sources serves no purpose; heat is generated from within the compost medium.

Aeration is a key element in composting. Proper aeration is needed to control the environment required for biological processes to thrive with optimum efficiency. A number of controllable factors are involved. Carbon dioxide is a product of the biochemical reactions that are part of composting. This gas must be removed from the compost microenvironment to avoid toxic concentrations that inhibit the process.

This entire greenhouse system 1000 thus involves two key aspects: heat energy generation and transportation. In essence, the need is to contribute to the heat pipe heat transfer mechanism an energy generation source that costs very little money. One that is renewable. One that is environmentally more than acceptable, friendly to the events and topics of the day, i.e., regarding environmental issues for energy generation. This system 1000, as well as other previously described systems of the invention, certainly fit within the realm of all those policy statements.

In essence, in the present system 1000, a particular material and/or materials are put together that will generate lots of heat for a long period of time on a consistent basis, and as the heat is extracted from this mass it will continue to regenerate. In the process in which decomposition works with regard to composting, it is structured around two or three or four main ingredients. The most important ingredient is carbon. Anything that has carbon in it is compostable. The other ingredient is nitrogen. Those ratios are critical in terms of expedition of the decomposing process. However, in anything with those two ingredients, if you add a little bit of moisture to them at varying rates and varying degrees, and add some oxygen (air), you will have decomposition. The decomposition mechanism agent is bacteria, it is always present, and it is very pervasive. Its existence is sort of unavoidable. Degradation begins as soon as oxygen is present, even in fermented formats. So the elements of decomposition are pretty generally accepted and well known.

The compost material target of system 1000 research has been reused silage, corn silage, which is basically the corn plants chopped up, put into a storage facility, allowed to ferment, but it maintains a high quality of carbohydrate within the feed. That is why it makes an acceptable livestock feed. The most important reason is availability, year round availability, meaning one can obtain a product that has been fermented (fermenting allows it to be stored), and it is readily available and very cheap in terms of a source of energy. It is also cheap as a source of feed for livestock and that is why it is used. It is also very consistent in terms of quality; its quality is excellent because of its high carbon ratio, although it has a relatively low nitrogen content vis-a-vis a low protein. That can be augmented also very cheaply with any nitrogen product.

The burn rate or the rate that the biomass generates energy is the key. That is the reason this product was selected as the compost material, and initial results have been extraordinary. Compared to livestock feeding, there is a reverse action here. In the livestock business they wanted to take this product, and store it for as long as they could. When it was disturbed and put it in the feed box for the cattle to feed, the goal was to save the highest quality for the longest period of time. Now in the invention system it was desired to take it out of the livestock feeding environment, put it in another environment, and allow the bacteria to go to work and generate some heat. By using small volumes of this material, mixing it appropriately with a culture that is a little more aggressive, and observing what the mixture will do, it was discovered that if parameters like air flow to it are controlled, along with controlling the amount of moisture to it, and the rate at which heat is extracted from it is governed, it is possible to control how long it can be made to last, function and regenerate. Not just generation, but regeneration of heat to replace what was extracted from it is desired. In a test period about sixty days in system 1000, the compost temperature at the end of this period was in the 135-140 degree range despite heat being extracted from this pile the entire time on a 1:1 ratio.

Consider a biomass pile that is generating heat, what happens when the heat is pulled away? Does the temperature of that pile drop to the point where the bacteria stop working? In performing this test the pile of compost material was taken up to a given temperature and then a heat pipe was put in it, and the heat energy pulled out. It was found that as the energy was being so pulled out the pile fought back. It gave it up but also proceeded to produce more energy. In essence, the temperature of the biomass pile dropped, but in less than 24 hours it regenerated itself, and then continued maintaining that level or very close to that level for a period of several weeks or more.

There are three different bacteria, and there are three temperature ranges in which each is respectively operative. One is 90 degrees (F.) and below, and the second one is somewhere between 90 and about 110 and 115, and then from there upward the third bacteria will take over, and they are the really active ones and they are the ones the system wants to keep active. An upper temperature limit, where it is too hot to work, is about a 165-170° F. So one can optimize their work by taking heat out if the compost temperature is kept down below this upper limit.

For a continuous process as in systems 100, 200, 300 and 400 versus a batch process as in systems 100A, 100B, 500, 600 and 1000, a larger greenhouse will use a cement pad environment with the heat pipes in the cement pad and all going continuously into a greenhouse facility or a hot water tank, all at ground level. You can constantly be renewing the compost feedstock pile on the cement pad in different sections and that heat is basically going into the greenhouse and will be dispersed. In these decomposition processes that are continuous—keep putting compost feedstock in one end and taking compost out the other, as by mechanically moving it down the line, various levels of decomposition can occur as the pile is going through, and it can be done relatively cheaply. Broadly speaking, almost any biomass, it does not have to be corn silage, will do this.

However, the technique objective in system 1000 is to determine how to optimize the transfer of heat in a batch process. The difference between continuous versus batch processing at this point, however, is to ensure that, with a batch process, a biomass is provided that will respond to the heat extraction rate. With the aforementioned batch processes this heat source has a bell curve in terms of energy output from start to finish. They do not have a constant output. For example, if fresh corn is put in to form the biomass, the output bell curve will peak in two to three days at some top level, and it will stay there for an extended period of time and then it will go down into a declining situation. Although it also was known that a high carbohydrate level in the feedstock material would generate a lot of heat for a prolonged period of time, its ability to regenerate was the real question. In other words, it was not known whether or not it would keep up to the extraction rate of the heat pipes. It was known that, without a heat pipe in it, it will go into a cool down phase and that cool down phase will suggest that it is going to be right around 90 degrees F., and then it will stay at 90 degrees for quite a long period of time, meaning probably two to three months, and as it breaks down now it is becoming soil.

Even in a continuous process facility where feedstock is dumped in at one end and removed at the other on a continuous basis, with mechanical assistance like in auger systems 700, 800 and 900, one of the things to be careful with is that, again, one is dealing with a living organism. If the biomass is given too much oxygen it goes too fast, it uses itself up too quickly. If it is given too little oxygen it will not generate enough heat fast enough. So that is one of the governing factors. When the biomass is constantly moving it is going to be at its upper limit in terms of temperature because of the inclusion of air. As soon as it is stirred, this puts in more oxygen, and that is what the composting people do when they want something to break down quickly. Thus, in a continuous process, the goal is for the maximum heat output rate.

However, there are mechanical difficulties with transferring heat from a continuous operation that are not present in a batch operation. Those difficulties have to do with finding a way to get the energy out while it is being continuously moved, a problem solved by the continuous process systems of the invention. In a batch process, one research objective is to find a way to come up and cut the top off the curve, and linearize the curve over a long period of time. The goal is to extend the useful life of the batch rather than spiking it up and using up all that energy within a short period of time, and then having to clean it out and do it again.

Note in this respect that there is an interesting mechanism operating here. The heat generation in this pile of compost material has absolutely nothing to do with the fibrous material itself. The energy is generated by a microbe that turns the energy into vapor, so it turns water into water vapor. That phase change causes the latent heat of the water to reside in the vapor. Then when the vapor condenses it yields the heat as latent heat of condensation, so there is a two-phase heat exchange going on inside this pile. It is being controlled by the amount of fiber and the amount of porosity associated with the material because these factors determine how much oxygen is present in the material.

But the action occurs on the cell, where the cell is being broken down. The by-product of that disintegration is methane, which is a hydrocarbon generation, plus the reduction of carbon produces water vapor at an elevated temperature. That elevated temperature can only be transferred by condensation within that device. So if one reaches in about 8 inches into that biomass pile and pulls out a mass of that material, it is going to cool down in the hand within seconds because the fiber itself is not that hot. It is the vapor within the fiber that is hot. It is a strange environment, a very strange environment.

However, system 1000 does not have to be vapor tight. Rather, because vapor creates the vaporization, the discharge of the vapor creates a chimney effect. The air-inlet plastic pipe aeration structure 1052, 1050, 1054 within the biomass pit 1018 allows oxygen to enter through a gooseneck inlet 1052 down to the bottom of pit 1018 to a manifold array of perforated branch pipes 1064. That gooseneck allows fresh oxygen to enter into the bottom of the pit as a result of a chimney effect. The vapor-laden hot air rises. Pit 1018 is vented open at the top; that is, it is closed at the top to keep out rodents and things of that nature, but there are vents. But it would not hurt the system 1000 process if it was wide open. The object in this embodiment is to utilize a process for extracting the most uniform consistent amount of energy possible for the longest period of time at a certain level of energy using a mass of decomposing material. The primary interest is not in making soil, nor in producing mushrooms, nor in killing pathogens (rather, pathogen destruction is one of the conditions to avoid or control within the process). Instead, in system 1000 the goal is to reduce these energy bearing materials and extract the energy from them that is the most consistent, uniform and achieves the highest level of energy production possible over the longest period of time.

Also, it does not matter if the compost pile is outside on a planar surface, such as a cement or concrete pad. As to the internal workings of that pile, it does not matter if the temperature outside is 20 degrees F. or if it is 90 degrees F. The inside of the compost pile is going to reach the same temperature. As to the heat in the material, the biological forces will migrate to where the feed is. So, if a compost pile gets hot on the top first, the organisms will migrate down; the heat and the generation will migrate down. The bacterial activity will migrate to the food. As in system 1000, to encase it all in concrete will warm up the concrete; the L-brackets 1022-1040 in the biomass pit 1018 will conduct that heat down to the floor, and the heat pipes 1072 will transfer that heat into the greenhouse, which really extends the life of the whole process.

Although it would appear to be more efficient in system 1000 if the heat pipe evaporator input ends 1000 were scattered throughout the compost mass in pit 1018, there are a couple of reasons why they are not so arranged. First of all, within the pit context of system 1000, one does not want to damage the heat pipes during removal and loading of the pit. This feedstock is pretty course material and the methods for inputting it and removing it are pretty aggressive, e.g., pitch forks, front end loaders, etc. Therefore, the pit should be relatively unencumbered with heat pipes so that operating personnel can get in and clean it out and put in a new batch.

Secondly, the organic acids associated with decomposition are very aggressive, and thus to put heat pipes statically into that environment would accelerate their own "decomposition" by corrosion. For example, stainless steel is attacked very aggressively by silage and chicken corn. One has to be very careful about the environments that are presented to the heat pipes, or else one will end up losing the one device in the system that moves this heat energy around. That is why preferably the heat pipes are embedded, in all but the auger systems 700, 800 and 900, in this particular instance in concrete, so that they are thereby isolated from the aggressive nature of the decomposition process and leachate by-products. Even in auger systems 700, 800 and 900 the heat pipes 716, 834, 942 are raised above the lowermost area of the associated vessel trough, tube or trench so as not to be immersed in organic acidic liquids leaching out of the decomposing compost feedstock.

Note also that greenhouses are customarily even heated in the summertime. However, with system 1000 there is no need to be in a hurry to transfer heat energy; rather, the need is to be consistent. What is really valuable with respect to the present system 1000 is that the system basically maximizes whatever generated heat this pile of biomass is prepared to give up by means of the heat pipe transfer system that is in place. Because of the design of heating 1000, a biomass pile can reside in a commercial setting sitting in pit 1018 beside a greenhouse 1002 in mid-July, when it is 85 degrees F. at night. But now suppose a cold front is coming through. Now it is going to be cool for a couple of days. This biomass that has been sitting there and not used for heating then just automatically is put to work, i.e., the heat pipes just extract that heat and put it in to the greenhouse 1002 automatically as the temperature drops in the greenhouse. In other words, in the meantime during the heat wave the biomass actually has stored the energy to some extent in the surrounding structure in pit 1018 because it has not been extracted until now. So this biomass is sitting there generating enough heat to produce an internal biomass temperature of 125 to 140 degrees F. because it has been there for a long time. Then, on those cool nights, over the heat energy goes via the heat pipes and so the greenhouse gas furnace does not have to come on.

Also, the capacitance of the concrete of pit 1018 itself (or the concrete slab 1050 itself) is a significant benefit. The concrete floor absorbs the heat energy that is produced by the biomass. When 15 tons of concrete is raised to a temperature of 120-130 Fahrenheit, there is a powerful amount of heat energy there that can be dumped into the greenhouse, but only on demand. The heat pipes 1072 are interesting devices in that they only transfer energy where energy is required. So when there is an equilibrium state, they do nothing. When pit 1016 of greenhouse 1002 or the floor 1086 of that greenhouse at a temperature that is considered to be at equilibrium, then nothing happens. Drop the floor temperature of that greenhouse by 10 degrees and all of a sudden heat transfer occurs very rapidly with no exterior mechanism. As to the heat storage capability or the heat sink capability of the biomass itself, it has very little or none. One can reach into that biomass, pull that stuff out, expose it to air, and it is cool in 10 seconds.

Thus, it will now be understood that the operation of the heat pipe is actually a perfect match for the operation of the biomass. The system has a built-in thermostat, with the biomass obtaining the temperature ranges that were discussed earlier hereinabove. If, for example, the biomass in pit 1018 has a temperature of 135 degrees F. over a consistent period of time and the floor 1086 of the greenhouse, or the floor of the greenhouse pit 1016 goes to about 110 degrees F., that is almost a perfect match because you have a Delta T on the other side of 10 to 15 degrees. In other words, as soon as the greenhouse floor 1086 gets below approximately 80 degrees F. the heat pipes 1072 will start to work, i.e., transferring heat energy. As soon as it gets above 80 degrees F. in the greenhouse, the heat pipes stop transferring heat energy. So the heat pipes have their own internal switch. And that is the period for the space that the biomass wants to work in. So it is a real natural fit.

General Process Parameters and Conditions

The process itself of the invention, in its various embodiments, is an interesting one in that it is not like most heat transfer processes. The biomass system begins its decomposition by having what is called "thermophyllic bacteria" resident in it. Thermophyllic bacteria operate at a temperature in the range of about 120 to 160 to 170 Fahrenheit. As long as the biomass exists at that temperature, within that range, the thermophyllic bacteria function extremely well, and by eating the carbon within this mass, the thermophyllic bacteria produce excess energy. If that excess energy is allowed to go unchecked, the bacteria will continue to eat all that carbon at a very high rate of speed and will eventually kill itself, due to lack of energy, and possibly due to overheating and burn-out. That is assuming it has adequate oxygen.

Both water (moisture) and oxygen have to be present in order to maintain the reaction. If that mass of material, say a cubic yard of material, is put in an environment where it is very cool, it will cause an insulative area to occur on the outside surfaces of that cubic yard. The thermophyllic bacteria will function only after they are able to maintain that temperature of 120°-170° F. So if you had a cubic yard of that material existing in an open condition where the temperature is, for argument's sake, say 30° F., you would have a center core of thermophyllic bacteria functioning that would be insulated from the outside areas by as much as eighteen inches, in all dimensions, that would insulate that thermophyllic colony from the lack of energy on the outside of the mass. That really applies to removing energy from the mass. If too much energy is taken from that mass, it will shut down, because there is no temperature at a high enough level to sustain the thermophyllic colony. Therefore, the mass has to warm up and then energy removed from it slowly, so that the bacteria culture is not allowed to go dormant, especially in those areas that are closest to the energy transfer mechanism because such would create an insulative wall or an insulative zone in that area that is close to a cooling area.

In general, the rate of heat energy withdrawal should not exceed the rate of heat energy generation by the biomass. There are a certain number of calories necessary to maintain a certain temperature within the biomass. The thermophyllic bacteria have a propensity to produce many more calories than that, but if you take more calories out than the thermophyllic bacteria can generate to sustain its environmental temperature, then it will shut down. Even if the ambient temperature is 120° to 170° F., e.g., if the system is operating in the desert it could still have this problem if the water that was trying to be pumped through it was at 55° F. The water or the heat pipe that is used to extract energy from this system has to be at a temperature that is acceptable to the thermophyllic colony. For example, if a water pipe were put through a cubic yard of material and water pumped through it at the rate of a gallon a minute at 55° F., this would very quickly create a cool annulus around the pipe that would be non-functional or dormant with respect to thermophyllic action. That would become an insulative area where energy would not be produced. However, some energy still could be transferred.

It should be noted again that, as pointed out previously hereinabove, heat transfer in a biomass pile is not by conduction. Energy transfer in a biomass pile is by condensation and evaporation phase change of moisture. The evaporation occurs when the thermophyllic bacteria consume the carbon and yield water vapor in the process, along with some other organic vapor. The water vapor is at a certain temperature and condenses wherever it is cooler. If there is an insulative wall between the action that is creating the water vapor and the primary water line heat transfer mechanism, i.e., heat pipe, then what will happen is the water will condense within the biomass closer to the water line, but not on the water line. This condensed water will start to move—migrate through capillary action—and present itself to the water line and yield some energy, but it will not yield much because there is no chance for a vapor liquid phase change occurring at the heat pipe.

However, if the water line (heat pipe) is operating at 120° F., the temperature of the biomass will most likely operate at about 150° F. and then water vapor will condense on the water pipe. All of that energy—that latent heat—associated with phase change—will then be given up to the heat pipe as the water vapor condenses on the pipe and thereby result in very effective heat transfer in terms of calories.

So the secret to these systems is to preheat during start-up in order to ensure that the delta T between the energy sink that is absorbing energy (i.e., water tanks, air/rock/block storage capacitance, etc.) and the energy generator, which is the biomass, are both at an elevated temperature such that the biomass can continue to flourish in the process. The system should only extract energy that is in excess of the colony's requirements for growth and sustainability. It is a continuous problem, but a large mass of water can be used that significantly exceeds the requirements of the process being used, so that a relatively small amount of water returns to the tank with respect to the volume of the tank and so that the water temperature within the tank does not drop dramatically during load. The larger mass of water therefore is designed to be in the insulated reservoir tank of the hot water heating system.

Note also that the thermal engine plants or thermal systems of the invention are each characterized as a very gentle process. The reason farmers could never extract energy from manure piles and silage piles, which they have known about for centuries, is the fact that they have never been able to extract energy because of what has just been described. They have tried to pump cold water through the system through the coils, and the cold water never warms up because of all the insulation that occurs around the water jacket. Also there must be air within the system to stop it from going anaerobic, which causes it to rot as opposed to decomposing, i.e., fermentation instead of decomposition. So it is necessary to maintain an aerobic environment, which means there has to be a relatively fluffy environment within this biomass material being composted. However, biomass is a very good insulator, unless there is vapor traveling through it that then condenses. In a lot of ways, the biomass system is an organic heat pipe, i.e., operating by phase change, in terms of releasing vapor and then having it condense. The condensed vapor may be recycled, as it is in a reversible heat pipe in a closed system. The vapor has a tendency to rise, and as it rises it hits the top of the container, if the container has a top as in systems 100A, 100B and 1000, at which point it condenses on the inside wall of the top of the container, and then literally rains back down onto the biomass, remoisturizing it. The bacteria "drink" the water, i.e., they use it as a transfer mechanism. They aspirate it, they sweat. Effectively what is happening is that the whole system sweats and cools itself, maintaining this really unique temperature system operating with limited delta T.

The experience and research results obtained from the research and development greenhouse 1002 of the system 1000 apparatus, show that this R & D apparatus, now operating against an identical control greenhouse (not shown), is using in excess of 50% less fuel than that used in the control greenhouse. Initially a 9 to 1 ratio was achieved, but the weather during this controlled test period has been rainy, and rain is a conductor. Rain pulls energy very rapidly from a greenhouse because the rain hits the glass and absorbs the energy through conduction and then runs away with it. It is like putting a heater in a flowing river. Nevertheless, the R & D greenhouse 1002 is operating at a 50% heat savings rate, which is really quite amazing considering, first of all, that it is not a finely tuned system. The gas/fuel consumption in the biomass heated greenhouse is only half of what it is in the control greenhouse. Both greenhouses are the same size, grow the same crop of peppers and generally have the same microenvironment. Both of them have the same crop to the same density. Vine tomatoes have also been grown. These happen to be commercial crops that are prevalent in southwest Ontario, and the plant stock has been obtained from commercial farmers.

In the working embodiment of system 1000, the heat pipe evaporator sections 1070 are embedded underneath in the concrete floor in the biomass basement 1018, and the biomass sits on top of this floor. Currently, approximately 135° degrees F. is being maintained in the biomass, and the cement wall structure of basement 1018 where the biomass exists is at a temperature in the range of 95° F. The biomass initially was cool next to the concrete, and it created an insulative wall. However, the biomass insulated wall reduced in size as the biomass matured, and as the cement wall heated up. The cement wall started off at 60° F. The wall is now 95° F., and it has taken us about six weeks to get it up to speed. The floor 1048, 1050 of the biomass 1018 pit is actually sitting on a gravel bed that is completely dry because a sump is used to pump all the water out, so there is a very porous air insulator. Preferably, better insulation should be installed underneath the concrete floor.

Most people think in terms of heat transfer as a mechanical exercise where the process is predictable within the parameters and terms of either condensation or evaporation, or pure conduction. However, the system of the invention is biological. It is a biological/mechanical interface, and you can only remove energy from the animal providing the energy to the extent that you provide the animal with a sustainable environment. For example, one can put a cow in a deep freeze and raise the temperature of the deep freeze, but only for a short period of time before the cow dies. However, one can put a cow in a room that is well insulated and allow the energy from the cow's body heat to warm the room—the room will be excessively warm in rapid order and the cow will actually be uncomfortable. So one has to remove the extra energy that the cow is producing, and if one does that, then one can heat the adjacent rooms with no problem. European farmers have done that since prehistory, because they always put their animal barns on the floor below their living quarters. That is why in Europe until the $20^{th}$ Century, the first floor was never the street floor. The first floor of a building was the second floor. The first floor was always where the animals were kept and the heat rose (and the smell). That is a batch process. You put a load in there and then let it cook.

The continuous processes of systems 100, 200, 300 and 400 include a cement slab that has walls on it. On top of this cement slab is a large mass of biomass, in the range of maybe 1000 tons. A machine turns this biomass on a regular basis in order to aerate and advance it. Essentially what is being done in this aspect of such invention system processes is using the technology that is used in commercial composting and municipal composting systems. This technology liberates powerful amounts of energy because it is able to aerate the materials while at the same time allowing for a perfect mix of cultures associated with thermophyllic bacterial action. By doing that, a slab can be heated very quickly. Then the system begins to extract that energy, either directly into air or directly into water tanks, but the water tanks must be preheated. 55° F. water cannot be put in the tank in front of that biomass, because the biomass will not operate closely physically adjacent such a cold transfer agent.

In a commercial or municipal composting system, general organic material is the feedstock and these systems rely on the cultures that are resident in that—everything from egg shells to rotten cabbage to human waste. Then they rely on the cultures that are resident in that to multiply in an environment of moisture and air to create a thermophyllic environment where the components break down carbon and raise the temperature to the point where it kills off the pathogenic bacteria —E-coli bacteria—rendering the spent material at the end of the process safe. The thermophyllic bacteria that are eating the carbon survive at a higher temperature than the pathogenic bacteria. Composting thus decomposes material while killing off harmful bacteria by way of heat.

By contrast, in a preferred mode of operation of the invention processes, specific materials are preloaded that are known to have certain capabilities in terms of generating numbers—amounts of energy over periods of time. The invention takes that known recipe and loads the composting system with it. Preferably, the system is not to be limited or bound by the constraints of other composters, in that the invention system is not to be expected to take everything that comes down the pike. Only materials that are valuable to the process are selected and used, and so the invention process is attenuated because of that. In this way the process can be "spiked up" quite a bit. The feedstock is selected to have high nitrogen, the operation is performed to ensure there is optimal moisture, and to ensure there is an optimal culture in terms of animal manures. Then because the material is blended and chopped, there is an extremely homogenous mix, and hence there are no hot and cold spots within the biomass being composted in this process. All parameters are simultaneously optimized and operable, and as a result the invention systems are able to generate a lot more heat.

Accordingly, preparation of the raw material is needed before it is put into the pile. First of all, it is chopped into size, for example, about the size of an adult thumb in length and diameter. Then the chopped material is blended using a feed mixer,—commercial livestock feed mixer. The recipe going into the blend may vary, but currently approximately 30% by weight of fresh green material is used, which is rendered by the greenhouse itself in the form of plant waste, and another 30% of silage materials or fodder. Silage and fodder normally would be sudan grass, sorghum, sweet corn, field corn, timothy grass and typically wheat straw and hay. All or only one of such silage and fodder may be used, e.g., it can be all wheat straw. However, if it is all wheat straw, it has to be moist. If it is all silage materials, which are semi-fermented, such as sorghum or corn, then it tends to be moist enough not to have to wet it. Silage material is semi-fermented.

With those raw materials so provided in those percentages, then the remainder, about 40% by weight, is provided as animal manure. The animal manure is the bacterial culture. If the raw material were used without the animal manure, and put it in an environment where it has reasonable oxygen and moisture, it will begin the composting action on its own, but it will not be fast and it will not be thermally effective. However, if animal manure is added to the recipe, and it is blended in so that it is homogenous with all of the constituents in the mix, the decomposition action will quickly occur—and in 48 hours the temperature of the pile will be 140° F.

Again, the primary reason for composting in accordance with the invention is not producing compost. The primary reason is producing energy. But the end product, besides energy, is going to be compost—actually, extremely good compost—because the feed stocks are controlled. The invention systems preferably control the feed stocks completely and it is known what the end product will be. It can be specified for its particular use—optimum use. One can assure that, first of all, all the pathogens have been killed off. Once can assure that there are no heavy metals in the material, because what went into it is known. The invention systems preferably features this input of the heat generating process, which is believed to be a unique feature. The only other people who so control their composting process are the mushroom growers.

It is also to be understood that some of the method and apparatus systems of the invention do not have to necessarily rely on heat pipes or thermosyphon heat exchangers for heat transfer in the process. Even if ordinary water tube heat exchangers were employed, the recovery through bio-filtering of the moist warm air from the process that is then pumped into the greenhouse is highly advantageous in its own right. For example, the potential for pulling heat out of system 300 is probably 70% in favor of capturing the vapor and 30% capturing the heat through heat pipe conduction within the pile itself. The system 300 embodiment pulls air from the bottom of a greenhouse 302 that is already somewhat warm and dumps it into this biomass, and then raises its temperature by biomass flow-through, filters it and blows it back into the greenhouse again in a closed loop environment. The advantage of adding a heat pipe system in system 300 is to more efficiently capture heat that is converted into hot water. That allows easy integration with the existing hot water heating system that most all greenhouses use. This can be a retrofit circumstance or original build.

Note, one never wants to put a greenhouse up without having some standby method of applying heat, because there will always come a time where mother nature will demand more energy than can be generated due to a cold north wind screaming in at minus 20 C. for three or four days. In order to save the greenhouse crop, the grower has to fire up the natural gas boiler and pour in megacalories, gigacalories of energy in order to offset the storm's effect. For the rest of the season the system works naturally without the need of the boiler. Nevertheless, the boiler, in order for it to work, has an associated network of hot water heat lines that run through the greenhouse proper and heat the greenhouse through water passing through those lines. At least this conventional hot water heating system exists in every greenhouse that has ever been built in this area, and the invention advantageously uses this same water tank to heat water from the biomass decomposition. A T-valve or any kind of a valve is provided that allows redirection of flow, such that it enables changing from pumping water through the boiler to pumping water through the greenhouse and the water tank. So the invention system accomplishes heating of the greenhouse with hot water flowing through the heating water pipes that are being heated by the compost material.

But again, these biomass thermal energy plants of the invention only generate so much energy per unit time, take a powerful amount of time to warm up and are not reactive to outside demands in a hurry. So in order to protect a crop, no greenhouse manufacturer or greenhouse producer is going to rely on these invention systems entirely for greenhouse heating. They will also need to have a high speed (and inefficient) heating system that will pour powerful amounts of energy into the greenhouse over short periods of time. In the meantime, the biomass thermal energy plant is kept running to build up the energy to the point where there is enough energy in the water tank that the system has reached equilibrium.

Greenhouses use $CO_2$ by the ton, because it is a plant accelerant, a growth accelerant. They buy it in liquid form and then they spray it into the greenhouse as a gas. However, with invention system 100B operating, for example, the discharge from the compost is $CO_2$ laden, so once the discharge is scrubbed by passing the $CO_2$ through membranes 181 and 183, the moist headspace atmosphere may be forced back into the greenhouse as air with a lot of $CO_2$ in it. Likewise, in system 300 the biomass filter issues dry air that in turn removes the moisture that is in the greenhouse; i.e., the dried air absorbs the moisture that is in the greenhouse and eliminates the potential for disease. Hence, with either system the need for purchasing liquid $CO_2$ is greatly reduced, if not eliminated.

Note also that greenhouses already operate with boilers during the summer for a couple of reasons. Number 1, they take the stack gases off the boiler and use them as plant accelerants, and number 2, they heat the floor of the greenhouse to prevent mold and bacteria from growing. With the invention system installed, this boiler summer heating also is reduced, if not eliminated. Once the insulated water tank is heated up to say 135 F., the operator literally just stops composting, and lets the biomass sit there, because the heat pipes are diodonal. They do not take the heat back out of the water tank. Hence the operator just does not compost anymore unless it is desired to make money on tipping fees, i.e., obtain revenue from dump truck waste haulers needing to properly dispose of unwanted biomass waste and therefore paying for "tipping" their dump truck to unload it at the composting site.

On the other hand, if it is desired to keep the thermal energy plant composter running, something must be done with the heat, if it is not going to be used it in the greenhouse to prevent mold. The heat can just be discharged employing a waste gate. Alternatively, when there is no need for the heat energy in the greenhouse, the hot water can be sold to the local car wash. This is done with a tanker truck that is well insulated. It is filled up with 50,000 gallons of hot water at 130° F. and then driven down to the car wash and a pump attached to it. It then provides hot water for washing cars for two or three days. When the hot water is gone the tanker truck is filled with some fresh cold water that is then discharged back into the thermal engine plant system, then the tanker truck takes fresh hot water out and returns again to the car wash, etc. This off-season biomass heating of water from say 60° F. to 212° F. is thus highly advantageous when one considers how expensive it would be if it required the use of either electricity, natural gas or fuel oil instead of using this heat energy generation through composting.

From the foregoing disclosure, it now will be readily understood by those of ordinary skill in the art that the possible applications of using energy from biomass decomposition in accordance with the systems of the invention are all but endless. From severe cold climates to a much more temperate region, these systems will provide economic and environmental relief from traditional reliance on the world's diminishing fossil fuel supplies to any heating application conceived. Greenhouse structures, livestock barns, farm workshops, and even rural residential dwellings are considered as logical applications for biomass heating. In Eastern Europe, many fodder rich but energy starved countries may be able to alter living standards by using this type of energy for greenhouse food production and shelter heating. Shelters in cold climates can provide areas for winter overnight truck parking, permitting engine shutdown, thus reducing atmospheric emissions. The forestry industry which produces a high quantity of biofuel could heat many of its facilities with its own waste products without burning it. Manufacturing facilities, food processors, even in semi-urban areas, can effectively take advantage of biomass heating.

The invention claimed is:

1. A method of recovering heat energy from a quantity of biomass material residing in a composting array while in a bacteria active stage, said method comprising the steps of:
   (a) providing a biomass composting vessel constructed and arranged to define a first chamber and containing the quantity of the biomass material in an array for undergoing aerobic decomposition to thereby generate heat energy in the biomass material,
   (b) providing a heat energy recovery system,
   (c) providing a heat pipe having a gas/liquid phase changeable fluid contained therein, said heat pipe having an evaporator section disposed in non-contacting but operable heat transfer relationship to the biomass material in said vessel and having a condenser section in operable heat transfer relation with said heat energy recovery system to thereby transfer, by change of phase between gas and liquid phases of the phase-changeable fluid internally contained within said heat pipe, heat energy generated by decomposition of the biomass material from the first chamber to the heat energy recovery system, and
   (d) transferring such decomposition-generated heat energy from the biomass material to the heat pipe evaporation section by causing a flow of an atmosphere containing oxygen into and through the biomass material to support aerobic decomposition of the biomass material and also thereby entrain in such flow of such atmosphere water vapor generated by such aerobic decomposition and then causing such water-vapor-laden flow exiting the biomass material to contact and thereby condense on the external surface of the heat pipe evaporator section so that the heat of condensation of such condensed water vapor is given up to such heat pipe evaporator section.

2. The method of claim 1 wherein the heat energy recovery system comprises a building to be heated by such heat energy transferred from said heat pipe condenser section.

3. The method of claim 2 wherein said building comprises a greenhouse and wherein said vessel comprises a large pad located adjacent the greenhouse, on which the biomass material is arrayed, said method comprising the further steps of:
   (e) taking air from the interior of said greenhouse and causing such air to flow into a series of ducts buried under the pad on which the biomass material is placed, the pad being perforated so that such ducts therein are oriented to cause such greenhouse air to flow through the biomass array, oxygenating it as such air passes therethrough, and
   (f) providing an inflated dome covering the pad so that the air going through the biomass is heated by the decomposing biomass and then flows under super atmospheric pressure into the inflated dome where the heated air is then taken off by the system pressure differential and forced back into the greenhouse where it is now present as warm air that is heavily carbon dioxide laden, thereby providing a growth accelerant atmosphere for the plants in the greenhouse.

4. The method of claim 1 wherein said vessel and said heat pipe evaporator section are constructed and arranged relative to one another to maintain a non-contacting relationship between the biomass material array and the heat pipe evaporator section, said operable heat transfer relationship being effected by utilizing the heat of condensation of water vapor generated by aerobic decomposition of the biomass material and then entrained in a flow of air through the biomass material, such condensation occurring after such water vapor exits the biomass material and as such water vapor contacts and thereby condenses on the external surface of the heat pipe evaporation system.

5. The method of claim 1 wherein heat transfer in step (c) is regulated by maintaining a given value of temperature difference between the decomposing biomass material and the heat energy recovery system such that that rate of heat energy withdrawal from the biomass array via the heat pipe generally does not substantially exceed the rate of heat energy generation by the biomass material array necessary to sustain the requirements of the bacteria in the biomass array for growth and sustainability.

6. The method of claim 5 wherein the heat energy recovery system is initially preheated at start-up of system operation to establish said given value of temperature difference.

7. The method of claim 1 comprising the further step of providing the quantity of biomass material by selecting the biomass feedstock to have a relatively high nitrogen content and chopping and blending the feedstock by mixing to form a homogeneous mix.

8. The method of claim 7 wherein the recipe of the selected feedstock comprises approximately 30% by weight of fresh green vegetation, approximately 30% by weight of silage materials or fodder and approximately 40% by weight of animal manure.

9. A method of recovering heat energy from biomass material disposed in a heating system, said method comprising the steps of:
  (a) providing a vessel constructed and arranged to define a first chamber for containing a quantity of biomass material for undergoing aerobic decomposition to thereby generate heat energy in the biomass material,
  (b) providing an adjacent structure defining a second chamber for containing a fluid to be heated,
  (c) providing a heat pipe having a gas/liquid phase changeable fluid contained therein, said heat pipe having an evaporator section disposed for operable heat transfer relation to the biomass material in said first chamber of said vessel and having a condenser section disposed for operable heat transfer relation with the fluid in said second chamber to thereby transfer, by change of phase between gas and liquid phases of the phase-changeable fluid internally contained within said heat pipe, the energy generated by decomposition of the biomass material from the first chamber to the fluid of said second chamber to thereby heat such second chamber fluid,
  (d) providing an aeration system for inducing a flow of air through the biomass material in said first chamber of said vessel to thereby entrain in such flow water vapor and other gases being generated by the decomposition process occurring in the biomass material, and
  (e) providing a heat pipe support system for supporting the heat pipe evaporation section outside said first chamber in the flow of air in said aeration system and out of physical contact with said biomass material such that the operable heat transfer relation of the evaporation section to the biomass material results from the heat of condensation of water vapor generated by aerobic decomposition of the biomass material and then entrained in such flow of air, such condensation occurring after such water vapor exits the biomass material and as such water vapor contacts and thereby condenses on the external surface of the heat pipe evaporation section.

10. The method of claim 9 wherein said vessel comprises a floor pad structure for said first chamber having a generally horizontal upper surface for receiving biomass material thereon, providing a plurality of said heat pipes arrayed in spaced apart generally parallel relation with said evaporator section of each said heat pipe disposed generally parallel to said floor pad upper surface, and providing said heat pipes constructed and arranged for operable non-contacting heat transfer relation to the biomass material received on said pad upper surface.

11. The method of claim 10 including the further step of providing a biomass aeration system having branch air conduits extending parallel to one another, said branch conduits having air ports oriented for feeding air to or withdrawing air from the biomass material resting on said pad upper surface.

12. The method of claim 9 wherein said vessel is provided as a floor pad structure having a generally horizontal upper surface for receiving biomass material thereon,
  wherein a plurality of said heat pipes are provided as an array in spaced apart generally parallel relation in said heat pipe support system as a first heat pipe array with said evaporator section of each said heat pipe disposed generally parallel to said floor pad upper surface and for operable non-contacting heat transfer relation to the biomass material received on said pad upper surface,
  wherein said biomass aeration system is provided as branch air conduits extending generally parallel to one another, said branch conduits having air ports oriented for feeding air to or withdrawing air from the biomass material resting on said pad upper surface, and
  wherein said heat pipes are provided so as to extend from said heat pipe support system in sealed relation into said second chamber such that said condenser section of each said heat pipe is disposed in heat exchange relation with the fluid contained in said second chamber.

13. The method of claim 12 wherein said air conduits are embedded in said floor pad structure, said second chamber structure being provided as a first tank for containing said second chamber fluid and being disposed alongside said vessel first chamber,
  covering said first chamber by a hood extending above and over the uppermost level of the biomass material when received in said first chamber,
  constructing and arranging said hood for capturing vapors issuing upwardly from the top surface of the biomass material in said first chamber, and
  disposing said heat pipe evaporator sections below said hood and above the uppermost level of the biomass material when disposed in said floor pad structure.

\* \* \* \* \*